United States Patent [19]
Kato et al.

[11] Patent Number: 5,519,857
[45] Date of Patent: May 21, 1996

[54] HIERARCHICAL PRESEARCH TYPE TEXT SEARCH METHOD AND APPARATUS AND MAGNETIC DISK UNIT USED IN THE APPARATUS

[75] Inventors: Kanji Kato; Hiromichi Fujisawa, both of Tokorozawa; Mitsuo Ooyama; Hisamitsu Kawaguchi, both of Hachioji; Atsushi Hatakeyama, Kokubunji; Noriyuki Kaneoka; Mitsuru Akizawa, both of Hachioji; Masaaki Fujinawa, Tokyo; Hidefumi Masuzaki, Hadano; Masaharu Murakami, Odawara, all of Japan

[73] Assignee: Hitachi, Ltd., Tokyo, Japan

[21] Appl. No.: 985,795

[22] Filed: Nov. 30, 1992

Related U.S. Application Data

[63] Continuation of Ser. No. 555,483, Aug. 9, 1990, Pat. No. 5,168,533 and PCT/JP90/00774, Jun. 14, 1990.

[30] Foreign Application Priority Data

Jun. 14, 1989 [JP] Japan ................................. 1-149630
Jul. 24, 1989 [JP] Japan ................................. 1-188772
Jul. 24, 1989 [JP] Japan ................................. 1-188773
Sep. 8, 1989 [JP] Japan ................................. 1-231567

[51] Int. Cl.⁶ .................................................. G06F 17/30
[52] U.S. Cl. .................... 395/600; 364/DIG. 1; 364/282.1; 364/252.3; 364/225.4
[58] Field of Search ............................ 395/600, 650; 364/419

[56] References Cited

U.S. PATENT DOCUMENTS

| | | | |
|---|---|---|---|
| 4,320,451 | 3/1982 | Bachman et al. | 395/650 |
| 4,395,757 | 7/1983 | Bienvenu et al. | 395/650 |
| 4,516,166 | 5/1985 | Tellone et al. | 360/72.1 |
| 4,635,189 | 1/1987 | Kendall | 395/600 |

FOREIGN PATENT DOCUMENTS

| | | |
|---|---|---|
| 0266586A3 | 10/1987 | European Pat. Off. . |
| 0437615A1 | 12/1990 | European Pat. Off. . |
| 60-105040 | 6/1985 | Japan . |
| 60-105039 | 6/1985 | Japan . |

(List continued on next page.)

OTHER PUBLICATIONS

Roger L. Haskin, et al., "Operational Characteristics of a Hardware-Based Pattern Matcher", ACM Transactions on Database Systems, vol. 8, No. 1, Mar. 1983, pp. 15–40. (Provided in English).

Alfred V. Aho, et al., "Efficient String Matching: An Aid to Bibliographic Search", Communications of the ACM, vol. 18, No. 6, Jun. 1975, pp. 333–340. (Provided in English).

(List continued on next page.)

*Primary Examiner*—Thomas G. Black
*Assistant Examiner*—Peter Y. Wang
*Attorney, Agent, or Firm*—Fay, Sharpe, Beall, Fagan, Minnich & McKee

[57] ABSTRACT

A method and apparatus for performing a document information search to uncover specified text data containing a given search subject key word from a group of document text data stored in a memory. In the document information search method, two stages of presearch are carried out to perform the document search with respect to a desired subject key word. In a first stage of presearch, a character component table is generated in which the existence of character codes for every document is set forth with respect to all the character codes contained in the group of document text data of stored documents. The character component table is searched for all the character codes comprising a designated search subject key word to thereby extract all documents containing all the character codes comprising the search subject key word. Further, in the presearch step, all texts without the possibility of containing the search subject key word are eliminated. A comprehensive, narrowed text search is thereby performed in accordance with the search subject key word.

8 Claims, 72 Drawing Sheets

FOREIGN PATENT DOCUMENTS

| | | |
|---|---|---|
| 05055912 | 9/1987 | Japan . |
| 62-241026 | 10/1987 | Japan . |
| 63-198124 | 8/1988 | Japan . |
| 3-125263 | 5/1991 | Japan . |
| 5-7606 | 8/1991 | Japan . |
| WO9016036 | 12/1990 | WIPO . |

OTHER PUBLICATIONS

"Signature Files: An Access Method for Documents and Its Analytical Performance Evaluation", Faloutsos, et al., ACM Transactions on Office Information Systems, vol. 2, No. 4, Oct. 1984, pp. 267–288.

Mukhopadhyay, Uttam, et al. "An Intelligent System for Document Retrieval in Distributed Office Environments," Journal of the American Society for Information Science, vol. 37, No. 3, May 1986, pp. 123–135. (English).

Kim, Michelle Y. "Synchronized Disk Interleaving," IEEE Transactions on Computers, vol. C-35, No. 11, Nov. 1986, pp. 978–988. (English).

Sellis, Timos K. "Multiple–Query Optimization," ACM Transactions on Database Systems, vol. 13, No. 1, Mar. 1988, pp. 23–52. (English).

Alsabbagh, J. R., et al. "A Framework for Multiple–Query Optimization," IEEE Second International Workshop on Research Issues on Data Engineering: Transactions Query Processing, Cat. No. 92TH0417-6, Feb. 3, 1992, pp. 157–162. (English).

Kang, Myong H., et al. "Algorithm Choice for Multiple–Query Evaluation," Parbase–90 International Conference on Databases, Parallel Architectures and Their Applications, Cat. No. 90CH2728-4, Mar. 9, 1990, p. 535. (English).

Kimbrell, Roy E. "State Machines Find the Pattern," Computer Design, vol. 24, No. 5, May 1985, pp. 163–169. (English).

| NUMBER OF STATE | 1 | 2 | 3 | 4 | 5 | 6 | 7 |
|---|---|---|---|---|---|---|---|
| NUMBER OF STATE EFFECTED BY FAILURE | 0 | 0 | 0 | 0 | 0 | 0 | 0 |

FIG. 6

| NUMBER OF STATE | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| NUMBER OF STATED EFFECTED BY FAILURE | O | O | O | O | O | O | O | O | O | O | O | O | O | O | O |

| NUMBER OF STATE | 16 | 17 | 18 | 19 | 20 | 21 | 22 | 23 | 24 | 25 | 26 | 27 | 28 | 29 |
|---|---|---|---|---|---|---|---|---|---|---|---|---|---|---|
| NUMBER OF STATED EFFECTED BY FAILURE | O | O | O | O | O | O | O | O | O | O | O | O | O | O |

FIG. 8

| NUMBER OF STATE | 1 | 2 | 3 | 4 | 5 | ... | 130 | 131 | 132 | 133 | 134 | 135 | 136 | 137 | ... | 510 | 511 | 512 | 513 |
|---|---|---|---|---|---|---|---|---|---|---|---|---|---|---|---|---|---|---|---|
| NUMBER OF STATE EFFECTED BY FAILURE | O | O | O | O | O | ... | O | O | — | 134 | O | O | O | O | ... | O | O | O | O |

FIG. 11

KEY WORD : "知的検索"

DOCUMENT CONTENTS : あいまい検索のための知的検索技術を開発した。…

CHARACTER POSITIONS : 0 1 2 3 4 5 6 7 8 9 10 11 12 13 14 15 16 17 18 19 20 21 22 23 24 25 26 27 28 29 30

COMPARISON POSITION : 13

FIG. 14

KEY WORD 1: "文書"
KEY WORD 2: "検索"

①DOCUMENT EXAMPLE 1
　CONTENTS OF DOCUMENT : 文書の内容を読んで検索する。…
　　　　　　　　　　　　　　　7 CHARACTERS

②DOCUMENT EXAMPLE 2
　CONTENTS OF DOCUMENT : 文書の内容を理解して検索を行う。…
　　　　　　　　　　　　　　　8 CHARACTERS

③DOCUMENT EXAMPLE 3
　CONTENTS OF DOCUMENT : 検索の結果に基づいて該当文書の内容を表示する。…
　　　　　　　　　　　　　　　10 CHARACTERS

④DOCUMENT EXAMPLE 4
　CONTENTS OF DOCUMENT : 文書の論理的な構造を意識した検索を行う。…
　　　　　　　　　　　　　　　12 CHARACTERS

F I G. 15
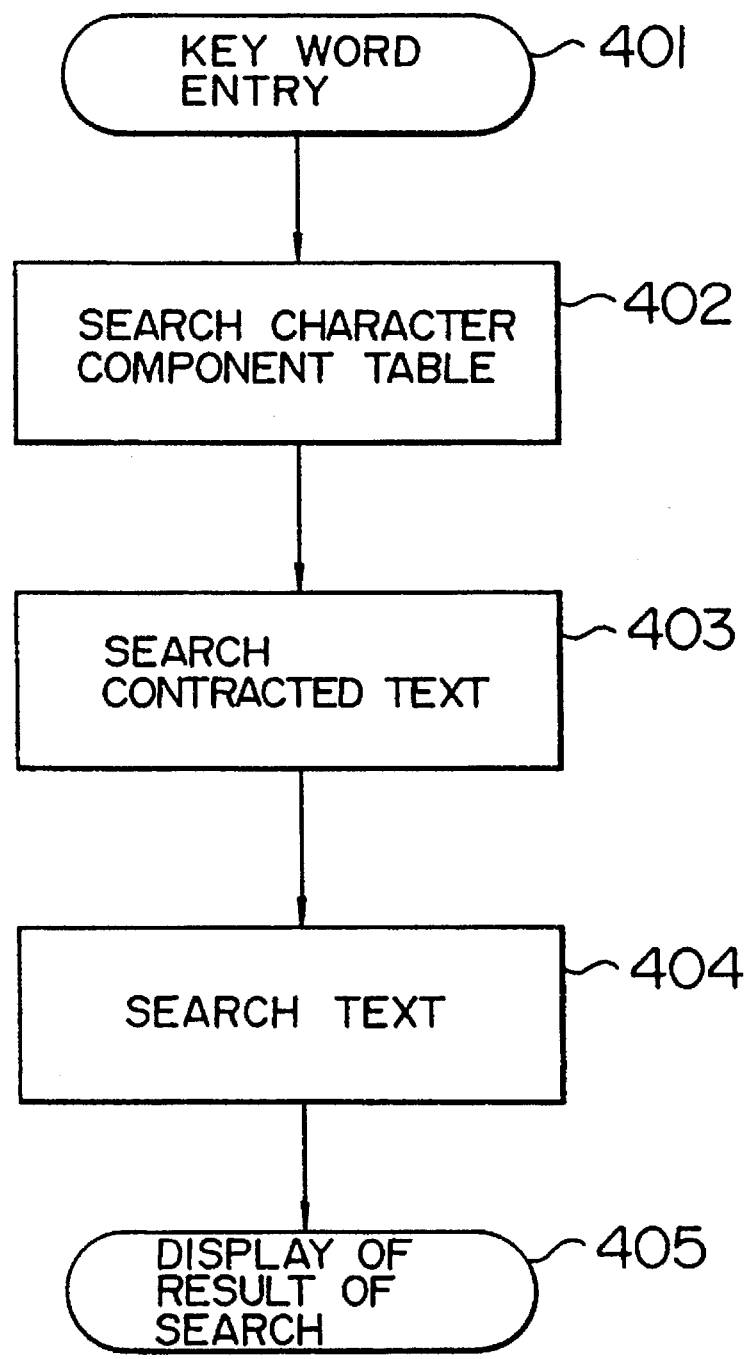

F I G. 20A
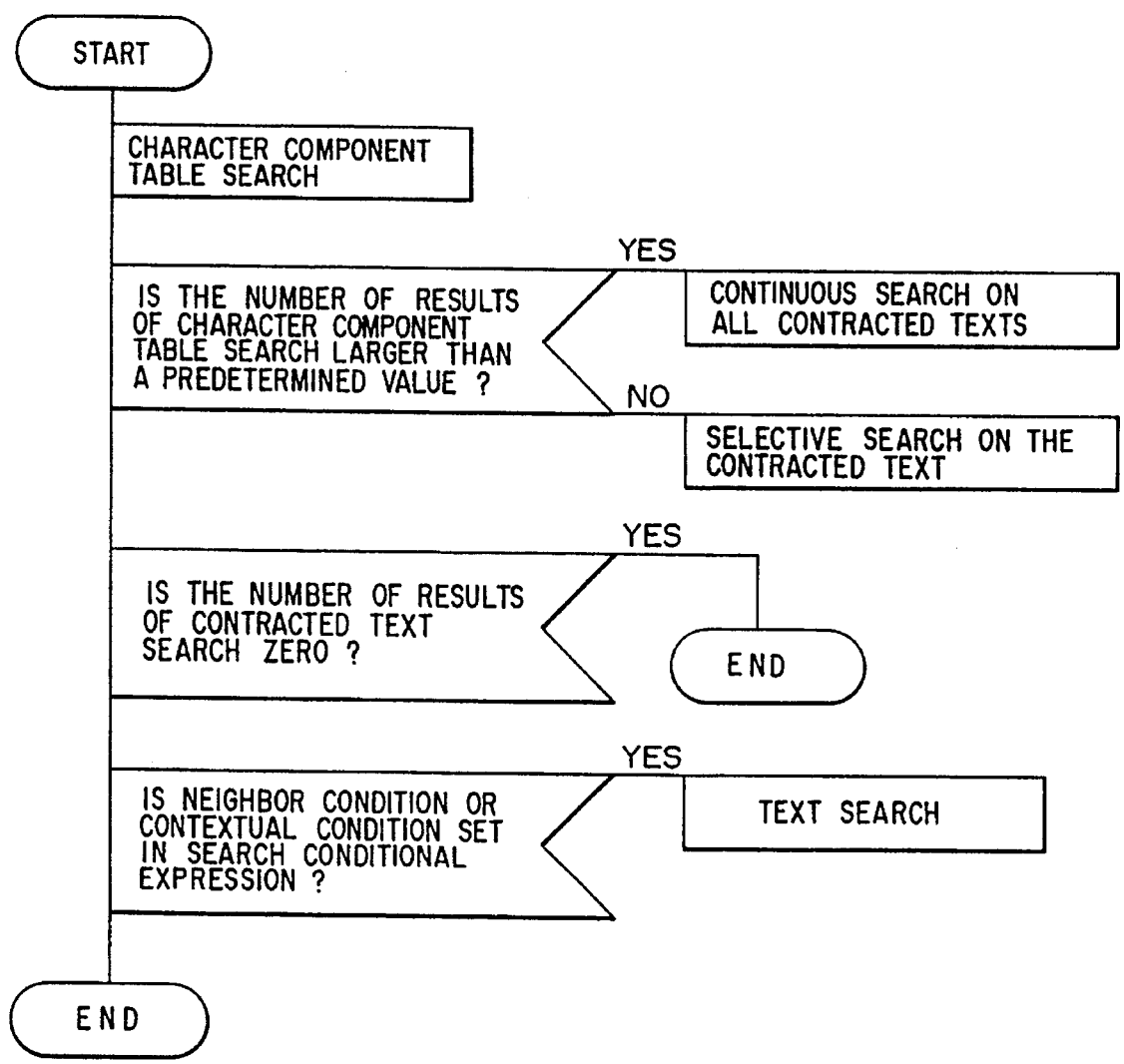

F I G. 34

| STATE | INPUT CHARACTER AND NEXT STATE ||||||
|---|---|---|---|---|---|---|
| 0 | フ | 1 | ホ | 4 | タ | 6 |
| 1 | オ | 2 | | | | |
| 2 | ー | 3 | | | | |
| 4 | ー | 5 | | | | |
| 6 | ー | 7 | | | | |

F I G. 35

| STATE | OUTPUT TERM |
|---|---|
| 1 | フ |
| 2 | フォー,フォ,ホー,ホ |
| 3 | フォー,フォ,ホー,ホ |
| 4 | フォー,フォ,ホー,ホ |
| 5 | フォー,フォ,ホー,ホ |
| 6 | タ,ター |
| 7 | タ,ター |

FIG. 37

| HEAD CHARACTER | DEVELOPED TERM LIST |
|---|---|
| カー | カー,カア |
| イア | イア,イヤ |
| キア | キア,キヤ |
| イウ | イウ,イユ |
| キウ | キウ,キュ |
| イオ | イオ,イヨ |
| クア | クア,クワ |
| エア | エア,エヤ |
| ケア | ケア,ケヤ |
| エー | エー,エイ,エエ |
| フェー | フェー,フェイ,フェエ |
| エオ | エオ,エヨ |
| ジ | ジ,ディ,ズィ,デイ,デ,ジィ |
| キュウム | キュウム,キウム |
| シュウム | シュウム,シウム |
| クサ | クサ,キサ |
| バ | バ,ヴァ |
| ⋮ | ⋮ |

FIG. 38

| HEAD CHARACTER | DEVELOPED TERM LIST |
|---|---|
| 亜 | 亜,亞 |
| 溶 | 溶,熔 |
| 囲 | 囲,圍 |
| 為 | 為,爲 |
| 庵 | 庵,菴 |
| 肝 | 肝,胆 |
| 稲 | 稲,稻 |
| 猪 | 猪,猪 |
| 祈 | 祈,祈 |
| 彩 | 彩,彩 |
| 祝 | 祝,祝 |
| 飲 | 飲,飲 |
| 隠 | 隠,隱 |
| 羽 | 羽,羽 |
| 兎 | 兎,兔 |
| ⋮ | ⋮ |

FIG. 39

| HEAD CHRACTER | DEVELOPED TERM LIST |
|---|---|
| 打ち | 打ち, 打 |
| 合い | 合い, 合 |
| 懸かり | 懸かり, 懸り |
| 漬け | 漬け, 漬 |
| 明か | 明か, 明, 明き |
| 空き | 空き, 空 |
| 揚げ | 揚げ, 揚 |
| 上げ | 上げ, 上 |
| 曇り | 曇り, 曇 |
| 掛か | 掛か, 掛, 掛け |
| 預か | 預か, 預 |
| 当た | 当た, 当 |
| 付け | 付け, 付 |
| 払い | 払い, 払 |
| 釣り | 釣り, 釣 |
| 編み | 編み, 編 |
| ⋮ | ⋮ |

FIG. 40

| ROMAJI | KATAKANA |
|---|---|
| A | ア |
| KA | カ |
| SA | サ |
| KYA | キャ |
| SYA, SHA | シャ |
| TYA, CHA | チャ |
| NYA, | ニャ |
| ZYA, JA | ジャ |
| BYA | ビャ |
| DA | ダ |
| ZI, DI | ジ |
| ZU, DU | ヅ |
| PA | パ |
| PI | ピ |
| ZYO, DYO, JO | ジョ |
| ⋮ | ⋮ |

F I G. 42

| DEVELOPMENT MODE | KANJI DIFFERENT NOTATION DEVELOPMENT CONTROL SIGNAL 3061 | KATAKANA DIFFERENT NOTATION DEVELOPMENT CONTROL SIGNAL 3062 | KANA-ROMAJI CONVERSION CONTROL SIGNAL 3063 | SW-a CONTROL SIGNAL 3064 | SW-b CONTROL SIGNAL 3065 |
|---|---|---|---|---|---|
| C | ○ | | | | |
| K | | ○ | | | ○ |
| r | | ○ | ○ | | |
| a | | | | ○ | |
| CK | ○ | ○ | | | ○ |
| Cr | ○ | ○ | ○ | | |
| Ca | | | | ○ | |
| Kr | | ○ | ○ | ○ | ○ |
| Ka | | ○ | ○ | ○ ○ | ○ |
| ra | | ○ | ○ ○ | | |
| CKr | ○ | ○ | ○ | ○ | ○ |
| CKa | ○ | ○ | ○ ○ | ○ ○ | ○ |
| Cra | ○ | ○ | ○ ○ | ○ ○ | |
| Kra | | ○ | ○ ○ | ○ ○ | ○ ○ |
| CKra | ○ | ○ | ○ ○ | ○ ○ | ○ ○ |

FIG. 43

SYNONYM DICTIONARY

| RECORD NO. | HEADWORD | SAME-RANK WORD | HIGHER-RANK WORD | LOWER-RANK WORD | RELATED WORD |
|---|---|---|---|---|---|
| 1 | 計算機 | 2, 3 | 4 | 5, 6 | 7, 8 |
| 2 | コンピュータ | 1, 3 | 4 | 5, 6 | 7, 8 |
| 3 | 情報処理装置 | 1, 2 | 4 | 5, 6 | 7, 8 |
| 4 | 電子機器 | | 1, 2, 3 | 1, 2, 3 | |
| 5 | 電子卓上計算機 | 6 | 1, 2, 3 | | |
| 6 | 電卓 | 5 | 1, 2, 3 | | |
| 7 | オフィス オートメイション | 8 | | | 1, 2, 3 |
| 8 | OA | 7 | | | 1, 2, 3 |
| ... | ... | ... | ... | ... | ... |

FIG. 44

INDEX TABLE

| CHARAC-TER | RECORD NO. |
|---|---|
| A | 1 |
| B | 10 |
| ... | ... |
| 計 | 501 |
| ... | ... |

↑ "計"

→ NO.501 RECORD

SYNONYM DICTIONARY

| RECORD NO. | HEADWORD | SAME-RANK WORD |
|---|---|---|
| ... | ... | ... |
| 499 | オフィス オートメイション | 498 |
| 500 | コンピュータ | 501, 502 |
| 501 | 計算機 | 500, 502 |
| 502 | 情報処理装置 | 500, 501 |
| 503 | 電子機器 | ... |

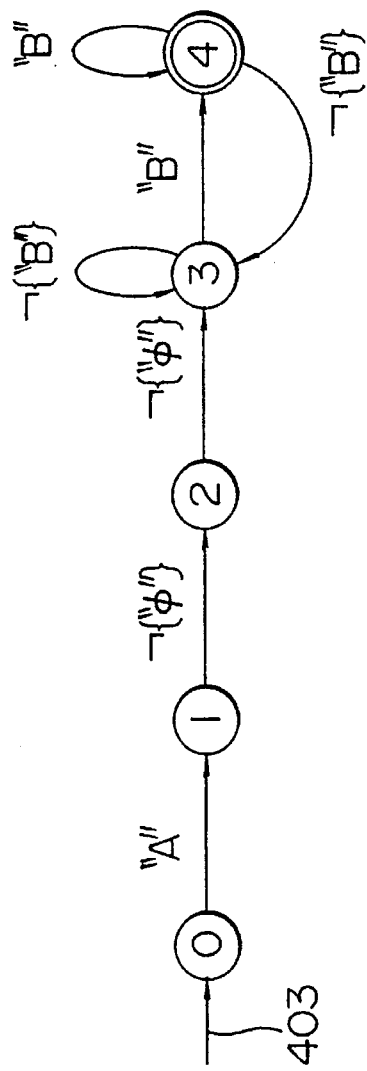
F I G. 49
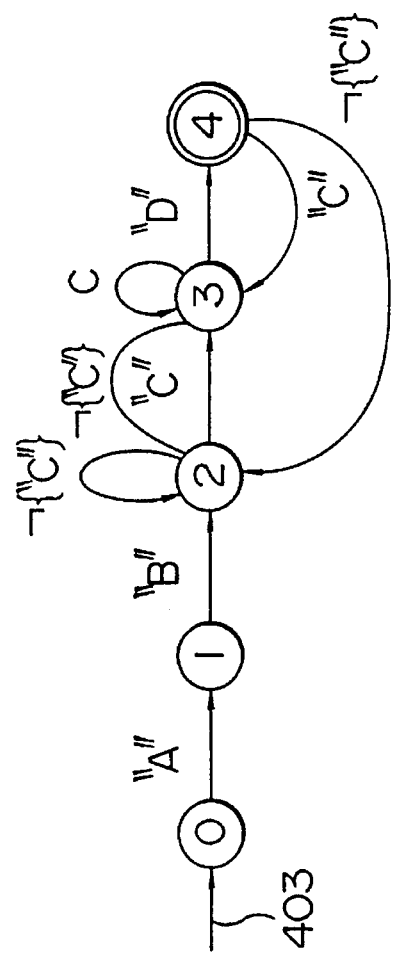
F I G. 50

(("A" ("BC" "CB") "BAC") "D" "ABDC")

F I G. 54

| CHARACTER | | | イ | | H | | | | イ | | ア | | ケ | | ツ | | ン | | | |
|---|---|---|---|---|---|---|---|---|---|---|---|---|---|---|---|---|---|---|---|---|
| CHARACTER CODE | 0 | 1 | ... | 45 | ... | 170 | ... | 176 | 178 | ... | 189 | ... | 192 | ... | 204 | ... | 221 | ... | 254 | 255 |
| STATE NO. | | | | | | | | | | | | | | | | | | | | |
| 0 | 0 | 0 | 0 | 0 | 0 | 0 | 0 | 0 | 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 2 | 0 | 0 | 0 |
| 2 | 0 | 0 | 0 | 0 | 0 | 0 | 0 | 0 | 0 | 0 | 0 | 0 | 3 | 0 | 0 | 0 | 0 | 0 | 0 | 0 |
| 3 | 0 | 0 | 0 | 4 | 0 | 0 | 0 | 4 | 0 | 0 | 0 | 0 | 0 | 0 | 5 | 0 | 0 | 0 | 0 | 0 |
| 4 | 0 | 0 | 0 | 0 | 0 | 0 | 0 | 0 | 0 | 0 | 0 | 0 | 0 | 0 | 5 | 0 | 0 | 0 | 0 | 0 |
| 5 | 0 | 0 | 0 | 0 | 0 | 6 | 0 | 0 | 0 | 0 | 0 | 0 | 0 | 0 | 0 | 0 | 0 | 0 | 0 | 0 |
| 6 | 0 | 0 | 0 | 7 | 0 | 0 | 0 | 7 | 7 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 8 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 |

F I G. 55

| STATE NO. | 1 | 2 | 3 | 4 | 5 | 6 | 7 | 8 |
|---|---|---|---|---|---|---|---|---|
| KEY WORD NO. | ○ | ○ | ○ | ○ | ○ | ○ | ○ | — |

| LOGICAL CLASSI-FICATION ID | HEAD CYLINDER NUMBER | NUMBER OF CYLINDERS |
|---|---|---|
| 1 | 1 | 200 |
| | 2 | 201 | 200 |
| 2 | 1 | 401 | 200 |
| | 2 | 601 | 200 |

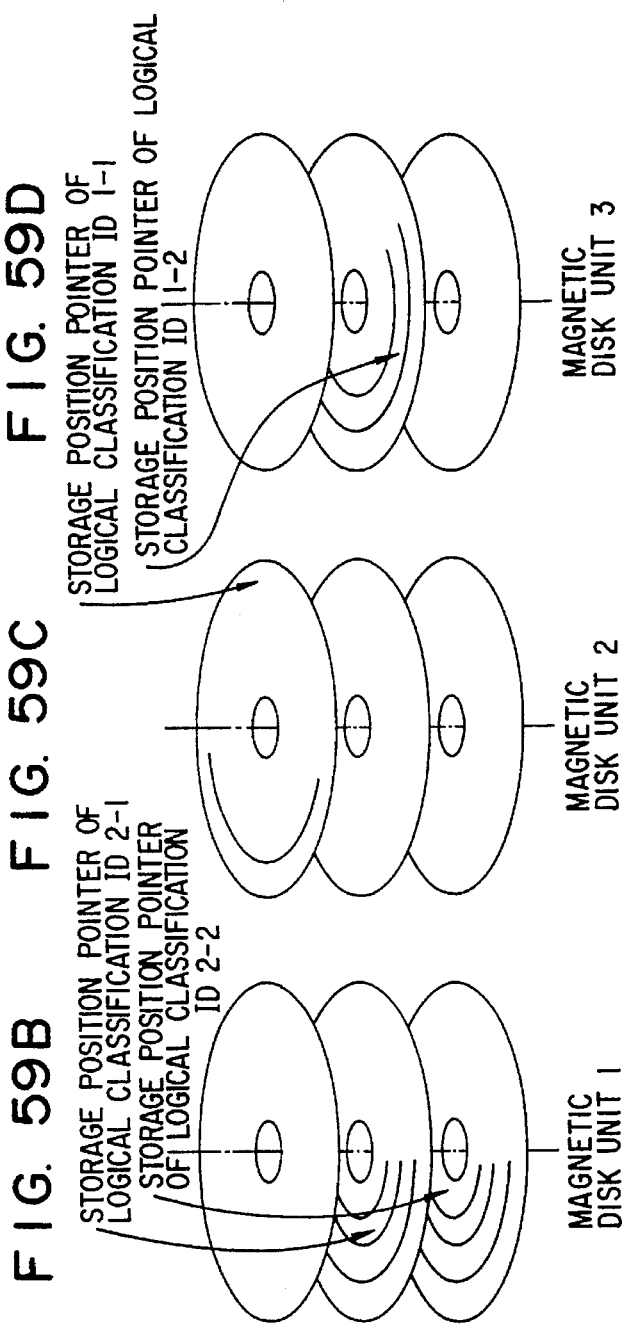

FIG. 60A
| FILE ID | | DISK NO. | CYLINDER NO. | TRACK NO. | SECTOR NO. | POSITION IN SECTOR | FILE SIZE | OVERLAID NUMBER |
|---|---|---|---|---|---|---|---|---|
| 1 | 1 | 1 | 1 | 1 | 1 | 1 | 2000 | 1 |
|   |   | 2 | 1 | 1 | 1 | 4 | 465 | 2300 | 1 |
|   |   | 3 | 1 | 1 | 1 | 9 | 205 | 2500 | 1 |
|   |   | 4 | 1 | 1 | 1 | 14 | 145 | 2200 | 1 |
|   |   | 5 | 1 | 1 | 1 | 18 | 297 | 2400 | 1 |
| 1 | 2 | 1 | 1 | 201 | 1 | 1 | 1 | 2200 | 1 |
|   |   | 2 | 1 | 201 | 1 | 5 | 153 | 2500 | 1 |
| 2 | 2 | 1234 | 1 | 680 | 2 | 34 | 349 | 2000 | 1 |
FIG. 60B  FIG. 60C  FIG. 60D
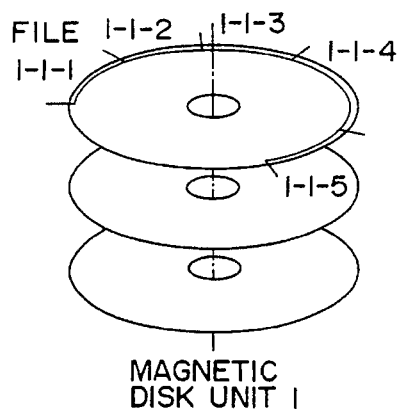
MAGNETIC DISK UNIT 1
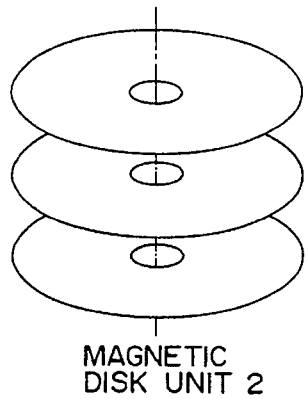
MAGNETIC DISK UNIT 2
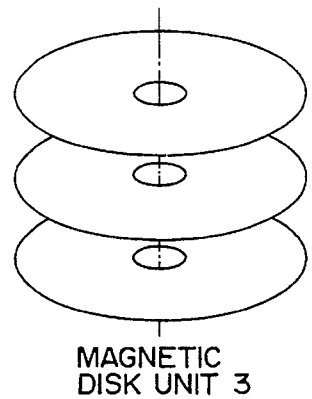
MAGNETIC DISK UNIT 3

HIERARCHICAL PRESEARCH TYPE TEXT SEARCH METHOD AND APPARATUS AND MAGNETIC DISK UNIT USED IN THE APPARATUS

This is a continuation of application Ser. No. 07/555,483 filed on Aug. 9, 1990, now U.S. Pat. No. 5,168,533, and International Application PCT/JP90/00774 filed on Jun. 14, 1990 and which designated the U.S. application Ser. No. 01-188772 filed on Jul. 24, 1989, in Japan, application Ser. No. 01-188773 filed on Jul. 24, 1989, in Japan, and application Ser. No. 01-231567 filed on Sep. 8, 1989 in Japan. The certified copies were filed in the PCT International Application.

TECHNICAL FIELD

The present invention relates to an information retrieval system and, particularly, relates to a scanning-type full text search method and system. More in particular, it relates to a document search method and apparatus suitable for preventing omission in search caused by differences in synonyms and notations at the time of searching using non-controlled key words (called free words). The present invention provides a method and apparatus suitable for collectively judging whether or not a plurality of term sets exist in a character stream to be searched. Further, the invention provides a collective type magnetic disk unit having a large storage capacity suitable for enforcement of the aforementioned method and suitable for writing and reading in a short time and a collective type magnetic disk device adapted for continuous writing and reading of a plurality of files.

BACKGROUND ART

In recent years, importance of large-scale data base service including not only secondary information (bibliographic information), such as literature information, patent information and the like, but primary information (text information) have become greater. Heretofore, a method using key words or classification codes has been used for retrieving information in such a data base (hereinafter sometimes abbreviated to "DB").

Key words are selected from a collection of control terms (called "thesaurus") by a specialist who conducts key word provision (called "indexing") at the time of registration of information into a data base. On the other hand, a DB searcher employs a system in which key words are selected from the thesaurus to perform search. However, the key word provision work includes very troublesome work. In short, a vocabulary suitable for expression of the contents of a document to be registered must be selected from the thesaurus after reading the contents thereof. If indexing is unsuitable, accurate information cannot be acquired from the data base. Accordingly, there arises a problem in that the indexing requires a specialist having special knowledge of contents of documents and being well versed in vocabulary registered in the thesaurus. Further, there arises a problem in that requested documents cannot be called or unnecessary texts may be mixed in the called documents if suitable vocabulary according to the thesaurus cannot be designated as key words at the time of searching.

Further, the classification system in the thesaurus always changes with the passage of time. There arises a problem in that key words and classification codes must be always updated.

Further, since a large time is required for indexing, new documents collected by considerable quantities must be registered by batch processing. Accordingly, there arises a problem in that search-enabled information is always a predetermined time behind the present time. In such circumstances, with the spread of DB, provision of a system in which everyone, not only a specialist in DB, can conduct both document registration and document retrieval easily by using free words (also called "non-controlled words") with no restraint of the thesaurus has been desired.

With the increase in data base scale, it becomes impossible to describe contents of documents fully in detail by use of only the control words in the thesaurus. Accordingly, the number of documents which can be narrowed down by retrieval using key words is limited to a range from the order of tens to the order of hundreds. To find a target one from the documents, there is no method but a method of reading the contents thereof directly. This causes a serious problem in search efficiency.

Attempts of automatic summarizing and automatic indexing have been made counter to the problem in the present searching method based on the indexing using control words in the thesaurus. However, the problem is not yet substantially solved because Japanese requires various dictionaries for the reason of its linguistical difficulty.

Omission in search may often arise in the searching process using such free words because of differences in notation or expression, though both a search term as a key word designated by the user and a target term used in the DB have one meaning. For example, the term "ピアノ (piano; katakana)" may be represented as "ピヤノ (piyano; katakana)", or the term "インターフェイス (intāfeisu; katakana)" may be represented as "インタフェース (intafēsu; katakana)", "インタフェイス (intafeisu; katakana)" or "インーフェース (intāfēsu; katakana)".

Hence, search for desired information often becomes impossible because of fine differences between variations in syllabic notation as described above.

Hereinafter, development into terms different in notation is called "different notation development". Development into other terms by use of a dictionary is called "synonym development". The concept "terms different in notation" is called "different notation".

As means for thoroughly solving these problems, there has been proposed a full text search system in which the searcher can search for the contents of documents on direct reference to the texts of the documents based on free key words (called "free words" or "non-controlled words").

In the following, the proposed system is described with reference to a typical example of construction thereof as shown in FIG. 1.

A search system 101 is connected to a host computer and performs both reception of a search request and transmission of a search result through a communication circuit. When a search request 107 is issued from the host computer, a search controller 103 accepts it, analyzes it and then sends corresponding search control information 108 to both a term comparator 105 and a query resolver 104. Further, the search controller 102 controls a storage controller 103 so that term data (text data) 111 stored in a search data base 106 are transferred to the term comparator 105.

The term comparator 105 makes a comparison between input term data and preliminarily set search terms (key words). When a matched term is detected, the term comparator 105 sends detection information 110 to the query resolver 104. The query resolver 104 judges whether or not the detection information 110 satisfies a complex condition pertaining to the positional relation, co-existence relation and the like between terms described in the search request. When it satisfies the complex condition, identification information for corresponding document data, as well as the content of the document as a search result 109, is returned to the host computer.

An example of such a prior art is described in the reading, R. L. Haskin and A. Hollaar: "Operational Characteristics of a Hardware-Based Pattern Matcher", ACM Trans. on Database System, Vol. 8, No. 1, 1983.

As a term comparison method in the term comparator 213 which is an important part of the term search system 200, a method of retrieving a plurality of terms by one scanning by use of a finite-state automaton is known. A typical example of the method is disclosed in the reading, A. V. Aho and M. J. Corasick: "Efficient String Matching", CACM, Vol. 18, No. 6, 1975.

Two methods for generating an automaton and a string matching method using the automaton are described in the aforementioned reading. In the following, the methods are described.

A first one of the methods (hereinafter referred to as "conventional method 1") will be now described with reference to FIG. 2. The drawing shows automaton state transition for searching term data for a key word "インタフェース (intafēsu; katakana)" given by a user. In the drawing, the circles represent automaton states, and the arrows represent state transitions. Respective characters given to the arrows represent input characters when state transitions corresponding to the arrows occur. In the case of representing negation, for example, in the case of representing characters other than "ン (n; katakana)" and other than "イ (i; katakana)", such negation is expressed with a negation symbol "¬" added to the characters to be denied, for example, as ¬{"ン", "イ"}. The arrow 403 represents a starting state in which state transition starts. Numerical values given to the inside of the circles represent state numbers. The double circle represents an ending state in which comparison of "インタフェース (intafēsu; katakana)" is finished. This method is characterized in that state transitions corresponding to all input characters having a possibility to be inputted are described by an automaton. Therefore, the number of state transitions increases. Accordingly, there arises a problem in that a very large time is required for generating an automaton when the number of key words increases.

In the following, the term comparing operation in the conventional method 1 is described with reference to the drawing. When a character is inputted into the automaton, a token is placed to reveal the state in which comparison of the input character is to be made. In short, the token is a mark for indicating the transit state position in the automaton. First, the token is initialized to be placed in the state 0 as a starting state. In this example, the token moves to the state 1 when the input character is "ン (i; katakana)". When, on the contrary, a character other than "イ (i; katakana)" enters, the token moves to the sate 0. When, on the other hand, the token is in the state 1 and the input character is "ン (n; katakana)", the token moves to the state 2. When the input character is "イ (i; katakana)", the token moves to the state 1. When the input character is not "イ (i; katakana)" and not "ン (n; katakana)", the token moves to the state 0. When the token is in the state 2 and the input character is "タ (ta; katakana)", the token moves to the state 3. When the input character is "イ (i; katakana)", the token moves to the state 1. When the token is in the state 3 and "フェース(fēsu; katakana)" enters, the token successively moves to the state 4, the state 5, the state 6 and the state 7. The double circle is given to the state 7, so that comparison of the term インタフェース (intafēsu; katakana)" is perfected.

Because state transitions corresponding to all input characters having a possibility to be inputted must be described in the automaton in the conventional method 1, the number of state transitions increases as the number of key words increases. Accordingly, there arises a problem in that a very large time is required for generating an automaton. Hardware for putting the method into practice has been disclosed in Japanese Patent Unexamined Publication No. Sho-60-105040.

In the following, a second method (hereinafter referred to as "conventional method 2") is described. The conventional method 2 is designed to shorten the time required for generating an automaton, compared with the conventional method 1. The automaton generation time in the conventional method 2 is improved greatly to be one-third as long as that in the conventional method 1. The conventional method 2 has been described in detail in Japanese Patent Unexamined Publication No. Sho-63-311530. The conventional method 2 is described now with reference to FIGS. 3 and 4. FIG. 3 shows state transition in the automaton in the case where the same term "インタフェース (intafēsu; katakana)" as in FIG. 2 is compared. The token is initialized to be placed in the state 0 as a starting state. When a character "イ (i; katakana)" enters, the token moves to the state 1 after comparison is made in the state 0 in which the token is placed. When, on the contrary, a character other than "イ (i; katakana)" enters, the token moves to the state 0.

When the token is in the state 1 and a character "ン (n; katakana)" enters, the token moves to the state 2. When the token is in the state 2 and a character "タ (ta; katakana)" enters, the token moves to the state 3. When the token is in the state 3 and a character (for example, "イ (i; katakana)") other than "フ (fu; katakana)" described in the automaton enters, a failure function is established in the conventional method 2 so that reference to a failure function table as shown in FIG. 4 is made. Number of state effected by failure, to be re-compared with the number of the state in which the token is placed, is stored in the failure function table. In this example, the value 0 of state effected by failure, corresponding to the current state number 3, is obtained, so that the token moves to the state 0. In the state 0, comparison of the input character "イ (i; katakana)" is made to thereby move the token to the state 1. The aforementioned function is called "failure function". When a string of characters " (ntafēsu; katakana)" enter one by one, the token successively moves to the state 2, the state 3, the state 4, the state 5, the state 6 and the state 7. The double circle is given to the state 7, so that comparison of the term "インタフェース(intafēsu; katakana)" is perfected.

When, for example, the term "インタフェース (intafēsu; katakana)" is given as a key word, the term may be described in the text by different notation as a term different from the search term designated by the user.

In the text, the term "インタフェース (intafēsu; katakana)" using "- (minus sign)" instead of "— (prolonged sound symbol)" may be used (this is called "prolonged sound different notation") or the term "インターフェース (intafēsu;

katakana)" additionally using "—" may be used (this is called "presence or absence of prolonged sound") or the term "インタフェイス (intafeisu; katakana)" using "フェイ (fei; katakana)" instead of "フェー(fē; katakana)" may be used based on difference in pronunciation (this is called "phonetic different notation").

To search for all the terms, nine terms, that is,

"インタフェース (intafēsu; katakana)", "インターフェース (intāfēsu; katakana)", "インタフェイス (intafeisu; katakana)", "インターフェイス (intāfeisu; katakana)", "インタ-フェイス (intāfeisu; katakana)", "インタフェ-ス (intafēsu; katakana)", "インターフェ-ス (intāfēsu; katakana)", "インターフェ-ス (intāfēsu; katakana)" and "インタ-フェース (intāfēsu; katakana)" formed by combination of these different notations must be all recognized as key words.

The aforementioned example is explained with reference to FIGS. 5 and 6. FIG. 5 is a view of automaton state transition in the case where term data are compared with the nine terms written in different notations.

Comparison is started from the head of the key word, so that the state branches off and leads to another state when there is difference in transition character.

When, for example, "インタフェース (intafēsu; katakana)" and "インターフェース (intāfēsu; katakana)" are subjected to comparison successively from the head of the key word, the two are the same till "インタ (inta; katakana)" and the two are different in transition character between the next characters "フ (fu; katakana)" and "—". Therefore, there occurs branching of state transition that the state is transited from state 3 to sate 22 at the transition character "フ (fu; katakana)" and the state is transited from state 3 to state 4 at the transition character "—".

In short, because respective transit states are assigned to different transition characters in a certain state, the automaton is shaped like a tree. FIG. 6 is an explanatory view of a failure function table showing transition in the case where a character not described in the automaton enters. When comparison including different notation is made as described above, there arises a problem in that the number of states increases because the number of key words increases.

Further, don't care characters may be used in key words in term retrieval. An example of use of fixed-length don't care characters in key words is explained with reference to FIGS. 7 and 8. FIG. 7 shows automaton state transition in the case where a key word "A?B" including a don't care character "?" having the fixed length of one character is retrieved. FIG. 8 is an explanatory view of a failure function table for indicating the number of state effected by failure in the case where a character not described in the automaton enters.

In this example, an automaton is generated by use of one-byte character codes (JIS codes). "?" is a character symbol which is allowed to satisfy an arbitrary character or symbol. Accordingly, transition based on a don't care character "?" is shown as transition based on all character codes 00–FF in the case where the state 1 in the drawing is a current state. In short, "A?B" shows a designation for retrieving terms composed of a head character "A", an arbitrary character and an ending character "B".

There arises a problem in that the number of states in the automaton increases greatly in spite of such a simple retrieval condition when fixed-length don't care characters enter.

As a method for solving the problem pertaining to different notation and synonym, Japanese Patent Unexamined Publication No. Sho-62-011932 has been proposed. In this quatation, different notation development is called "different notation generation" and synonym development is called "synonym extraction".

FIG. 9 is a block diagram showing an example of construction of the quotation.

In the construction, a search term written in romaji or katakana is once converted into a term written in katakana by a standard notation. In short, a standardizing process to collect a plurality of notations into one is first carried out by the operation reverse to the different notation generation. On the other hand, a search term written in alphabets is generalized to expression in katakana by borrowed word/kana conversion.

The katakana term thus once standardized is subjected to synonym development by use of a synonym dictionary, so that words synonymous to the input katakana term are sent out as katakana terms. After synonym extraction, the katakana terms are subjected to kana/kanji conversion, kana/borrowed word conversion and kana/romaji conversion to form kanji terms, alphabet terms of foreign origin and romaji terms, respectively.

As described above, the katakana terms as the result of synonym extraction are respectively converted into kanji, romaji, katakana and alphabet terms to thereby carry out different notation development.

In the conventional term search system 101 as shown in FIG. 1, a magnetic disk device capable of storing a large quantity of data is required as a search data base 106 which is one of constituent members of the term search system 101. A general magnetic disk device has a problem in that high-speed data input/output is impossible. On the other hand, a multi-head magnetic disk device in which high-speed data input/output is possible has a problem in that the device is very high in cost.

Therefore, a collective-type magnetic disk unit formed by connecting a plurality of general low-cost small-size magnetic disks to improve data input/output speed has been considered. As one of this type disk units, a "picture data division storage" is disclosed in Japanese Patent Unexamined Publication No. Sho-60-117326.

This unit has a plurality of magnetic disk devices, magnetic disk controllers in the same number as the magnetic disk devices, and a master controller for controlling data transmission between an input/output buffer and an external device. In the master controller, data given from the external device are divided into a quantity not more than the capacity of the input/output buffer. The divided data are successively transferred to the respective magnetic disk controllers. The magnetic disk controllers serve to write the data in corresponding magnetic disk devices, respectively. The master controller gives a seek instruction to magnetic disk controllers corresponding to magnetic disk devices free from the writing operation, to omit the apparent seek time of data-storage magnetic disk devices on and after the second magnetic device to thereby shorten data write/read time.

When the conventional search system as shown in FIG. 1 is applied to large-capacity database search, the following problems arise.

A first problem is in search time. When, for example, full text search is applied to 20000 documents having a capacity of 20 KB per document, 400 MB data must be scanned.

If data processing is carried out by the steps of: storing the 40 MB text data in the search data base; reading the data at a mean effective speed of about 1 MB/s; and performing comparison in the term comparator at the same speed, it takes about 7 minutes to perfect the search. There arises a problem in that the time required for reading the text data is too long to bear practical use when general magnetic disk devices are used. In short, it is necessary that the reading speed in the search data base for storing the text data is improved to the same degree as the processing speed in the term comparator. Here is a first object of the invention.

Even though the reading speed in the search data base is improved to the same degree as the processing speed in the term comparator or in other words even though the reading speed is improved to 10 MB/s, it takes still 40 seconds to perfect the scanning of the 400 MB text data. To shorten the search time to a practically allowable value of the order of several seconds is a second problem of the invention.

In respect to the technique for improvement in search speed, a "term search method" has been proposed in JP-A-62-241026. In the "term search method", a "table of distribution of frequency in use of characters" is generated by examining frequency in use of characters from the contents of text (called "data") in advance, in order to improve the processing speed in the process of searching a text data base (called "file") for a designated term.

The proposed method has the steps of: performing test search with reference to the "table of distribution of frequency in use of characters" with use of a character of lowest frequency in the key word designated by the user as a key; and performing comparison on characters before and behind the character if the character satisfies a specific condition.

Further, the JP-A-62-241026 has described that retrieval can be finished without text search in the case where the character of lowest frequency in the key word has a frequency of zero in the "table of distribution of frequency in use of characters".

In short, according to the JP-A-62-241026, the number of wasteful character comparisons can be reduced, thus to attain an effect that the search processing speed is improved.

However, the method is designed to generate a "table of distribution of frequency in use of characters" in the whole of a data base (file) to thereby search the data base for a text file (data) based on the table (refer to the drawing). Accordingly, the method has an effect in efficiency in search processing in the case where a key word pertaining to characters absent in the data base is retrieved. In general, the number of characters absent in the data base is reduced as the scale of the data base increases. There arises a problem in that the effect of the method in search processing disappears.

To solve the aforementioned problem in order to enforce efficient search processing to make equivalently high-speed full text search possible is the second object of the invention.

On the other hand, in full text search using free words, a difference in expression may arise between the key word designated by the searcher and the term described in the text though they are the same in meaning. In this case, documents having a different expression form are omitted from search to make it impossible to retrieve target documents. Examples of such terms are synonyms, different-form words (called "different notation words" or "different notation"), and the like.

Examples of words synonymous to "計算機 (keisanki; kanji)" are "電子計算機 (densikeisanki; kanji)", "電算機 (densanki; kanji)", "Computer", and the like. Examples of different notations with respect to "コンピュータ (konpyuta; katakana)" are "コンピューター (konpyutā; katakana)", "コンピュータ (konpyuta; katakana)",
"コンピューター (konpyutā; katakana)",
"コンピューター (konpyutā; katakana)",
"コンピュータ (konpyuta; katakana)",
"コンピューター (konpyutā; katakana)",
"コンピュータ (konpyuta; katakana)", "コンピュ-タ- (konpyuta; katakana)", "コンピュ-タ (konpyuta; katakana)",
"コンピュ-タ- (konpyutā; katakana)", "コンピュ-タ (konpyuta; katakana)", "コンピュ-タ- (konpyutā; katakana)",
"コンピュ-タ (konpyuta; katakana)", "コンピュ-タ- (konpyuta; katakana)", and the like. Examples of different notations with respect to "Computer" are "computer", "COMPUTER", and the like. To cope with the problem in difference in notation between the key word designated by the user and the term described in the text of the document, the searcher must conduct search after designating all synonyms and different notations. However, it is practically difficult that the searcher designates all different notations, because hundreds of different notations may exist. To solve the problem is a third object of the present invention.

In the conventional method, expected development results in most cases cannot be attained, because information in an original term is changed at the time of the standardizing of notation.

This fact is explained with reference to the rule of partial term conversion from "ホオ (hoo; katakana)" to "ホウ (hou; katakana)" to standardize katakana notation. When the conversion rule is applied, the term "ジョウホオ (jouhoo; katakana)"
However, when the same conversion rule is applied to a given term "ジョウホオン (jouhoon; katakana)"
the term is standardized to a false term "ジョウホウン (jouhoun; katakana)"
This has an influence on both synonym development process after the standardizing process and different notation development process following the synonym development process, so that expected development results cannot be attained.

One object of the present invention is to attain expected development results without performing the aforementioned standardizing process.

In the aforementioned quotation, the key word synonym development from "計算機 (keisanki; kanji)" to "コンピュータ (konpyuta; katakana)" based on a synonym dictionary is made by the steps of: converting once the search key word designated by the user into a katakana term; making the katakana term be subject to synonym development; and then making the resulting term be subject to kana/kanji conversion, kana/romaji conversion and kana/foreign language conversion. Therefore, the synonym dictionary must have an ability of development from katakana term to katakana term. In short, synonyms must be always written in katakana as follows.

Headword: "コンピュータ ( konpyuta; katakana)"
Synonym 1: "ケイサンキ (keisanki; katakana)"
Synonym 2: "ジョウホオショリソウチ (jouhoushorishouchi; katakana)"

This causes a problem in that the scale of the dictionary is enlarged, because output terms having an expression form corresponding to the synonym development must be registered in both the kana/kanji conversion dictionary and kana/borrowed word conversion dictionary. A large number of homonyms exist in the Japanese language. This causes failure in synonym development. For example, the term "ケイサク (kensaku; katakana)" can be interpreted as "検索 (kensaku; kanji)" or can be interpreted as "研削 (kensaku; kanji)". There arises a problem in that the distinction between the two words cannot be recognized by the synonym dictionary using only katakana notation. Further, there arises a problem in that homonym selection in katakana/kanji conversion after synonym development is made by interactive processing.

Further, a foreign language/kana conversion dictionary, a kana/kanji conversion dictionary and a kana/foreign language conversion dictionary are required for converting the search key word into katakana and converting the katakana word into a suitable-form word after synonym development. There arises a problem in that a great deal of labor is required for generation and maintenance of dictionaries, because a great variety of large-scale dictionaries must be used.

In short, the third object of the invention is to solve the problem in homonyms at the time of kana/kanji conversion and kana/foreign language conversion and solve the problem in generation and maintenance of large-scale dictionary used for the aforementioned conversion.

In the case where hundreds of synonyms and different notations are considered as key words in retrieval, a term comparator for collectively comparing these words is required. When retrieval is made under the consideration of synonyms and different notations with no use of the term comparator, the search time increases by hundreds of times so that it cannot bear practical use. A fourth object of the present invention is to provide a term comparator in which search processing can be made with no reduction of the comparison speed even though hundreds of key words are designated.

In the conventional search method using an automaton, all key words including different notations are listed and developed. Further, an automaton is generated based on the key words. Because the automaton thus generated is shaped like a tree, a very large number of automaton states are required.

In the case of retrieval with don't care character designation, all combinations of character codes allowed by don't care characters are listed and developed into key words. Because the automaton is generated based on the key words, a very large number of automaton states are required similarly to the case of different notation.

As described above, the increase in the number of automaton states causes the increase in automaton generation time and, accordingly, the increase in the capacity of a transition table for storing the automaton, that is, the increase in hardware.

An object of the invention is to provide a search method using an automaton in which the number of states is reduced by describing collectively transition in the automaton in the case where retrieval is made under the consideration of different notations and with designation of don't care characters to thereby shorten the automaton generation time, and in which the capacity of a state transition table is reduced to thereby attain retrieval by compact hardware.

When document data are further successively registered in the text data base, the capacity of the magnetic disk device which forms a search data base becomes full at a certain point of time. In this case, it is necessary that the storage capacity of the system can be enlarged with no losing the stored data. In the case where the capacity of the search text data base is enlarged to a capacity for 100000 texts, that is, a capacity for 4 GB, processing time increases as the storage capacity of the magnetic disk device is enlarged. Accordingly, the original object cannot be attained. Therefore, it is necessary to enlarge the scale of the storage capacity with no deterioration in search time.

A fifth object of the invention is therefore to provide a search system having an architecture satisfying such a requirement.

In the search data base in the term search system, there are three important factors, namely, large storage capacity, continuous high-speed input/output of a plurality of files, and low cost. A collective-type magnetic disk unit satisfying these factors has been desired.

The conventional technique is designed to shorten data write/read time merely through omitting apparently access time of seek time. In short, there is no consideration of the number of magnetic disk devices required corresponding to the data transfer rate necessary for an external device. Accordingly, the conventional technique has a problem in the viewpoint of cost performance.

The conventional technique has an effect in that access time can be saved in the case where a file large in size of data such as picture data is stored separately in a plurality of magnetic disk devices. However, the conventional technique has a problem in that the access time becomes equal to the access time in one magnetic disk device in the case where writing/reading is carried out with respect to a file small in data size which can be stored in one magnetic disk device, because seek time cannot be omitted in this case.

Further, in the conventional technique, there is no consideration of continuous writing/reading with respect to a plurality of files. Accordingly, a write/read instruction from a higher-rank apparatus can be processed with respect to only one file. In access to a plurality of files, the file processing with respect to one file must be repeated. There arises a problem in that a large overhead time is required for the repetition.

As one component of the overhead time, there is the processing time required for retrieving information pertaining to magnetic disk device storage position from file identification codes to designate files as targets of access from the higher-rank apparatus.

In a conventional general magnetic disk device, a file identification code is expressed by a file name constituted by a string of character codes such as ASCII codes. Physical storage position must be found through retrieving file management information stored in the file management information area of the magnetic disk device, based on the file name. There arises a problem in that the processing time required for it is large.

An object of the invention is therefore to provide a low-cost collective-type magnetic disk unit which has such a large storage capacity that continuous high-speed input/output with respect to a plurality of files can be attained regardless of the size of the files.

On the other hand, document information is constituted by not only text data but graphic data such as pictorial data, photographic data, and the like. Accordingly, it is necessary to answer the requirement that the retrieved document can be seen in print image. A sixth object of the invention is to provide a search system having an architecture which can answer the requirement.

Further, the text data base is provided to be shared to a plurality of users. For example, it is necessary to make access to the text data base from a conversation-type workstation through LAN (local area network). Accordingly, the search system must have a function connected to the LAN to answer search requests from other workstations. A seventh object of the invention is to provide a full text search system having the aforementioned function.

A final object of the invention is to provide a full text search system which can answer the aforementioned problems.

DISCLOSURE OF INVENTION

To solve these problems, the following means are used in the text search system provided according to the present invention.

First, a search data base constituted by a plurality of magnetic disk devices is used in order to increase the reading speed of the search data base (storing text data) to the same degree as the processing speed of the term comparator. In short, a high reading speed is attained by a multiplex output obtained by simultaneously driving the magnetic disk devices in parallel.

According to the present invention, the collective-type magnetic disk unit comprises a plurality of data storages having magnetic disk devices, an input/output buffer for temporarily storing input/output data of the data storages, and a multi-disk controller for performing control of the data storages and the input/output buffer.

Further, each data storage may be constituted by a magnetic disk device provided with a magnetic disk controller or may be constituted by a plurality of magnetic disk devices provided with magnetic disk controllers, and a multiplexer for selecting magnetic disk devices.

Further, the input/output buffer has at least a capacity corresponding to one cylinder of a magnetic disk device, per data storage. The input/output buffer is constituted by one semiconductor memory or two semiconductor memories.

The semiconductor memory used may be replaced by other high-speed storage devices such as optical memories or the like.

The multi-disk controller for performing control of the data storages and the input/output buffer is constituted by a communication memory using a semiconductor storage device for storing requests from higher-rank apparatus, a multiplex controller for performing control of data transfer, a physical information table using a semiconductor storage device for retrieving physical storage position in the respective magnetic disk device, and a master controller for controlling these constituent parts. The semiconductor storage device used in both the communication memory and the physical information table may be replaced by other high-speed storage devices such as optical memories or the like.

The master controller is constituted by a micro-computer to control the constituent parts.

As file identifiers, logical classification identifiers (called "ID") constituted by logical classification file identification codes given to files when files are logically classified into hierarchical groups and file IDs constituted by special numbers in the logical classification are used in the multi-disk controller.

The multi-disk controller may be designed so that a structure definition table for storing management information for determining the physical file storage position of the respective magnetic disk device according to the logical classification ID in the file ID is placed in the memory in the master controller.

The multiplex controller for performing control of data transfer between the higher-rank apparatus and the input/output buffer is constituted by a multiplexer for selecting a data bus of the input/output buffer, a DMA controller for performing data transfer regardless of the mater controller, a top address registration table for registering the top address of the data-transfer-requested area of the input/output buffer, and an end address registration table for registering the end address thereof.

Assuming now that the number of data storages is n; the data transfer rate from a magnetic disk device of a data storage to the input/output buffer is t [Byte/sec] when seeking operation is unnecessary because transfer data in the magnetic disk device exist in one track; the one-cylinder capacity of the disk device is M [Byte]; the minimum seek time of the magnetic disk device is s [sec]; the revolution velocity of the magnetic disk device is R [rps]; and the capacity of the output buffer is the same as the one-cylinder capacity M [Byte] of the magnetic disk device, then the data transfer rate from the collective-type magnetic disk unit to the higher-rank apparatus must satisfy the following condition.

When the minimum seek time s [sec] of the magnetic disk device is larger than the time (M/T) [sec] required for transferring one data of M [Byte] from the input/output buffer to the higher-rank apparatus, the data transfer time from the data storage to the output buffer is represented by the sum of the minimum seek time s [sec] of the magnetic disk device, the maximum rotation wait time (I/R) [sec] of the magnetic disk device, and the data transfer time (M/T) [sec] from the data storage to the input/output buffer. Accordingly, it is necessary that the sum is within the time (nM/T) [sec] required for transferring all data from the input/output buffer to the higher-rank apparatus.

This can be represented by the following equation.

$$s + \frac{1}{R} + \frac{M}{t} \leq n \frac{M}{T}$$

Accordingly, the number, n, of the data storages can be represented by the following equation.

$$n \geq T \left\{ \frac{1}{t} + \frac{1}{M} \left( s + \frac{1}{R} \right) \right\} \quad (1)$$

When the minimum seek time s [sec] of the magnetic disk device is smaller than the time (M/T) [sec] required for transferring one data of M [Byte] from the input/output buffer to the higher-rank apparatus, data transfer from the data storage to the input/output buffer is not allowed because the data transferring operation of the input/output buffer is not yet finished though the seeking operation of the magnetic disk device is finished. Therefore, it is necessary to wait for perfection of data transfer from the input/output buffer to the higher-rank apparatus. In short, the data transfer time from the data storage to the output buffer is represented by the sum of the data transfer rate (M/T) [sec] from one input/output buffer to the higher-rank apparatus, the maximum rotation wait time (I/R) [sec] of the magnetic disk device, and the data transfer time (M/t) [sec] from the data storage to the input/output buffer. Accordingly, it is necessary that the sum is within the time (nM/T) [sec] required for transferring all data from the input/output buffer to the higher-rank apparatus. This can be represented by the following equation.

$$\frac{M}{T} + \frac{1}{R} + \frac{M}{t} \leq n \frac{M}{T}$$

Accordingly, the number, n, of the data storages can be represented by the following equation.

$$n \geq 1 + T\left(\frac{1}{t} + \frac{1}{RM}\right) \qquad (2)$$

By providing a collective-type magnetic disk unit constituted by the minimum number of data storages satisfying these conditional equations, a magnetic disk unit which is so excellent in cost performance that the data transfer rate required by the higher-rank apparatus can be satisfied can be provided.

The data storage serves to store data files. By providing a data storage constituted by a magnetic disk device having a magnetic disk controller, data write/read control on magnetic disks can be carried out by the magnetic disk controller so that the processing load on the multi-disk controller can be reduced. Further, by providing a data storage constituted by a plurality of magnetic disk devices, and a multiplexer for selecting a data bus of the respective magnetic disk device to connect the data bus to the data bus of the input-out buffer.

The input/output buffer serves to temporarily store the input/output data of the data storages.

In the case of data writing, data are successively transferred from the higher-rank apparatus to the input/output buffer at a higher rate than the writing rate of the magnetic disk device in the data storage. The input/output buffer in which data transfer is finished serves to write data in the magnetic disk device at the writing rate of the magnetic disk device. In the case of data reading, the respective magnetic disk device performs data reading to the input/output buffer at the reading rate of the magnetic disk device. The input/output buffer in which data reading is finished performs data transfer to the higher-rank apparatus at a higher rate than the reading rate of the magnetic disk device. In short, the input/output of data with respect to the higher-apparatus can be made at a higher rate than the writing/reading rate of the magnetic disk device.

Further, by providing two input/output buffers corresponding to one data storage, data writing/reading between a second input/output buffer and the data storage can be made while data transfer between a first input/output buffer and the higher-rank apparatus is made. Accordingly, the wait time of the magnetic disk device in which the data transferring operation of the magnetic disk device is stopped till perfection of data transfer between the input/output buffer and the higher-rank apparatus can be reduced, so that writing/reading can be carried out in a short time. The condition necessary for providing a magnetic disk unit excellent in cost performance to satisfy the data transfer rate required by the higher-rank apparatus can be represented by the equation (1).

The multi-disk controller serves to perform control of the data storages and the input/output buffers according to the data file write/read request issued from the higher-rank apparatus. When the communication memory is constituted by a semiconductor device capable of storing file IDs of target files, the overhead time required for reporting acceptance of an instruction from the higher-rank apparatus and perfection of processing can be reduced, so that continuous writing/reading on data files can be carried out in a short time.

When the physical information table is constituted by a semiconductor storage device capable of short-time access, the physical storage position of the magnetic disk device can be calculated in a short time from the physical file IDs. Accordingly, the overhead time required for reading data files can be reduced.

In the conventional technique, files stored in the magnetic disk device are identified by file names constituted by a variable-length string of character codes. According to the present invention, file IDs are constituted by a fixed length string of digit codes. Accordingly, the respective file ID can be expressed by a small-size code, so that designation of data files to be used for writing/reading and detection of the physical storage position can be simplified. Consequently, the overhead time required for the procedures can be shortened.

In the case where data files are stored, the seek time can be shortened by approaching the physical storage positions of files having relation logically to each other. Accordingly, the access time can be shortened.

The multiplexer in the multiplex controller serves to select the data bus of the input/output buffer. The top address registration table and the end address registration table store top addresses and end addresses for indicating storage areas of necessary data among data stored in the input/output buffer. The DMA controller serves to transfer data in areas of the input/output buffer designated by the top address registration table and the end address registration table, to the higher-rank apparatus at a high speed regardless of the master controller.

In the case where a plurality of files to be read exist in one cylinder of the magnetic disk device, the average rotation wait time is (½R) sec and the condition that the time required for reading the files at once is shorter than the time required for reading the files one by one can be represented by the equation $$s + \frac{1}{2R} + \frac{f1 + k + f2}{t} \leq \left(s + \frac{1}{2R} + \frac{f1}{t}\right) + \left(\frac{1}{2R} + \frac{f2}{t}\right)$$

in which f1 [Byte] and f2 [Byte] represent sizes of necessary files to be read, k [Byte] represents the total size of unnecessary files not to be read, t [Byte/sec] represents the reading rate of the magnetic disk device, R [rps] represents the revolution speed of the magnetic disk device, and S [sec] represents the average seek time of the magnetic disk device.

The equation can be rewritten easily as follows.

$$k \leq \frac{t}{2R} \qquad (3)$$

When the conditional equation is satisfied, the multiplex controller serves to read unnecessary files to the input/output buffer once and remove the unnecessary file portion at the time of data transfer to the higher-rank apparatus to thereby transfer only the necessary portion. Accordingly, the magnetic disk can read a plurality of files at once by one reading process, so that the access time produced in the reading process can be shortened.

Secondly, a term comparator which mounts hardware (called "search engine") exclusively used for term comparison based on a finite-state automaton method is used. The hardware exclusively used for term comparison makes it possible to retrieve about thousand key words collectively with no reduction of comparison speed.

To attain the foregoing object, a different notation search automaton is formed by making an automaton transition branch at the top of a partial term of a key word in which different notations and by collecting the branch transitions at the end thereof to thereby reduce the number of states. A don't care character designation search automaton is formed in the same manner as the different notation search automaton. In short, a don't care character designation search automaton is formed by making an automaton transition branch at a don't care character with regarding a group of characters group allowed by the don't care character as different notations and by collecting the branch transitions thereof at one state to thereby reduce the number of states.

As a result, a compact search system in which the time for generating the automaton is shortened and in which allowance of the state transition table can be reduced is provided.

An automaton generating method used as means for solving the problem in the increase of automaton states is now explained. The method is different from the conventional method 2 in the following points. In short, because the conventional method 2 uses "failure process", an automaton having branch state transitions like a tree must be generated for the necessity of calculating state effected by failure. Accordingly, the number of states increases. However, because the present method does not require "failure process", not only the number of state transition branches can be reduced but state transitions can be collected so that transit state can be shared. Accordingly, the number of states is reduced. (Hereinafter, the automaton generated by the present method is called collective transition allowance automaton.)

In the following, a method for collecting state transitions is explained.

FIG. 46 shows state transition in the automaton generated by the present method.

The automaton in the drawing is provided for retrieval with respect to the same nine key words as in the automaton shown in FIG. 5, namely, "インタフェース (intafēsu; katakana)" and different notations thereof such as "インター フェース (intāfēsu; katakana)", "インタフェイス (intafeisu; katakana)", "インターフェイス (intāfeisu; katakana)", "インタ-フェイス (intāfeisu; katakana)", "インタフェ-ス (intafēsu; katakana)", "インタフェ-ス (intafēsu; katakana)", "インター フェース (intāfēsu; katakana)" and "インター フェ-ス (intāfēsu; katakana)".

These can be represented by a complex expression character stream (expression 1) as shown in the under portion of FIG. 9.

$$\left("イン"\atop(in)\right)\left(\begin{array}{c}"タ"\\(ta)\\"タ"\\(ta)\end{array}\left("\_"\atop".."\right)\right)\left(\begin{array}{c}"フェイ"\\(fei)\\"フェ"\\(fe)\end{array}\left("\_"\atop".."\right)\right)"ス"\atop(su)$$

Expression 1

Different notations of "フェ(fē; katakana)" represented by $$\left[\begin{array}{cc}"フェイ(fei; katakana)"\\"フェ(fe; katakana)" & \left["\_"\atop".."\right]\end{array}\right]$$

will be explained hereunder.

Because "フェ- (fē; katakana)" can be replaced by "フェイ ( fei; katakana)" based on a phonetic different notation, the notations $$\left[\begin{array}{c}"フェイ(fei; katakana)"\\"フェ-(fē; katakana)"\end{array}\right]$$

can be obtained.

Because "—" as the long sound of "フェ- (fē; katakana)" can be replaced by "‥" based on a long sound different notation, the notations $$\left["\_"\atop".."\right]$$

can be obtained.

When the long sound different notations $$\left["\_"\atop".."\right]$$

are applied to $$\left[\begin{array}{c}"フェイ(fei; katakana)"\\"フェ-(fē; katakana)"\end{array}\right]$$

the following notation can be obtained.

$$\left[\begin{array}{cc}"フェイ(fei; katakana)"\\"フェ(fe; katakana)" & \left["\_"\atop".."\right]\end{array}\right]$$

Hereinafter, the relationship between interchangeable terms is called equivalence.

Further, the transit state is expressed as state 5.

By using this method, the number of automaton states can be reduced to about one-third the number of states in the automaton in FIG. 5.

Thirdly, a two-stage presearch means is provided as a method for accelerating scanning type full text search. As a first stage presearch used is a character component table search means in which only documents containing characters constituting a designated key word are extracted by use of a character component table in which characters written in a contracted text (which will be described later) are expressed as one-bit information. As a second stage presearch used is a means (called contracted text search) in which only documents having a designated key word are extracted by scanning a data file (called "contracted text") formed by removing adjuncts, such as postpositional words respectively functioning as an auxiliary to a main word, conjunctions, and the like, from a text and removing words appearing repeatedly. Accordingly, the text as related to the documents narrowed down by the two-stage presearch is read from the magnetic disk device and scanned (called "text search") to thereby attain equivalently very high-speed full text search. Hereinafter, examination for successively narrowing down the number of documents through character component table search and contracted text search is called "hierarchical presearch".

Fourthly, a query resolver to make retrieval under combination of not only the logical condition, the neighbor condition and the contextual condition possible in order to attain fine retrieval peculiar to full text search is provided.

Fifthly, a full test search system (called "search machine") is formed by collecting units arranged in parallel and a controller as a higher-rank device for controlling the units, each of the units being formed by collecting the search data base constituted by the plurality of magnetic disk devices, the term comparator, the presearch means and the query resolver. The aforementioned arrangement not only matches with not only a large-capacity data base but matches with increase in the capacity of the data base through extension of units in the machine.

Sixthly, an LAN connection means for connecting the text search machine to the LAN is provided in the text search machine to give service to a plurality of users and make the construction of a large-scale text data base possible. The aforementioned construction not only matches with the large-scale data base through connection of a plurality of search machines to the LAN but matches with the increase in the capacity of the data base through extension of machines in the LAN.

Seventhly, a synonym development means and a different notation development means for automatically carrying out a synonym and different notation development process are provided in the text search machine in order to solve the problem in synonyms and different notations. Desired documents can be entirely retrieved by full text search with use of the developed vocabulary as key words.

To solve the problem, a term given through the keyboard as shown in FIG. 26 is developed as follows: the term is once subjected to different notation development; the terms obtained by the different notation development are respectively subjected to synonym development by reference to a synonym dictionary; and then the terms obtained by the synonym development are respectively subjected to different notation development.

The outline of the different notation and synonym development processes is shown in FIG. 27. A key word (term) 2701 designated by a user is once subjected to different notation development. The terms 2702 obtained by the different notation development are respectively subjected to synonym development by using a synonym dictionary 2710. Then, the terms 2703 obtained by the synonym development are respectively subjected to different notation development to thereby obtain terms 2704 as a results of development.

By carrying out different notation development before synonym development, the development processes can be carried out with no change of information to standardize notation. Accordingly, because a dictionary can be formed with no consideration of expression and notation of terms in the synonym dictionary, generation or edition of the dictionary becomes easy. Different notations of terms newly obtained by synonym development can be obtained by different notation development thereof.

In the following, different notation development as an important means in the present invention is explained. Different notation development is made as follows. First, an input term is divided by character types into three groups of partial terms, *namely, kanji and hiragana terms, katakana terms and alphabet terms. The partial terms thus obtained are successively subjected to a term replacement process using a conversion rule table to carry out different notation development on kanji terms and katakana terms. In respect to alphabet terms, alphabet characters in the input terms are subjected to code conversion, for example, minuscule-to-majuscule conversion or majuscule-to-minuscule conversion.

The conversion rule table herein used has a plurality of conversion rules for replacing a partial term in the input term with a list of terms.

For example, in the case where a term "イウ (iu; katakana)" is developed into two terms "イウ ( iu; katakana)" and "ユウ (yuu; katakana)", the conversion rule is represented by the following description.

["イウ (iu; katakana )"→("イウ (iu; katakana )",
"ユウ (yuu; katakana )"]

Conversion of a partial term into a list of terms is called "replacement".

For example, the following conversion rules are considered as conversion rules for different notation development of kanji terms and katakana terms.
(1) Case of kanji and hiragana terms
   (a) Conversion rule pertaining to development corresponding to difference in notation between the old style and the new style of kanji.

Example:
[" 斉 (sei)"→(" 斉", " 斎", " 齋", " 㪅")]

(b) Conversion rule pertaining to development corresponding to difference in notation between declensional kana of kanji.
Example:
[" 読み取り (yomitori)"→(" 読み取り"," 読取")]
(2) Case of katakana
● Conversion rule pertaining to development into various notations in similar syllables.
Example:
["ピア (pia)"→("ピア (pia)", "ピヤ (piya)"]

As described above, kanji and hiragana terms are subjected to different notation development by using the conversion rule table.

In the following, different notation development of romaji is explained.

Hepburnian system notation, directive system notation and mixture notation thereof are considered as different notations of romaji. Accordingly, it is necessary to generate a conversion rule adopted to both syllabic notations of Hepburnian system and directive system. For example, a conversion rule for replacing a partial term "SHI" as romaji in the Hepburnian system with a list of two partial terms "SI" and "SHI" as romaji respectively in the directive system and the Hepburnian system is generated as follows.
["SHI"→("SI", "SHI")]

In short, different notation development of romaji can be attained by the aforementioned method. As another method, a method comprising the steps of converting all romaji terms into katakana terms, and replacing respective syllables in the katakana terms by both Hepburnian system notation and directive system notation may be used. For example, a romaji term

"SISHAMO"

is once converted into a katakana term

"シシャモ"

and then converted into romaji, for example, by use of the following conversion rule.

["シ"→("SI", "SHI")]

After the development by character types as described above, developed partial terms are combined in the order of the initial term to form a final output of different notation development.

In short, the different notation development process can be summarized as follows.
(1) Different notation development pertaining to kanji and hiragana terms (declensional kana endings and new and old kanji styles).
(2) Different notation development pertaining to katakana terms.
(3) Different notation development pertaining to romaji terms (Hepburnian system and directive system notations).
(4) Different notation development pertaining to alphabet characters (majuscules and minuscules).

However, it is not always necessary to use all of the different notation developments. By providing means for selecting the kind of the conversion rule table to be used, wasteful development process can be eliminated and, accordingly, search process at the desire of a user can be attained.

In the following, synonym development as another important means in the present invention is explained. As synonym development, the following four developments are carried out on the input term by using a synonym dictionary.

(1) Same-rank term development
   Development into vocabulary of the same rank in concept
   Example:
      Development from "計算機 (keisanki; kanji)" to
         "コンピュータ (kompyūta; katakana)" and
         "情報処理装置 (johoshorisochi; kanji"
(2) Higher-rank term development
   Development into vocabulary having a hihger-rank meaning
   Example:
      Development from "計算機 (keisanki; kanji)" to
   "電子機器 ( denshikiki; kanji)"
(3) Lower-rank term development
   Development into vocabulary having a lower-rank meaning
   Example:
      Development from "計算機 (keisanki; kanji)" to
         "電子卓上計算機 (denshitakujōkeisanki; kanji)"
(4) Related term development
   Development into vocabulary having a related meaning
   Example:
      Development from "計算機 (keisanki; kanji)" to
         "オフィスオートメイション (ofisuōtomeishon; katakana)"

Further, by providing means for selecting suitable one from the four developments in synonym development process similarly to the different notation development process, more flexible search at the desire of a user can be attained.

By the aforementioned means, a search term given by a user is developed as follows. First, the search term is subjected to different notation development. Terms obtained by the different notation development are one-by-one subjected to synonym development. New terms obtained by the synonym development are subjected to different notation development.

Because different notation development is made before synonym development, omission of information caused by standardization of notation can be avoided so that expected development results can be always attained.

Further, because it is not necessary to standardize notation in the synonym dictionary, generation and maintenance of the dictionary can be simplified. Because different notation development is further made after the synonym development, there is no necessity of describing variations of notation in the synonym dictionary. Accordingly, the size of the dictionary can be reduced.

As described above, according to the present invention, the following effects can be attained.

Firstly, a high reading speed can be obtained by generalizing output data obtained by driving simultaneously a plurality of magnetic disk devices which are arranged in parallel to form a search data base for storing text data.

Secondly, collective search of about one thousand key words can be made with no reduction of the comparison speed, by use of a term comparator which mounts hardware exclusively used for term comparison based on a finite-state automaton method. This meaning is that search of key words including synonyms and different notations can be perfected only by scanning the text data base by once.

Thirdly, the number of times for reference to a text stored in a magnetic disk can be reduced by providing two-stage presearch means as a scanning type full text search accelerating method. In short, the quantity of text search processing which accounts for a large part of search time can be reduced, by which the search time as the whole can be shortened.

In order to carry out the hierarchical presearch, it is necessary to prepare auxiliary files "contracted text" and "character component table" before the search. The auxiliary files "contracted text" and "character component table" are generated automatically at the time of document registration. The content of the process is shown in FIG. 16.

In the drawing, a given document to be registered is stored as "text" in a magnetic disk device.

Then, "contracted text" is generated from the "text". In short, the "contacted text" is generated by removing adjuncts (not used in search) from the "text" and removing overlapping terms repeatedly appearing in the "text". In the case of document 1 having the text "あいまい検索のための検索技術 (aimai kensaku notameno kensakugijutsu; hiragana and kanji)", an adjunct "のための (notameno; hiragana)" and an overlapping term "検索 (kensaku; kanji)" are removed, so that terms "あいまい (aimai; hiragana)" and "検索技術 (kensakugijutsu; kanji)" are left as "contracted text".

Finally, "character component table" is generated from the "contracted text". In this embodiment, characters which appear in the "contracted text" are respectively expressed by one-bit information. In the case of document 1, bit data "1" is given to columns for expressing characters "あ (a; hiragana)" and "い (i; hiragana)" because those characters are present. Bit data "0" is given to a column for expressing a character "う (u; hiragana)" because such a character is absent. Similarly, bit data "1" is given to columns for expressing characters "検 (ken; kanji)" and "策 (saku; kanji)" because those characters are present. In short, bit data "1" is given to each character column (for expressing a specific character) in the character component table when the character is present in the "contracted text" and on the other hand, bit data "0" is given to each character column when the character is absent.

As described above, the "contacted text" and the "character component table" are generated automatically at the time of document registration, thus to prepare for hierarchical presearch.

At the time of search, reference to these auxiliary files is made in the order reverse to registration, as shown in FIG. 17. Let it be supposed that a conditional expression "検索 [4c] 理解" is given. The conditional expression expresses retrieval of a document containing two terms "検索 (kensaku; kanji)" and "理解 (rikai; kanji)" arranged at a distance of not more than 4 characters.

As a first step, the character component table is searched. The extracted by this search is only one document or documents containing all constituent characters of designated key words. In the case as shown in the drawing, all documents containing both constituent characters of "検索 (kensaku; kanji)", that is, two characters "検 (ken; kanji)" and "策 (saku; kanji)" are retrieved. The document retrieval method comprises ANDing (making logical product) bits given to the columns "検" and "策" in the character component table. Documents having a result "1" are documents containing the two characters "検" and "策". On the contrary, documents having a result "0" are documents not having one of the two characters "検" and "策" or not having the two characters. Accordingly, the documents having a result "0" can be removed from the subject of search which will be made hereinafter.

Because the existence of a character is expressed by one-bit information (also called "bit list") in the character component table, the quantity of data to be searched can be reduced to a small quantity. As this result, search time can be shortened. Further, documents not related to key words can be cut off remarkably based on ANDing bits of constituent characters of key words in the bit list. Accordingly, the number of documents as a target of search can be narrowed down greatly.

Then, the contracted text of the documents narrowed down by the character component table search is searched. In the case of extracting only documents containing designated key words as words as shown in the drawing, such documents containing two characters "検" and "策" appearing continuously are extracted. In short, documents containing two characters "検" and "策" appearing as different words such as for example two words "検出" and "検索" in the document 3 are cut off here.

In respect to the term "理解 (rikai; kanji)", the same procedure as described above is applied to character component table search and contracted text search. Each of documents thus finally remaining is subjected to text search to examine whether the text thereof satisfies the complex condition designated by the search conditional expression. In the case as shown in the drawing, a document satisfying the neighbor condition "[4c]" designated by the search conditional expression is retrieved. As this result, document 4 containing two words "検索" and "理解" arranged at a distance of four characters is retrieved.

As described above, in the "hierarchical presearch method", the two stages of presearch of "character component table" and "contracted text" are carreid out preliminarily to perform screening through the sieves of "character level" and "word level" to thereby narrow down the number of documents as a target of text search which, in general, requires a largest time. Thus, equivalently very-high-speed full text search can be attained.

Fourthly, fine search peculiar to full text search can be attained by providing a query resolver for extracting one satisfying logical condition, neighbor condition and contextual condition described in the search expression, based on the output result of the search engine in text search. In respect to logical condition, search operations, such as OR operation, AND operation, NOT operation, and the like, can be attained. In respect to neighbor condition, inter-character distance conditional search in which an upper limit or a lower limit is given to the number of characters between key words can be attained in the case of Japanese or inter-word distance conditional search in which an upper limit or a lower limit is given to the number words between key words can be attained in the case of English. Examples of neighbor condition are "inter-character distance condition" adopted to Japanese and "inter-word distance condition" adopted to English. Examples of inter-character distance condition are as follows.

"文書[8c]検索" . . . (1)
"文書[10c]検索" . . . (2)
"文書[8c, 10c]検索" . . . (3)
"文書<10c>検索" . . . (4)

The conditional expression (1) "文書[ic]検索" expresses retrieval of a document (or documents) containing two terms "文書 (bunsho; kanji)" and "検索 (kensaku; kanji)" arranged in the order and at a distance of not more than 8 characters. Accordingly, in FIG. 14, documents ① and ② are detected.

The conditional expression (2) "文書[10c]検索" expresses retrieval of a document (or documents) containing two terms "文書 (bunsho; kanji)" and "検索 (kensaku; kanji)" arranged at a distance of not more than 10 characters regardless of the order of the two terms, that is, regardless of whether "文書 (bunsho; kanji)" appears before "検索 (kensaku; kanji)" or whether "検索 (kensaku; kanji)" appears before "文書 (bunsho; kanji)". Accordingly, in FIG. 14, documents ①, ② and ③ are detected.

The conditional expression (3) "文書[8c, 10c]検索" expresses retrieval of a document (or documents) containing two terms "文書 (bunsho; kanji)" and "検索 (kensaku; kanji)" arranged at a distance of from 8 characters to 10 characters regardless of the order of the two terms. Accordingly, in FIG. 14, documents ② and ③ are detected.

The conditional expression (4) "文書<10c>検索" expresses retrieval of a document (or documents) containing two terms "文書 (bunsho; kanji)" and "検索 (kensaku; kanji)" arranged at a distance of not less than 10 characters regardless of the order of the two terms. Accordingly, in FIG. 14, documents 3 and 4 are detected.

Examples of inter-word distance condition are as follows.
"text [8W] retrieval" . . . (5)
"text [10w] retrieval" . . . (6)
"text [8w, 10w] retrieval" . . . (7)
"text <10w> retrieval" . . . (8)

The conditional expression (5) "text [8W] retrieval" expresses search for a document (or documents) containing two terms "text" and "retrieval" arranged in the order and at a distance of not more than 8 words.

The conditional expression (6) "text [10w] retrieval" expresses search for a document (or documents) containing two terms "text" and "retrieval" arranged at a distance of not more than 10 words regardless of the order of the two terms, that is, regaredless of whether "text" appears before "retrieval" or whether "retrieval" appears before "text".

The conditional expression (7) "text [8w, 10w] retrieval" expresses search for a document (or documents) containing two terms "text" and "retrieval" arranged at a distance of from 8 words to 10 words regardless of the order of the two terms.

The conditional expression (8) "text <10w> retrieval" expresses search for a document (or documents) containing two terms "text" and "retrieval" arranged at a distance of not less than 10 words regardless of the order of the two terms.

In respect to contextual condition, a search function for searching for a document (or documents) containing key words coexisting in one sentence or in one paragraph can be attained.

Examples of contextual condition search adopted to both Japanese and English are as follows.
"文書[P]検索" . . . (9)
"文書[p]検索" . . . (10)
"文書[S]検索" . . . (11)
"文書[s]検索" . . . (12)
"文書[PH]検索" . . . (13)
"文書[ph]検索" . . . (14)

The conditional expression (9) "文書[P]検索" expresses search of a document (or documents) containing two terms "文書 (bunsho; kanji)" and "検索 (kensaku; kanji)" arranged in the order and in one paragraph.

The conditional expression (10) "文書[p]検索" expresses search of a document (or documents) containing two terms "文書 (bunsho; kanji)" and "検索 (kensaku; kanji)" arranged in one paragraph regardless of the order.

The conditional expression (11) "文書[S]検索" expresses search for a document (or documents) containing two terms "文書 (bunsho; kanji)" and "検索 (kensaku; kanji)" arranged in the order and in one sentence.

The conditional expression (12) "文書[s]検索" expresses search for a document (or documents) containing two terms "文書 (bunsho; kanji)" and "検索 (kensaku; kanji)" arranged in one sentence regardless of the order.

The conditional expression (13) "文書[PH]検索" expresses search for a document (or documents) containing two terms "文書 (bunsho; kanji)" and "検索 (kensaku; kanji)" arranged in the order and in one phrase. In the case of Japanese, the phrase means a composition set off by "、" and "。". In the case of English, the phrase means a composition set off by "," and ".".

The conditional expression (14) "文書[ph]検索" expresses search for a document (or documents) containing two terms "文書 (bunsho; kanji)" and "検索 (kensaku; kanji)" arranged in one phrase regardless of the order.

Examples of logical condition search adopted to both Japanese and English are as follows.

文書[AND]検索" (also expressed as "and (文書, 検索)") . . . (15)

"文書[OR]検索" (also expressed as "and (文書, 検索)") . . . (16)

"文書[NOT]検索" (also expressed as "and (フェ, 検索)") . . . (17)

The conditional expression (15) "文書[AND]検索" expresses search for a document (or documents) containing two terms "文書 (bunsho; kanji)" and "検索 kensaku; kanji)".

The conditional expression (16) "文書[OR]検索" expresses search for a document (or documents) containing "文書 (bunsho; kanji)" and "検索 (kensaku; kanji)".

The conditonal expression (17) "文書[NOT]検索" expresses search for a document (or documents) not containing two terms "文書 (bunsho; kanji)" and "検索 (kensaku; kanji) ".

Fifthly, not only matching with a large-capacity text data base but matching with increase in the capacity of the data base through extension of units in a search machine can be attained by providing such a search machine formed by collecting units arranged in parallel and a controller as a higher-rank device for controlling the units, each of the units being formed by collecting the search data base constituted by the plurality of magnetic disk devices, the term comparator, the presearch means and the query resolver.

Sixthly, a LAN connection means for connecting the text search machine to the LAN is provided in the text search machine to thereby give service to a plurality of users and make the construction of a large-scale text data base possible. In short, the aforementioned arrangement not only matches with the large-scale data base through connection of a plurality of search machines to the LAN but matches with the increase in the capacity of the data base through extension of machines in the LAN.

Seventhly, full text search automatically using all developed vocabulary, such as synonyms, different notations and the like, as key words can be made with no necessity that a user has to be conscious of these problems, by providing synonym development means and different notation development means for carrying out a synonym and different notation development process in the inside of the text search machine. Further, desired documents can be entirely retrieved with no occurrence of omission caused by difference in expression or notation.

BRIEF DESCRIPTION OF THE DRAWINGS

FIGS. 2, 3, 5 and 7 are explanatory views showing the theory of term retrieval using a finite-state automaton;

FIGS. 4, 6 and 8 are explanatory views of failure function tables in the conventional system;

FIG. 11 is a view showing an example of comparison position information;

FIG. 14 is a view showing an example of retrieval using two key words;

FIG. 15 is a view showing a full text search accelerating procedure as one of features of the present invention;

FIGS. 20A, 20B, 21, 22, 23 and 24 are pad views showing character component table searching procedures;

FIG. 34 is a view of a goto function table in the finite-state automaton;

FIG. 35 is a view of an output table in the finite-state automaton;

FIG. 37 is a katakana different notation conversion table;

FIG. 38 is a different notation conversion table pertaining to the new and old styles of kanji;

FIG. 39 is a different notation conversion table pertaining to kana added to kanji;

FIG. 40 is a romaji/katakana conversion table;

FIG. 42 is a view showing the control states of conversion portions, development portions a switches in the different notation development;

FIG. 43 is a view showing a synonymous dictionary;

FIG. 44 is a view showing the outline of a method for searching headwords of the synonymous dictionary by using an index table;

FIGS. 46, 47, 48, 49, 50, 51, 52 and 53 are explanatory views showing the theory of term retrieval using a finite-state automaton in this embodiment;

FIG. 54 is an explanatory view of a goto function table in this embodiment;

FIG. 55 is an explanatory view of an output table;

FIGS. 59A, 59B, 59C and 59D are views showing an example of construction of a storage position pointer table;

FIGS. 60A, 60B, 60C and 60D are views showing an example of construction of a physical information table;

BEST MODE FOR CARRYING OUT THE INVENTION

Figure 1:
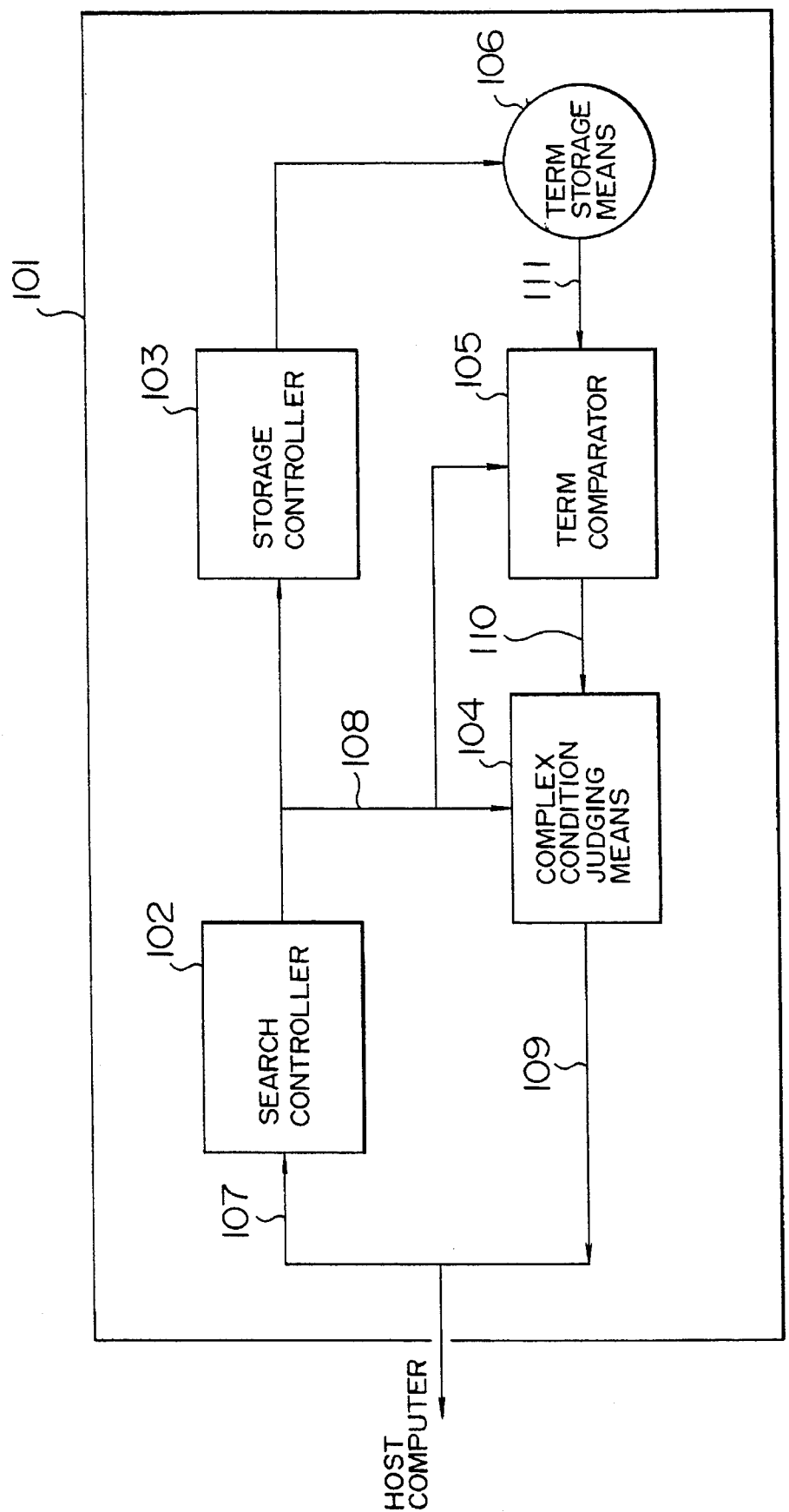
FIG. 1 is a block diagram showing a conventional retrieval system.
Figure 2:
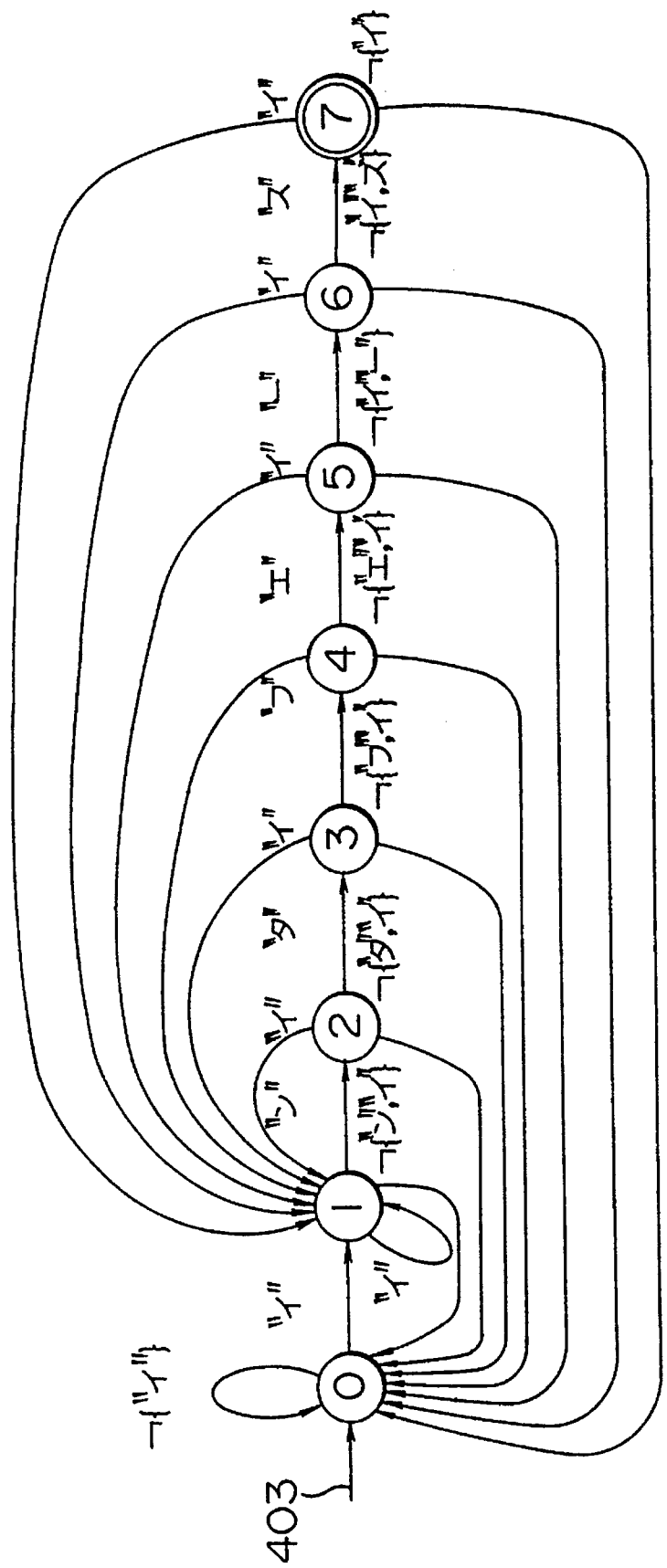

A first embodiment of the present invention will be described with reference to FIG. 10.

The search system in this embodiment comprises a keyboard 1101, a search machine control computer ($CPU_0$) 1150, a display 1120, an automaton generating computer ($CPU_1$) 1105a, a bit search computer ($CPU_3$) 1107a, a string search engine 1106, a query resolving computer ($CPU_2$) 1156a, a search result storage memory 1146, and a text data file 1110. In the search machine control computer ($CPU_0$) 1150, a search expression analysis program 1102, a synonym/different notation development program 1103a, a query analysis program 1141a, a search execution control program 1108 and a search result indication program 1147 are executed. In the automaton generating computer ($CPU_1$) 1105a, an automaton generating program 1105 is executed. In the bit search computer ($CPU_3$) 1107a, a bit search program 1107 is executed. In the query resolving computer ($CPU_2$) 1145a, a query resolving program 1145 is executed.

A search conditional expression given through the keyboard 1101 is analyzed based on the search expression analysis program 1102 on the search machine control computer ($CPU_0$) 1150. In short, a search conditional expression is separated, based on the search expression analysis program 1102, into a key word portion and a complex condition description portion in which a complex condition constituted by inclusion conditions and arrangement conditions is described. The inclusion conditions are described as logical conditions. The arrangement conditions are described as neighbor conditions or contextual conditions. After separation or extraction, the key word portion and the complex condition description portion are respectively delivered to the synonym/different notation development program 1103a and the query analysis program 1141a on the $CPU_0$ 1150.

Based on the synonym/different notation development program 1103a, synonyms with respect to the given key word and different notations thereof are found by reference to a synonym dictionary included in the program and according to conversion rules. For example, when a key word "計算機 (keisanki; kanji)" is given, synonyms thereof, such as "電算機 (densanki; kanji)', "コンピュータ (konpyūta; katakana)" and the like, are generated and different notations thereof, such as "コンピュータ (konpyūta; katakana)" and the like, are generated.

In the synonym development, synonyms include not only the same-rank words as described above, but higher-rank words, lower-rank words, related words and the like. An example of higher-rank word is "電子機器 (denshikiki; kanji)", or the like. An example of lower-rank word is "電卓 (dentaku; kanji)", or the like. An example of related word is "オフィスオートメーション (ofisuōtomēshon; katakana)", or the like.

Different notation development includes katakana development, kanji and hiragana development, and alphabet development. The shown in the drawing is katakana development. The kanji and hiragana development includes new/ old style conversion and okurigana development. An example of the new/old style conversion is conversion from "斉 (sei; kanji)" to "齋 (sei; kanji)" and "齊 (sei; kanji)". An example of okurigana development is development from "読取(yomitori; kanji)" to "読取り(yomitori; kanji and hiragana)" and "読取 取り(yomitori; kanji and hiragana)". The alphabet development includes Hepburnian system development of romaji, directive system development of romaji and majuscule/minuscule development of alphabets. An example of Hepburnian system development of romaji is development from "チシキ(katakana)" to "TISIKI (romaji)". An example of directive system development of romaji is development to "CHISHIKI (romaji)". An example of majuscule/minuscule development of alphabets is development from "TISIKI" to "tisiki".

The aforementioned development rules in synonym development and different notation development can be designated by a user so that a suitable combination thereof can be selected.

Examples of synonyms in English are as follows.

| looking glass | → | mirror | | |
| pingpong | → | TABLE tennis | | |
| the Lord | → | God | | |
| typhoon | → | cyclone | → | hurricane |
| HAL | → | Hitachi America Limited | | |
| WS | → | work station | | |

Examples of different notations in English are as follows.

| center | → | centre | | |
| liter | → | liter | | |
| brier | → | briar | | |
| humor | → | humour | | |
| modeler | → | modeller | | |
| Chile | → | Chili | | |
| orangutan | → | orangoutan | → | orangoutang |
| MacDonald | → | McDonald | | |

Examples of synonyms in German are as follows.

| Brief | → | Schreiben |
| Mostert | → | Mostrich |
| Maschine | → | Motor |

Examples of different notations in German are as follows.

| Foto | → | Photo |
| Coda | → | Koda |
| Code | → | Kode |
| Buffet | → | Buffet |
| Friburg | → | Fribourg |

The group of key words thus generated by synonym and different notation development are delivered to the automaton generating program 1105 on the automaton generating computer ($CPU_1$) 1105a.

Based on the automaton generating program 1105, an automaton for performing collective comparison with respect to the key word group delivered from the synonym/ different notation development program 1103a is generated. Hundreds of development results may be obtained by synonym/different notation development in the case where the number of initially given key words is large.

Search for the key words one by one in given text data makes high-speed retrieval impossible. Accordingly, it is necessary to search for the key words collectively by scanning the text data only once. As a method of collectively comparing a plurality of key words (also called "multiplex comparison"), a comparison method using an automaton is known. As an example of the method, a method of executing the automaton by hardware has been proposed in Japanese Patent Unexamined Publication No. Sho-63-311530. The search engine 1106 is a high-speed multiplex term comparison circuit attained by the growth of the method. Accordingly, in the automaton generating program 1105, key word identification code information to be compared with a state transition table provided in the search engine 1106 is generated to be transferred to the search engine 1106.

The group of key words obtained by synonym/different notation development based on the synonym/different notation development program 1103a are, together with corresponding key word identification codes (also called "key word identifiers"), delivered to the bit search program 1107 on the bit search computer ($CPU_3$) 1107a.

On the other hand, in the query analysis program 1141 on the search machine control computer ($CPU_0$) 1150 receiving the complex condition description portion of the input search conditional expression from the search expression analysis program 1102, conditions such as neighbor condition, contextual condition, logical condition and the like are analyzed to form designation distance information (for indicating distance between the identification codes of the designated key words), designation contextual code information and designation logical condition code information as control information for judging the conditions, so that the information is delivered to the query resolving program 1145 on the query resolving computer ($CPU_2$) 1145a.

When the aforementioned search expression analyzing process, synonym/different notation development process, automaton generating process and query analyzing process are finished and when the control information is delivered respectively to the bit search program 1107 on the bit search computer ($CPU_3$) 1107a, the search engine 1106 and the query resolving program 1145 on the query resolving computer ($CPU_2$) 1145a, a search process is started.

The search process is controlled by the search execution control program 1108 on the search machine control computer ($CPU_0$) 1150. In short, in the search execution control program 1108, search text data are read from the text data file 1110 while operating the bit search program 1107, search engine 1106 and query resolving program 1145, to perform both hierarchical presearch and text search. First, a character component table is read from the text data file 1110 to the bit search program 1107 to carry out character component table search. Document identifiers as results of character component table search are written in the search result storage memory 1146. Then, contracted texts of documenhts identified by the document identifiers are read from the text data file 1110 to the string search engine 1106 to perform contracted text search, In the string search engine 1106, a group of key words designated by preliminarily set state transition table information are retrieved in input contracted text data, When any one of the key words is found, the identifier of the text file and the identification code and positional information of the key word are delivered to the query resolving program 1145 on the query resolving computer ($CPU_2$) 1145a.

The positional information added as output information of the search engine is information for indicating the position of a document in which the key word is found, For example, the positional information is represented by the number of characters obtained by counting characters from the head of the document. FIG. 11 shows an example of comparison positional information. The drawing shows retrieval based on a key word " 知的 検索 (chitekikensaku; kanji)" in the case where the contents of the document is "あいまい検索のための知的検索技術を開発した". In the drawing, the term " 知的 検索 (chitekikensaku; kanji)" in " 知的検 索技術 (chitekikensakugijutsu; kanji)" coincides with the key word. Accordingly, the term is detected. In the respect to comparison positional information, the position of the last character " 策 (saku; kanji)" in the term " 知的 検索 (chitekikensaku; kanji)" is employed as a value obtained by counting characters from the head of the document. In this example, 13 is the comparison positional information.

The output information of the search engine having the comparison positional information added thereto has a structure as shown in FIG. 15. In this embodiment, the output information is constituted by a 32-bit length key word identifier and a 32-bit length key word comparison positional information code. A document identifier is given to each document before a key word identifier is given, so that correspondence of the comparison positional information to the document can be recognized.

Results of contracted text search, that is, comparison information formed by combining the document identifier, key word identifier and key word comparison positional information, are delivered to the query resolving program 1145 on the query resolving computer ($CPU_2$) 1145a. In the query resolving program 1145, a document (or documents) satisfying designated conditions is detected based on the query resolving control information set preliminarily and, on the bases of the detection, a corresponding document identifier (or identifiers) is written in the search result storage memory 1146. In the search execution control program 1108, a judgment is made as to whether the complex condition includes a neighbor condition or a contextual condition. When the complex condition includes a neighbor condition or a contextual condition, final text search is carried out. In short, text data corresponding to the document identifier obtained as the result of contracted text search are read from the text data file 1110 to the string search engine 1106 to perform text search. The comparison information as an output of the string search engine 1106 is delivered to the query resolving program 1145, in which a judgment is made as to whether data satisfy both the neighbor condition and contextual condition designated in the information. The result of the judgment is delivered to the sarch result storage memory 1146, in the form of a document identifier as final search result information.

When contracted search or text search is finished, that is, when a search process is finished, the search result indicating program 1147 on the search machine control computer ($CPU_0$) 1150 is operated to read bibliographic items, such as the number of search results, names and authors of hit documents, or the like, from the text data file 1110 by reference to the document identifiers on the search result storage memory 1146 to thereby make up a list on the display 1120 or to read text data of hit documents from the text data file 1110 based on the designation of a user to thereby indicate the text data on the display 1120.

Thus, the first embodiment of the full text search system provided according to the present invention has been described above.

Figure 25:
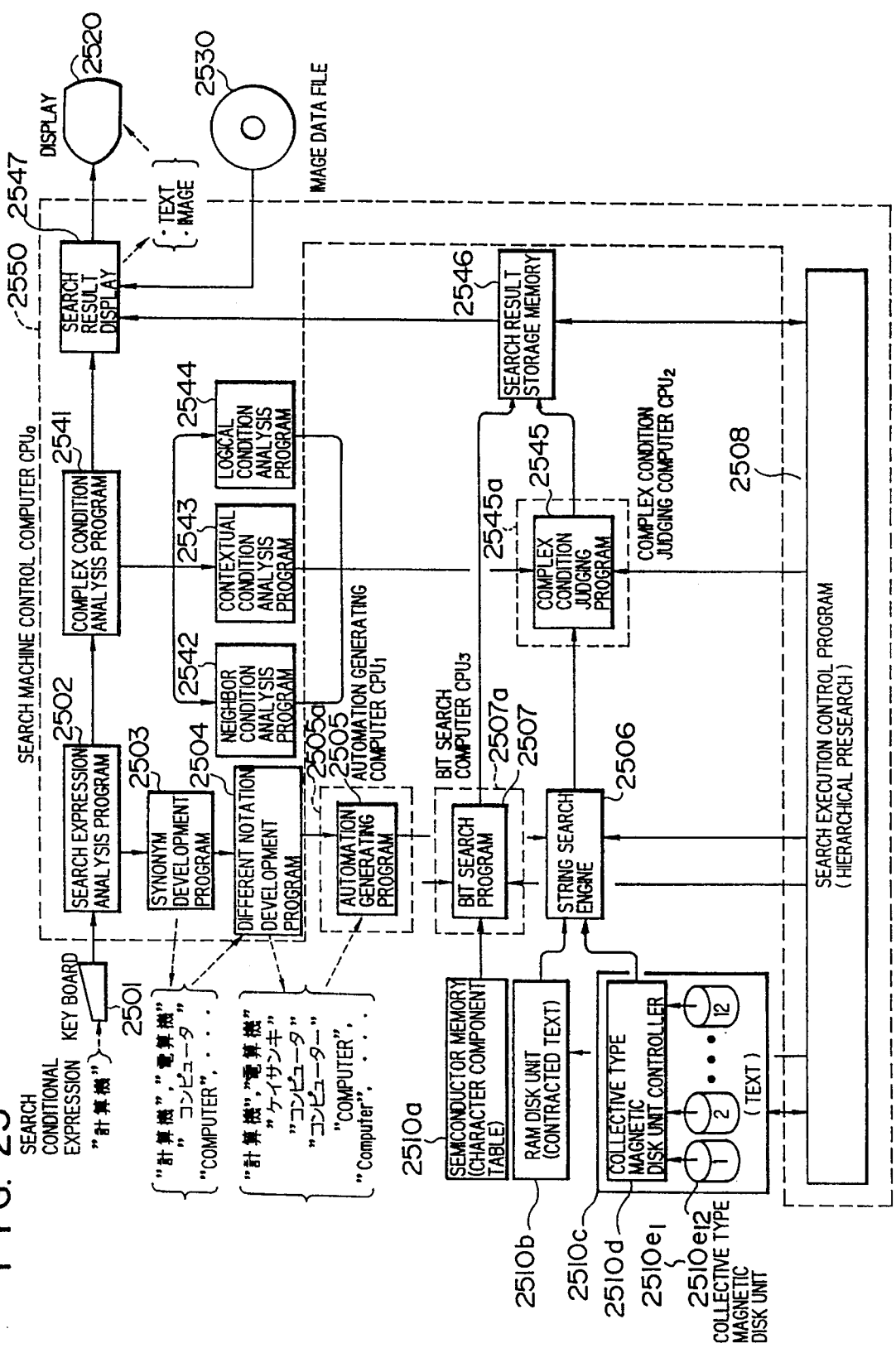
FIG. 25 is a block diagram showing a modification of the embodiment shown in FIG. 10.
Figure 26:
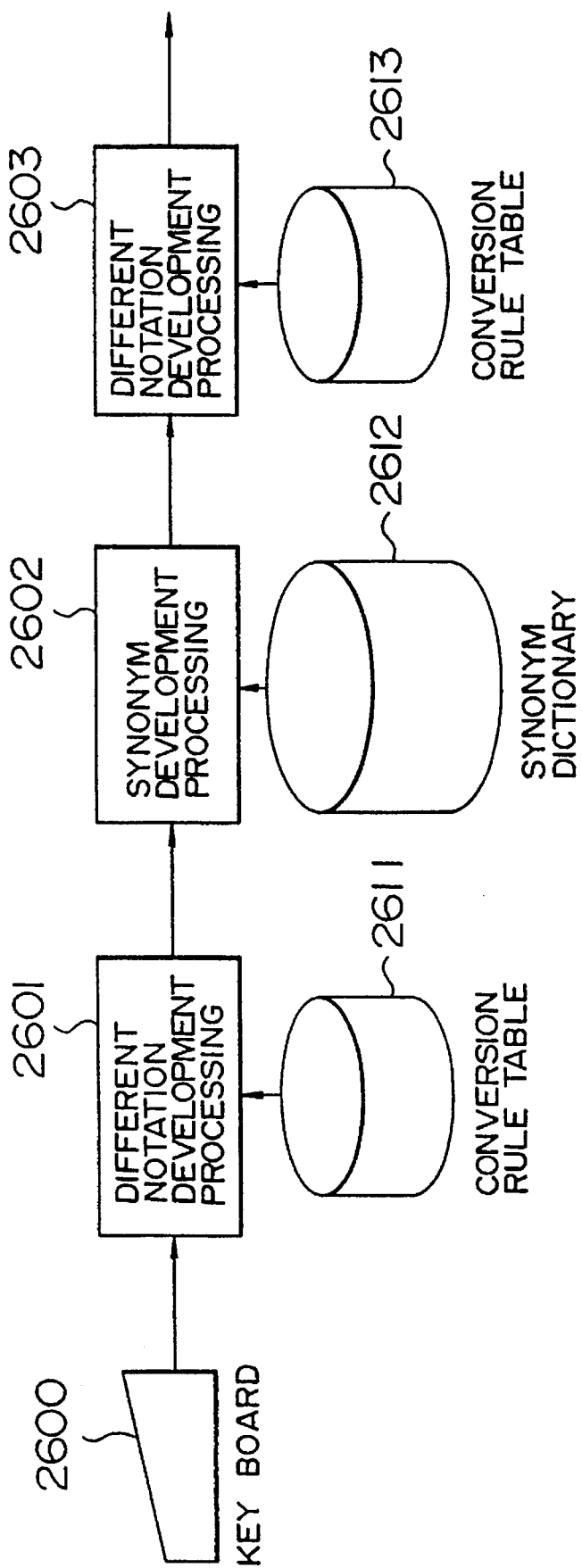
FIG. 26 is a block diagram showing an embodiment of the invention in which a series of synonym/different notation development processes as one of features of the present invention is carried out.
Figure 27:
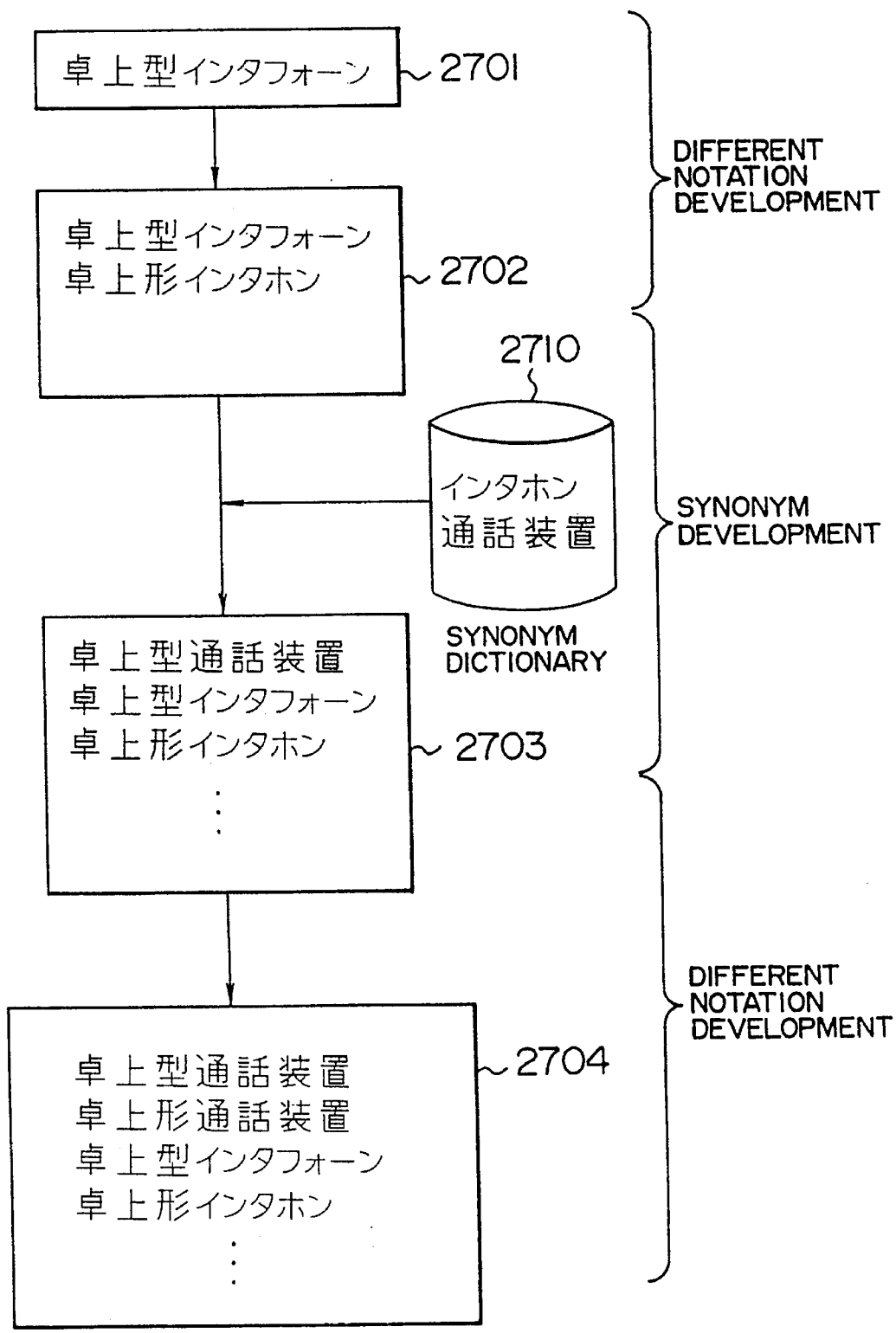
FIG. 27 is a view for explaining the outline of the series of processes in the embodiment in FIG. 26.

In the following, a second embodiment of the present invention is described with reference to FIG. 25.

The system in this embodiment comprises a keyboard 2501, a search machine control computer ($CPU_0$) 2520, a display 2520, an automaton generating computer ($CPU_1$) 2505a, a bit search computer ($CPU_3$) 2507a, a string search engine 2506, a query resolving computer ($CPU_2$) 2545a, a search result storage memory 2546, a semiconductor memory device 2510a, a RAM disk device 2510b, a collective type magnetic disk unit 2510c, and an image data file 2530. In the search machine control computer ($CPU_0$) 2550, a search expression analysis program 2502, a synonym development program 2503, a different notation development program 2504, a query analysis program 2542, a contextual condition analysis program 2543, a logical condition analysis program 2544, a search execution control program 2508 and a search result indication program 2547 are executed. In the automaton generating computer ($CPU_1$) 2505a, an automaton generating program 2505 is executed. In the bit search computer ($CPU_3$) 2507a, a bit search program 2507 is executed. In the query resolving computer ($CPU_2$) 2545a, a query resolving program 2545 is executed. The collective type magnetic disk unit 2510c is constituted by a collective type magnetic disk controller 2510d and magnetic disk devices $2510e_1$ to $2510e_{12}$.

In the drawing, a search conditional expression given through the keyboard 2501 is analyzed based on the search expression analysis program 2502 on the search machine control computer ($CPU_0$) 2550. In short, a search conditional expression is separated, based on the search expression analysis program 2502, into a key word portion and a complex condition description portion in which a complex condition constituted by inclusion conditions and arrangement conditions is described. The inclusion conditions are described as logical conditions. The arrangement conditions are described as neighbor conditions or contextual conditions. After separation or extraction, the key word portion and the complex condition description portion are respectively delivered to the synonym development program 2503 and the query analysis program 2541 on the $CPU_0$ 2550.

Based on the synonym development program 2503, synonyms with respect to the given key word are found by reference to a synonym dictionary included in the program. The group of key words obtained by synonym development are delivered to the different notation development program 2504. For example, when a key word " 計算機 (keisanki; kanji)" is given, synonyms thereof, such as " 電算機 (densanki; kanji)", "コンピュータ (konpyuta; katakana)" and "COMPUTER", and the like, are generated.

Based on the different notation development program 2504, the group of key words thus delivered thereto are subjected to different notation development. In this example, "コンピュータ— (konpyutā; katakana)" is generated from "コンピュータ (konpyutā; katakana)" and "Computer" is generated from "COMPUTER".

The group of key words thus generated by the synonym and different notation development are delivered to the automaton generating program 2505 on the automaton generating computer ($CPU_1$) 2505a.

Based on the automaton generating program 2505, an automaton for performing collective comparison with respect to the key word group delivered from the different notation development program 2504 is generated. Key word identification code information to be compared with a state transition table is provided in the search engine 2506. The search engine 2506 is a high-speed multiplex term comparison circuit based on a finite state automaton.

The group of key words generated by the different notation development based on the different notation program 2504 are, together with corresponding key word identification codes, delivered to the bit search program 2507 on the bit search computer (CPU$_3$) 2507a.

On the other hand, in the query analysis program 2541 on the search machine control computer (CPU$_0$) 2550 receiving the complex condition description portion of the input search conditional expression from the search expression analysis program 2502, the complex condition description portion is separated into a neighbor condition description portion, a contextual condition description portion and a logical condition description portion. The condition description portions are delivered to the neighbor condition analysis program 2542, the contextual condition analysis program 2543 and the logical condition analysis program 2544, respectively.

In the neighbor condition analysis program 2542, inter-character distance conditions and inter-word distance conditions are extracted. The respective conditions thus extracted are converted into identification codes of designated key words and information pertaining to distance between the key words and then delivered to the query resolving program 2545 on the query resolving computer (CPU$_2$) 2545.

In the contextual condition analysis program 2543, various coexistence conditions, such as coexistence conditions in one sentence, coexistence conditions in one paragraph, coexistence conditions in one clause, coexistence conditions in one chapter, and the like, are extracted. The respective conditions thus extracted are converted into information pertaining to identification codes of designated key words and designated contextual codes and then delivered to the query resolving program 2545 on the query resolving computer (CPU$_2$) 2545a.

In the logical condition analysis program 2544, logical conditions designated in the search conditional expression are extracted, converted into logical condition code information and then delivered to the query resolving program 2546 on the query resolving computer (CPU$_2$) 2545a.

When the aforementioned search expression analyzing process, synonym and different notation development process, automaton generating process, query analyzing process, neighbor condition analyzing process, contextual condition analyzing process and logical condition analyzing process are finished and when the control information is delivered respectively to the bit search program 2507 on the bit search computer (CPU$_3$) 2507a, the search engine 2506 and the query resolving program 2545 on the query resolving computer (CPU$_2$) 2545a, a search process is started.

The search process is controlled by the search execution control program 2508 on the search machine control computer (CPU$_0$) 2550. In short, in the search execution control program 2508, character component table search is carried out while reading a character component table from the semiconductor memory device 2510a by operating the bit search program 2507. As results of the character component table search, document identififiers are written in the search result storage memory 2546.

Contracted texts of documents designated by the document identifiers written in the search result storage memory 2546 are read from the RAM disk device 2510b to the string search engine 2506 while operating the string search engine 2506, the query resolving program 2545 and the RAM disk device 2510b, thus to carry out contracted text search. As results of the contacted text search, comparison information pertaining to document identifier, comparison key word identifier and key word comparison position is delivered to the query resolving program 2545 on the query resolving computer (CPU$_2$) 2545a. In the query resolving program 2545, documents satisfying designated conditions are detected based on the preliminarily set query resolving control information to write the document identifiers thereof in the search result storage memory 2546.

In the search execution control program 2508, a judgment is made as to whether the complex condition includes at least one neighbor condition or contextual condition. When the complex condition includes at least one neighbor condition or contextual condition, final text search is carried out. In short, text data corresponding to the document identifier stored in the search result storage memory 2546 and obtained as the result of contracted text search are read from the collective type magnetic disk unit 2510c to the string search engine 2506 while operating the string search engine 2506, the query resolving program 2545 and the collective type magnetic disk unit 2510c, thus to perform text search.

The collective type magnetic disk unit 2510c is constituted by a plurality of magnetic disk devices $2510e_1$ through $2510e_{12}$ provided to store various text data, such as character component table, contracted text, text, bibliographic items, and the like, therein dispersively. The magnetic disk devices $2510e_1$ to $2510e_{12}$ controlled by the collective type disk controller 2510d can read text data in parallel and independently. The text data thus read are integrated or multiplexed by the collective type disk controller 2510d and then delivered to the string search engine 2506 at a high speed. In the case where 12 magnetic disk devices are operated simultaneously, a reading rate about ten times as fast as that in the case of use of only one device can be obtained.

Collective information from the string search engine 2506 is delivered to the query resolving program 2545, in which a judgment is made as to whether the text data satisfies the designated neighbor condition and contextual condition. The result of the judgment is delivered to the search result storage memory 2546 in the form of a document identifier as final search result information.

When contracted search or text search is finished, that is, when a search process is finished, the search result indicating program 2547 on the search machine control computer (CPU$_0$) 2550 is operated to read bibliographic items, such as the number of search results, names and authors of hit documents, or the like, from the collective type magnetic disk unit 2510c by reference to the document identifiers on the search result storage memory 2546 to thereby make up a list on the display 2520 or to read text data of hit documents from the collective type magnetic disk unit 2510c based on the designation of a user to thereby indicate the text data on the display 2520. Further, in the case wehre the user designates seeing of figures or image information in hit documents, correspoonding image data are read from the image data file 2530 and indicated on the display 2520.

Thus, the second embodiment of the full text search system provided according to the present invention has been described above.

Although this embodiment has shown the case where a collective type disk controller 110d (FIG. 20) is used as a text data file 110 (FIG. 1) for storing text data, the invention can be applied to the case where a collective type optical disk unit may be used to increase the capacity of the text data file 110. In short, the magnetic disk devices 110e1 to 110e12 are replaced by optical disk devices. In the case where optical disk devices are used, the text search speed is reduced because optical disk devices are inferior to magnetic disk devices in access speed. An addition type optical device can be used in the case where correction of text data is not required. A rewritable type optical device can be used in the case where correction of text data is required.

Figure 75:
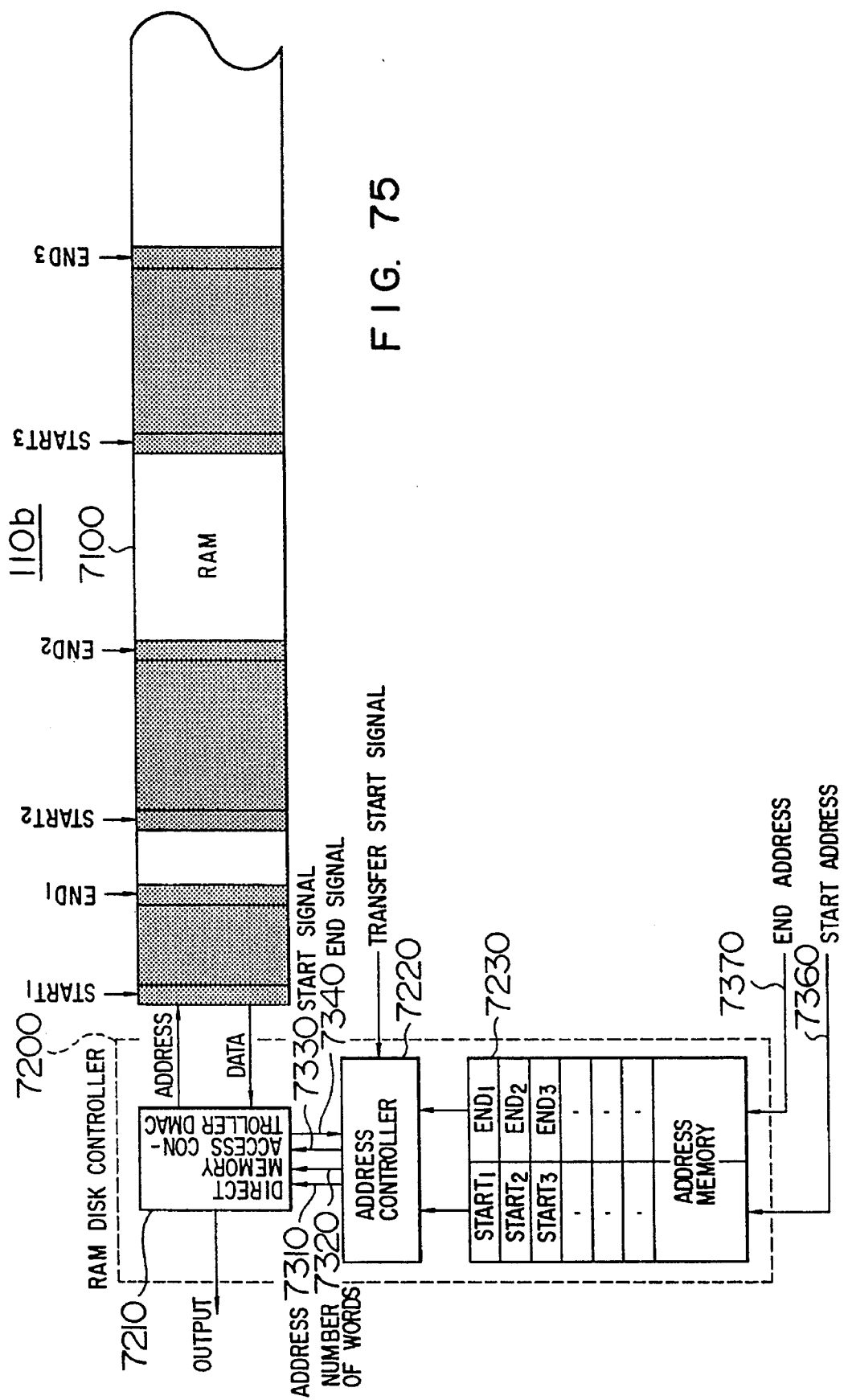
FIG. 75 is a view showing an example of a RAM disk device.

In the following, a specific embodiment of the RAM disk device 2510b used in the second embodiment of the invention is described with reference to FIG. 75.

In the drawing, the RAM disk device 2510b comprises a semiconductor memory 7100 (RAM) for storing contracted texts, and an RAM disk controller 7200 for controlling the reading of the contacted texts on the semiconductor memory 7100.

The RAM disk controller 7200 is composed of a direct memory access controller 7210 (DMAC), an address controller 7220, and an address memory 7230. The address memory 7230 is arranged so that pairs of data each composed of a start address STARTn and an end address ENDn can be set in the address memory to indicate areas of the semiconductor memory 7100 to be read. The start address 7360 and the end address 7370 are given by the search execution control program 2508 based on information pertaining to the identifiers of contracted texts written in the search result storage memory 2546 and indicating targets to be read, by reference to contracted text storage information managed in the search execution control program 2508.

The address controller 7220 reads readout-area address information stored in the address memory 7230, that is, reads a start address $START_1$ and an end address $END_1$ based on an operation signal given from the search execution control program 2508, calculates a top address 7310 of an area to be read and the number 7320 of words to be read and sets them in the direct memory address controller 7210 to operate it. The direct memory access controller 7210 reads data from the designated area of the semiconductor memory 7100 based on the designated address 7310 and word number 7320.

When reading is finished, the direct memory access controller 7210 sends an end signal 7370 to the address controller 7220. The address controller 7220 receiving it reads information pertaining to next transfer address, that is, a start address $START_2$ and an end address $END_2$, calculates a top address 7310 of an area to be read and the number 7320 of words to be read and sets them in the direct memory access controller 7210 to operate it. The direct memory access controller 7210 reads data from the designated area of the semiconductor memory 7100 based on the designated address 7310 and word number 7320.

Data in the semiconductor memory 7100 corresponding to transfer information set in the address memory 7230 can be perfectly read out by repeating the aforementioned procedure.

Thus, an example of the RAM disk device 2510b has been described above.

Figure 13:
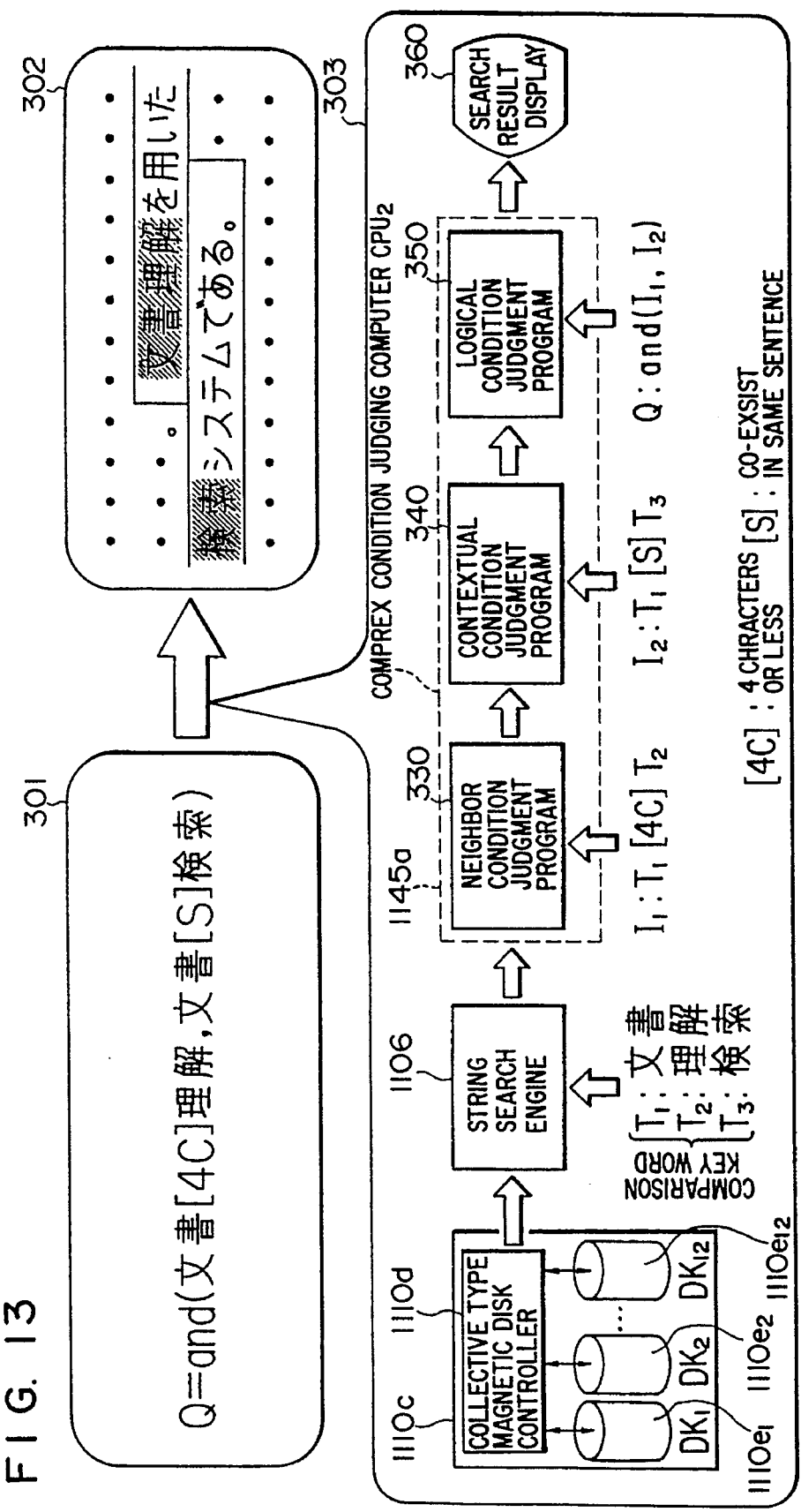
FIG. 13 is a view showing in detail the query resolver.

In the following, a more detailed embodiment of the query analysis program 2541 (FIG. 25) in the second embodiment of the invention is described with reference to FIG. 13.

In this embodiment, the query analysis program 1141 has a pipe-line structure composed of a neighbor condition judgment program 330, a contextual condition judgment program 340 and a logical condition judgment program 350.

In respect to the search execution control step, the case of execution of text search is described as an example. In short, in respect to input text data, text data are given from the collective type magnetic disk unit 1110c to perform key word retrieval and comparison based on the text data by using the search engine 1106.

In respect to the search conditional expression, a complex conditional expression 301 including logical conditions, neighbor conditions and contextual conditions is given.

Complex conditional expression 301: Q=and
　　(文書[4C] 理解, 文書[S] 検索)

The complex conditional expression 301 means retrieval of a document (or documents) which has terms "文書 (bunsho; kanji)" and "理解 (rikai; kanji)" arranged in the order and at a distance of not more than 4 characters and which has terms "文書 (bunsho; kanji)" and "検索 (kensaku; kanji)" coexisting in one sentence. In short, "文書[4C]検索" expresses a neighbor condition in which terms "文書 (bunsho; kanji)" and "理解 (rikai; kanji)" are arranged in the order and at a distance of not more than 4 characters. Further, "文書[S]検索" expresses a contextual condition in which terms "文書 (bunsho; kanji)" and "理解 (rikai; kanji)" coexist in one sentence. Further, "and (. . . , . . . )" expresses a logical condition in which the two expressions are satisfied simultaneously.

When the complex conditional expression 301 is designated, the search conditional expression is analyzed based on the search expression analysis program 1102 as described above in the second embodiment (FIG. 25), so that key words contained in the search conditional expression, that is, terms "文書 (bunsho; kanji)", "理解 (rikai; kanji)" and "検索 (kensaku; kanji)", are extracted. Identifiers $T_1$, $T_2$ and $T_3$ are given to the key words and then delivered to the synonym development program 1103 and the different notation development program 1104. For simplification of description, it is now assumed that there is no term developed into synonyms and different notations. Accordingly, terms obtained as the result of the synonym and different notation development are input key words "文書 (bunsho; kanji)", "理解 (rikai; kanji)" and "検索 (kensaku; kanji)". These terms are delivered to the automaton generating program 1107, in which an automaton for performing comparison with respect to the terms is generated, so that the state transition table thereof is set in the search engine 1106.

On the other hand, the complex condition in the search conditional expression is decomposed, based on the query analysis program 1141, into a neighbor condition "文書[4C]理解", a contextual condition "文書[S]検索" and a logical condition "and (. . . , . . . )". At this time, the key words in the respective conditional expressions are replaced by the key word identifiers (also called "term identifiers") given at the time of the generation of the automaton. Accordingly, the neighbor condition is represented by an expression "$T_1[4C]T_2$". The contextual condition is represented by an expression "$T_1[S]T_3$". Further, item identifiers $I_1$ and $I_2$ are given to the conditional expressions, respectively. Accordingly, the logical conditional expression is represented as "and $(I_1, I_2)$". The aforementioned procedures are respectively carried out in the neighbor condition analysis program 2542 (FIG. 25), the contextual condition analysis program 2543 (FIG. 25) and the logical condition analysis program 2544 (FIG. 25). The respective conditions expressed by term identifiers and item identifiers are delivered to the respective condition judgment programs in the query resolving program 2545 (FIG. 25).

When the automaton state transition table for search term comparison and the search term identifier information are set in the search engine 1106 and then the respective conditional expressions described by search term identifiers and item identifiers are set in the neighbor condition judgment program 330, the contextual condition judgment program 340 and the logical condition judgment program 350, the collective type magnetic disk unit 1110c, the search engine 1106, the query analysis program 1145, the neighbor condition judgment program 330, the contextual condition judgment program 340 and the logical condition judgment program 350 are actuated to start based on the search execution control program 1108.

As a result, text data are read from the collective type magnetic disk unit 1110c and delivered to the search engine 1106. When any one of the designated search terms "文書 (bunsho; kanji)", "理解 (rikai; kanji)" and "検索 (kensaku; kanji)" is detected in the search engine 1106, a corresponding term identifier is delivered to the neighbor condition judgment program 330 together with positional information for indicating the position thereof in a text in which the search term identifier $T_1$, $T_2$ and $T_3$ are detected. Also, punctuation mark "○" is detected by the search engine 1106 regardless of designation of a user, so that a corresponding punctuation mark identifier $T_0$ together with positional information is delivered to the neighbor condition judgment program 330.

In the neighbor condition judgment program 330, the search term identifier delivered from the search engine 1106 is referred to the designated neighbor condition, inclusively of positional information. If the designated neighbor condition "$T_1[4C]T_2$", that is "文書[4C]理解", is satisfied, an item identifier I1 corresponding to the condition as the result of comparison is delivered to the contextual condition judgment program 340, together with the punctuation mark identifier $T_0$ and search term identifiers $T_1$, $T_2$ and $T_3$ given by the search engine 1106.

In the contextual condition judgment program 340, the designated contextual condition is checked based on the punctuation mark identifier $T_0$ and search term identifiers $T_1$ and $T_3$ and positional information thereof. The contextual condition "$T_1[S]T_3$" is judged from the arrangement of the punctuation mark identifier $T_0$ and term identifiers $T_1$ and $T_3$. In short, if $T_1$ and $T_3$ are arranged in the order and between two $T_0$, a conclusion is made that the contextual condition "$T_1[S]T_3$" is established. If one satisfying the contextual condition "文書[S]検索" is detected, an item identifier $I_2$ corresponding to the condition as the result of the comparison is delivered to the logical condition judgment program 350, together with the punctuation mark identifier $T_0$, search term identifiers $T_1$ and $T_3$ and item identifier $T_1$ given by the neighbor condition judgment program 330.

In the logical condition judgment program 350, a judgment is made based on the punctuation mark identifier $T_0$, search term identifiers $T_1$ and $T_3$ and item identifiers $I_1$ and $I_2$ given by the contextual condition judgment program 340 as to whether there exist identifiers $I_1$ and $I_2$ satisfying the designated logical condition "and $(I_1, I_2)$". In short, if the two item identifiers $I_1$ and $I_2$ are detected, the complex condition search expression Q is established, so that the text (document) is retrieved by the search expression Q. Thus, the text 302 as shown in the drawing is retrieved.

On the other hand, identifiers of text data not described above are contained in comparison data delivered from the collective type magnetic disk unit 1110c to the search engine 1106, the neighbor condition judgment program 330, the contextual condition judgment program 340 and the logical condition judgment program 350. In short, when text data satisfy the search expression Q in the logical condition judgment program 350, the document identifier thereof is delivered to the next step, that is, the search result indication program. Based on the search result indication program, the number of hit documents is indicated or bibliographic items of the hit documents are read from the collective type magnetic disk unit 1110c based on the document identifiers and indicated on the display 120.

The foregoing is the detailed description about the query resolving program 2545 (FIG. 25) in the second embodiment of the invention.

The foregoing is the detailed description about the text data file 1110 (FIG. 10) and the query analysis portion 1141 (FIG. 10) in the first embodiment of the invention.

In the following, the full text search system according to the present invention is described in detail.

According to the present invention, two-stage presearch, that is, character component table search 402 and contracted text search 403 as shown in FIG. 15, is employed as a scanning type full text search accelerating method. In short, the two-stage presearch is carried out before the text search 403 to thereby narrow down the number of times for reference to texts stored in the magnetic disk. Accordingly, the quantity of text search processing which requires a large part of search time can be reduced, so that the total search time can be shortened.

All of the foregoing are controlled by a search execution control program. First, an embodiment of the character component table search as a first presearch stage is described.

Figure 16:
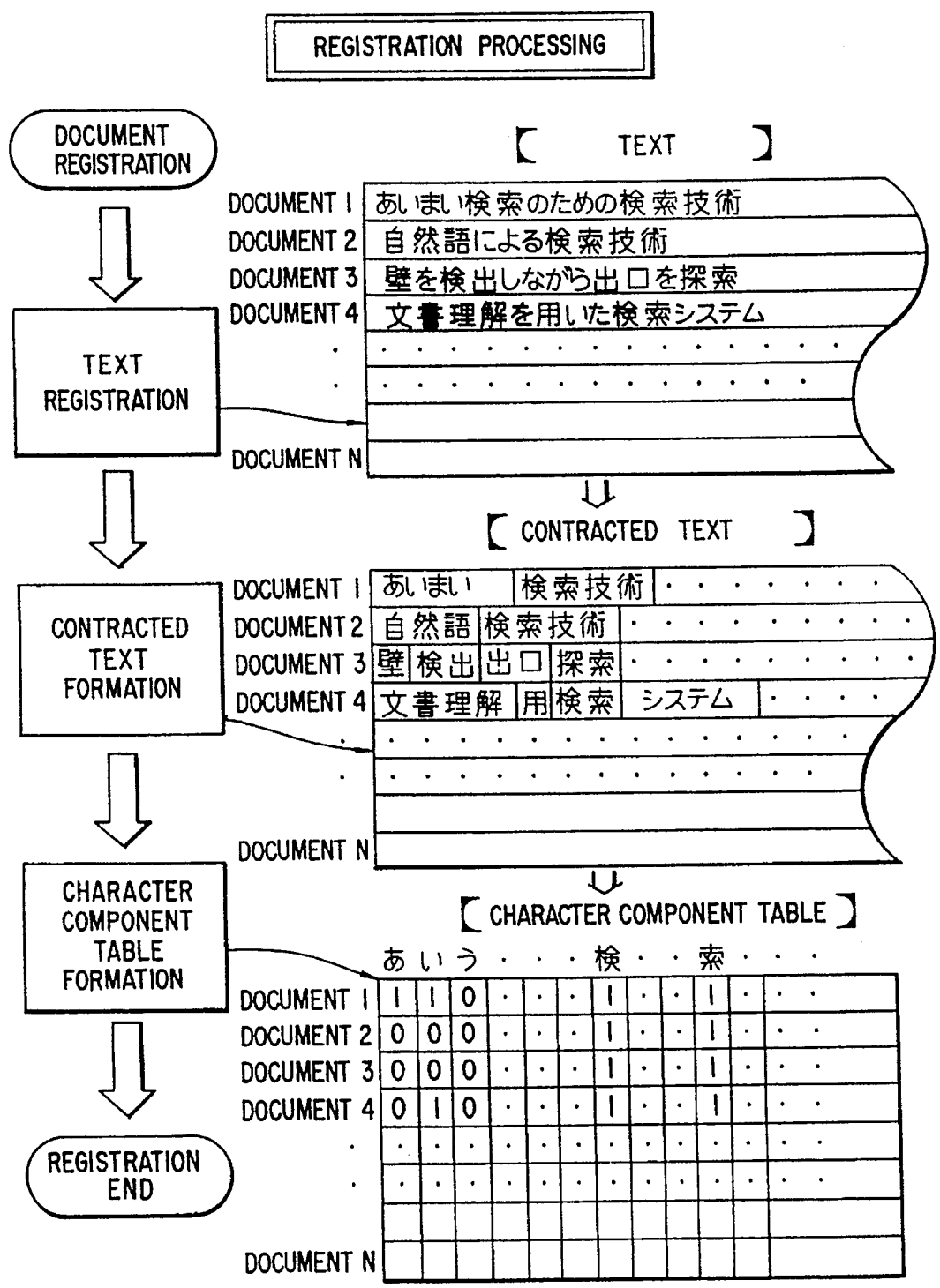
FIG. 16 is a view showing a text registration procedure.

In the character component table search, a list of documents containing character codes in the texts thereof with respect to all the character codes in the contracted texts (which will be described later) thereof is generated according to a flow of the whole of registration process as shown in FIG. 16 and a hash coding procedure as shown in detail in FIG. 18. In short, character codes in each document are represented by one-bit information (called "bit list") and then hashed to form a character component table 500.

Figure 18:
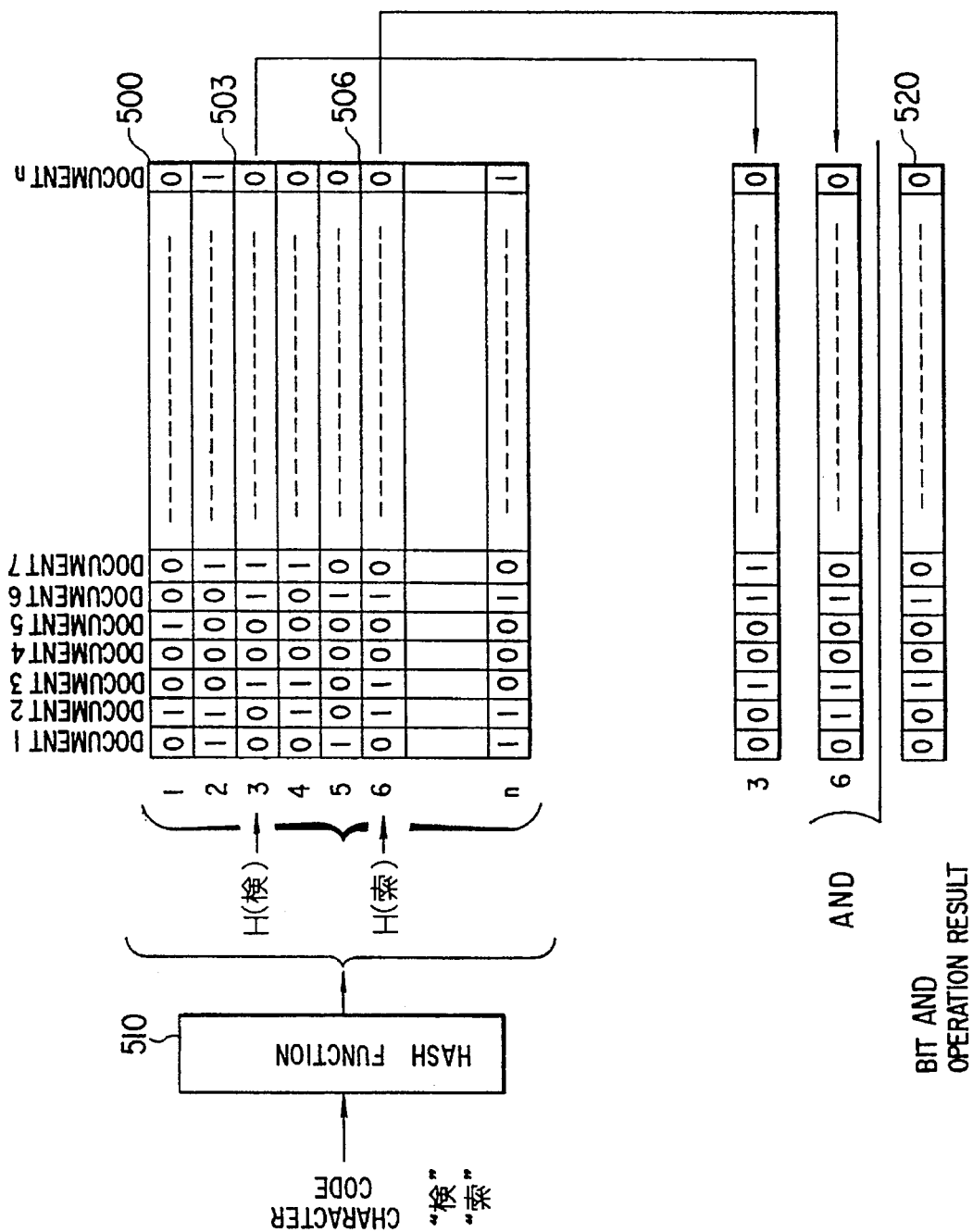
FIG. 18 is a view showing an example of construction of the character component table and an example of search using the character component table.

For example, when a key word "検索 (kensaku; kanji)" is designated, entry addresses of the respective characters "検 (ken; kanji)" and "索 (saku; kanji)" in the character component table 500 are detected through a hash function 510 as shown in FIG. 18. A bit list 520 for documents containing two characters "検 (ken; kanji)" and "索 (saku; kanji)" is detected by ANDing the bits of bit lists 503 and 506 obtained from hash values of character codes.

Figure 23:
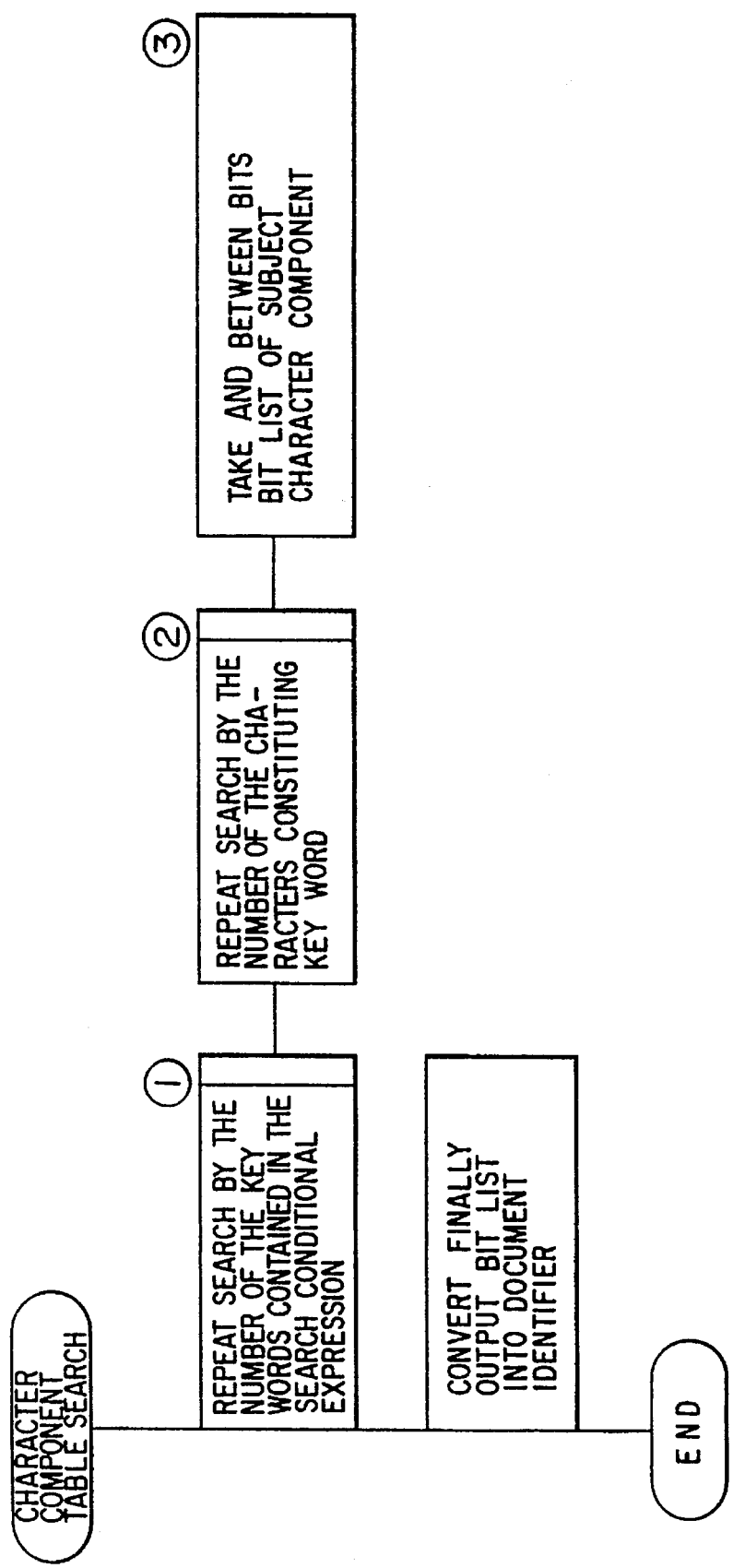

The aforementioned character component table search procedure is as shown in FIG. 23. In short, character component table search is repeated by the number of key words contained in the designated search conditional expression. In the character component table search for each key word, ANDing of bits of bit lists is repeated by the number of characters contained in the key word. As a result, candidate documents having the possibility that the key word is contained are obtained in the form of a bit list corresponding to each key word. Finally, the bit list thus obtained is converted into document identifiers. The respective document identifier is document number determined uniquely in the inside of the system. In short, the document identifiers are numbered correspondingly to the bit position from the head of the bit list.

When an AND operation condition is contained in the designated search conditional expression in the character component table search, the AND operation condition is processed in the period of the character component table search to narrow down the number of candidate documents to thereby shorten the total search time.

For example, the case where a search conditional expression

Figure 24:
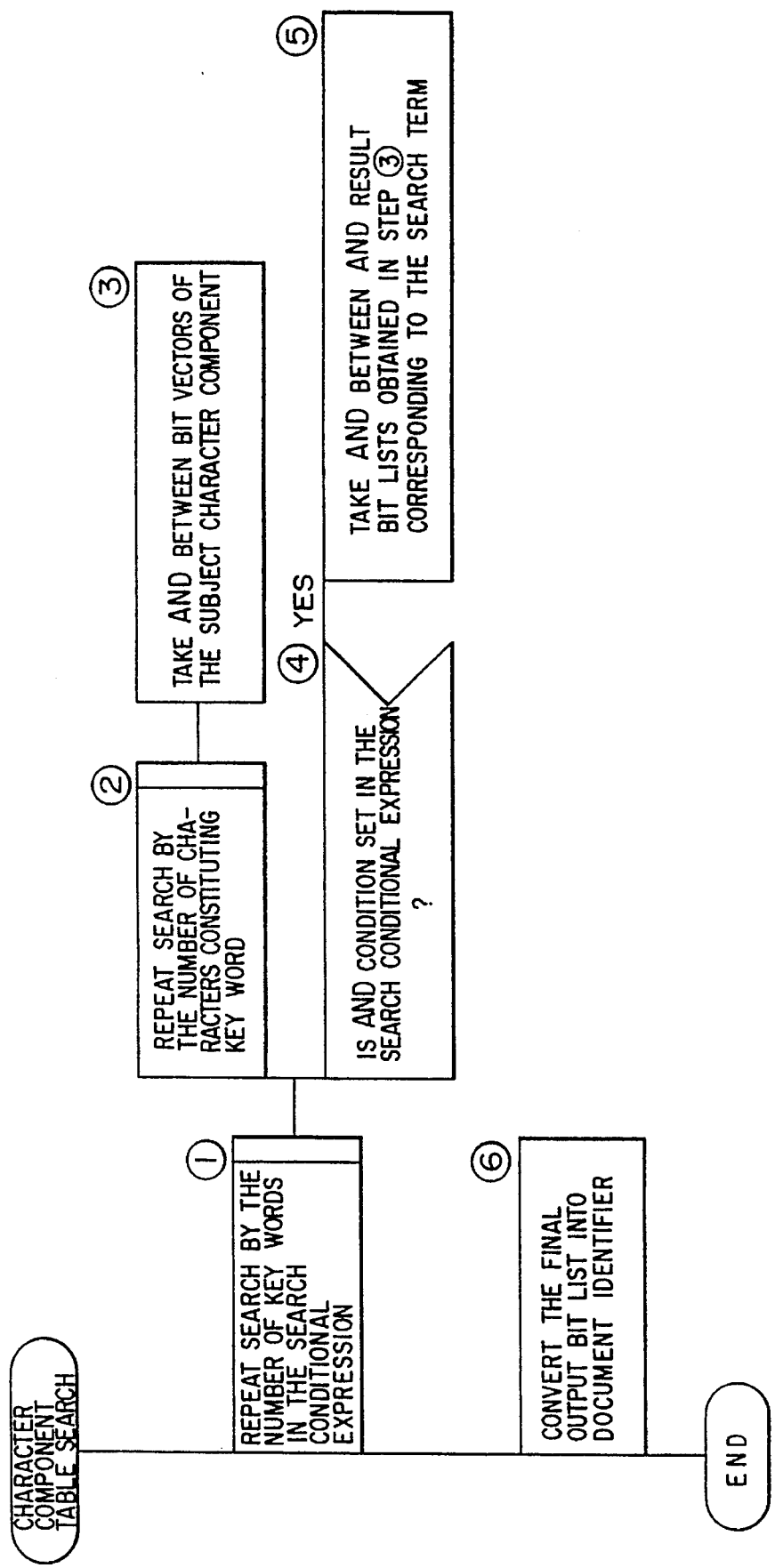

"Q=and (文書, 検索)"
is given is now explained. The search conditional expression means retrieval of documents containing two terms "文書 (bunsho; kanji)" and "検索 (kensaku; kanji)". In this case, character component table search is made with respect to the key word "文書 (bunsho; kanji)" and then character component table search is made with respect to the key word "検索 (kensaku; kanji)". Then, a final result of character component table search is obtained by ANDing bits of bit lists as search results with respect to the two key words. The procedure is shown in FIG. 24. In the drawing, character component table search is repeated by the number of key words contained in the search conditional expression.

In the character component table search for each key word, ANDing of bits of bit lists is repeated by the number of characters contained in the key word. After the procedure is repeated by the total number of the key words, bit lists as results of character component table search with respect to the respective key words are ANDed. The bit list thus finally obtained expresses candidate documents which can contain all key words designated by the AND operation condition in the search conditional expression.

When an AND operation condition is contained in the designated search conditional expression as described above, the character component table search, the AND operation condition is processed in the period of the character component table search to narrow down the number of candidate documents to thereby shorten the total search time.

Figure 17:
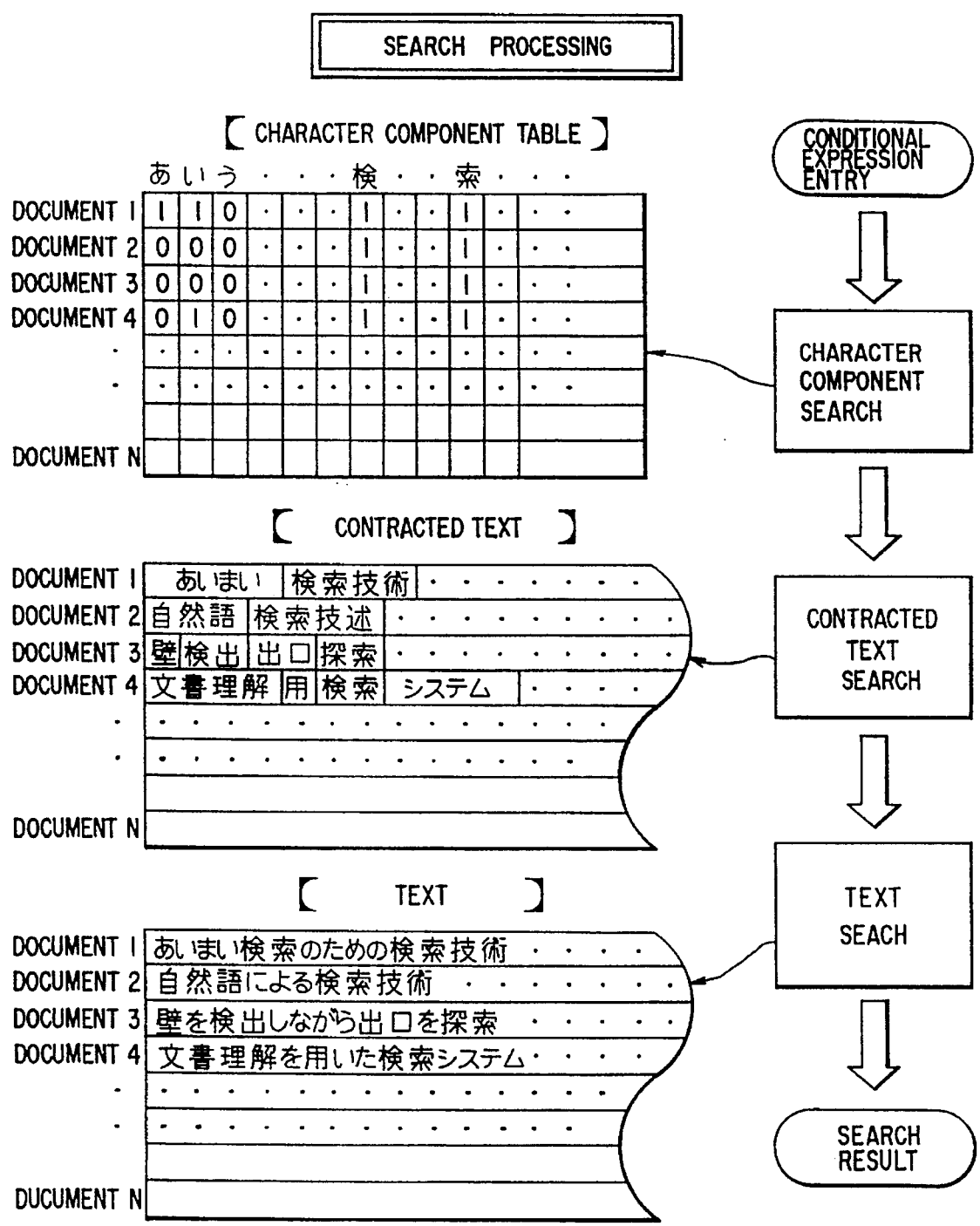
FIG. 17 is a view showing a procedure for performing retrieval processing based on a character component table registered and generated in FIG. 16.

Because the presence of documents with respect to each character code is expressed by one-bit information and hashed, the quantity of the character component table 500 can be reduced to a value obtained by dividing the quantity of crude text data by several tens. Accordingly, the quantity of data to be searched can be reduced to a very small value to contribute to the increase of search speed. However, noise is produced when only the character component table search is used. That is to say, texts containing "検 (ken; kanji)" and "索 (saku; kanji)" arranged apart from each other, for example, document 3 in FIG. 17 (showing a search procedure), are retrieved undesirably. The second presearch stage, that is, contracted text search, is provided to eliminate the noise.

Figure 19:
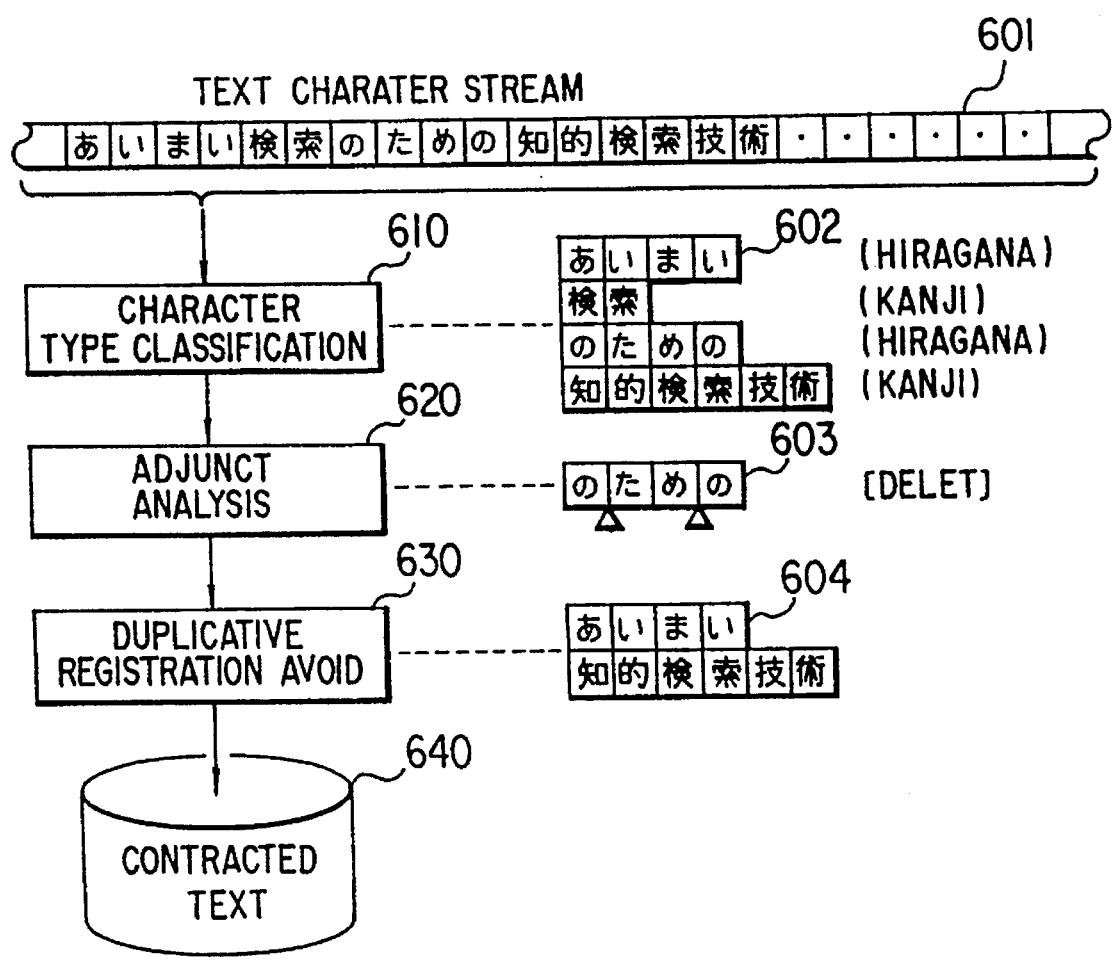
FIG. 19 is a view showing generation of a contracted text.

In the contracted text search as the second presearch, retrieval is made with respect to contracted text. The contracted text is formed by removing adjuncts, such as postpositional words, conjunctions, and the like, from the text and avoiding duplication of words which appear repeatedly. FIG. 19 shows a method of generating the contracted text. The text character string "あいまい検索のための知的検索, 技術" 601 is now taken as an example. In a character type classification process 610, the input character string is classified into different character types. In this example, the string is decomposed into four terms 602 "あいまい (aimai; hiragana)", "検索 (kensaku; kanji)", "のための (notameno; hiragana)" and "知的 検索技術 (chitekikensakugijutsu; kanji)".

Then, in the adjunct analyzing process 620, the hiragana terms "あいまい" and "のための" among the terms 602 classified by types are subjected to adjunct analysis to remove words considered to be adjuncts which are not used for retrieval. In short, words considered to be postpositional words or conjunctions are eliminated. Because such words exist in almost of documents, almost of documents are hit when such words are used as key words. Accordingly, such words are unsuitable as key words for retrieval. In this example, all partial terms of the hiragana term "のための" 603 are considered to be unnecessary words for retrieval, that is, postpositional word "の", conjunction "ため" and postpositional word "の". Accordingly, the term 603 is removed. On the other hand, the term "あいまい" cannot be considered to be an adjunct. Accordingly, the term is left in the contracted text. In this case, the term "あいまい" is not always recognized as a noun. In short, new words are always registered in the contracted text.

Finally, in the duplicative registration avoiding process 630, a judgment is made as to whether duplication of words exists in the remainder of the terms 602 after removing unnecessary words. If duplication of words exists, words appearing again are removed to avoid duplicative registration. If one term is not quite the same as the other but is included in the other, the term included in the other is unnecessary and removed. In the example shown in the drawing, "検索 (kensaku; kanji)" included in "知的検 索技術 (chitekikensakugijutsu; kanji)" is cut off to avoid duplicative registration. As a result, terms "あいまい (aimai; hiragana)", "検索 (kensaku; kanji)" and "技術 (gijutsu; kanji)" are left finally as the contracted text. Because the contracted text is obtained as information compression of the original text with respect to words, only documents in which a key word appears as a continuous character string such as for example "検索 (kensaku; kanji)", that is, as a word, can be picked up.

The contracted text thus generated can be compressed to about 20–25% compared with the original text. Accordingly, the full text search speed can be increased equivalently by about five times. Further, the equivalent scanning speed can be increased by placing the contracted text on a high-speed access memory such as a semiconductor memory or the like.

Further, the method of generating the contracted text is different from the method of cutting out words necessary for retrieval by using a key word dictionary. In short, because a method of removing only grammatically analyzable unnecessary words without use of any dictionary is used, there is no risk that necessary words may be cut off. Accordingly, the method has a characteristic in that an omission in retrieval little occurs. In the conventional search system, an omission in retrieval often occurs because new words not registered in the key word dictionary cannot be picked up. However, in this system, an omission in retrieval caused by new words does not occur because such new words are not dropped out from the contracted text.

Figure 10:
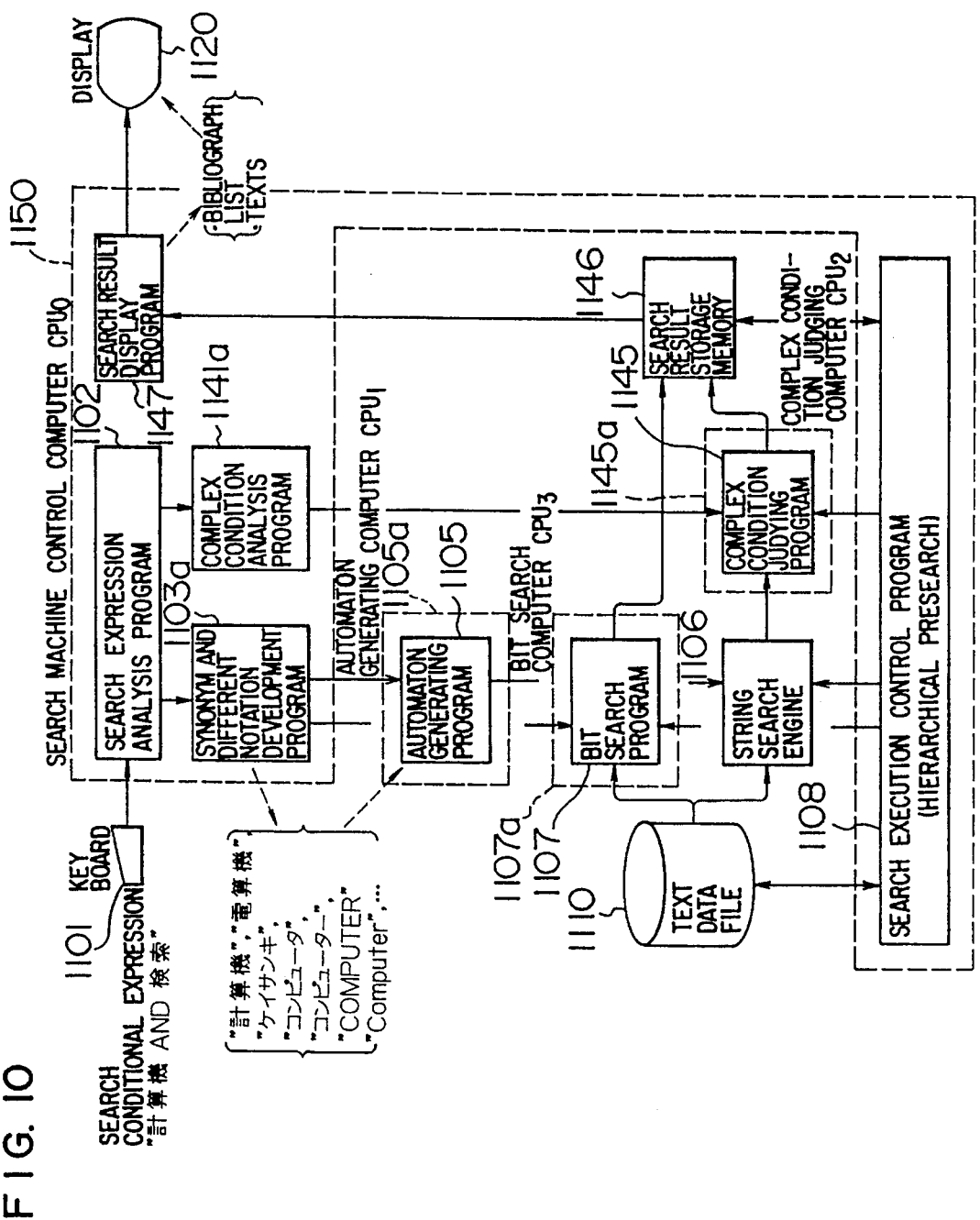
FIG. 10 is a block diagram showing the outline of a first embodiment of the present invention.
Figure 12:
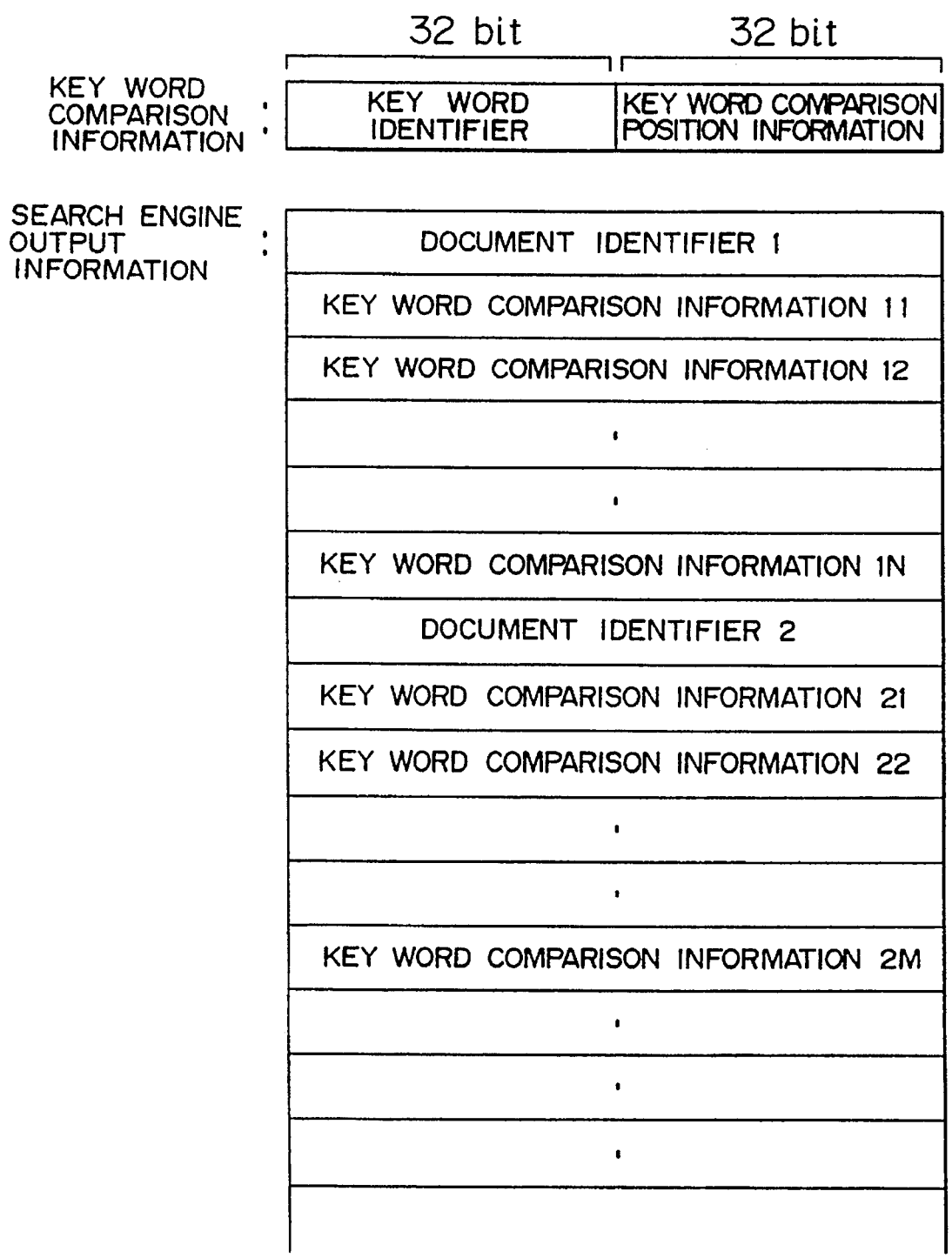
FIG. 12 is a view showing an example of search engine output information containing comparison position information.

The contracted text search is carried out by using the search engine 1106 (FIG. 10). Then, final retrieval based on the complex condition is made by searching text data with respect to documents narrowed down as the result of the contracted text search. In short, in the text search, retrieval is made based on the judgment of the neighbor condition and the contextual condition which can be judged only by scanning the original text.

Figures 3, 4:
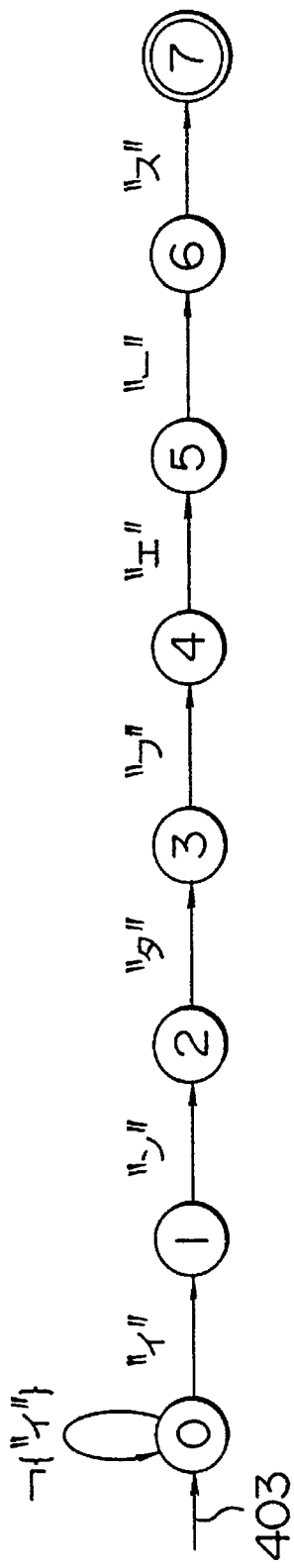

In general, the character component table and the contracted text, together with the text data, are stored in the collective type magnetic disk unit 1110c (FIG. 3) and loaded on the semiconductor memory device 1110a and the RAM disk device 1110b, respectively, at the time of the starting of the search system. At the time of search, they are read from the semiconductor memory device 1110a and the RAM disk device 1110b, respectively. The text data are directly read from the collective type magnetic disk unit 1110c (FIG. 13) to be subjected to search.

As described above, equivalently high-speed full text search can be attained by carrying out two-stage presearch "character component table search" and "contracted text search" to minimize the number of documents as a target of "text search" which requires a largest time.

In the text search, retrieval is made based on the judgment of the neighbor condition and the contextual condition which can be judged only by scanning the original text. In general, the character component table and the contracted text are stored in the collective type magnetic disk unit and loaded onto the RAM disk at the time of the starting of the search system. At the time of search, they are read from the RAM disk. The text data are directly read from the collective type magnetic disk unit 2510 (FIG. 25).

As described above, equivalently high-speed full text search can be attained by carrying out two-stage presearch to minimize the number of documents as a target of text search which requires a largest time.

Figure 21:
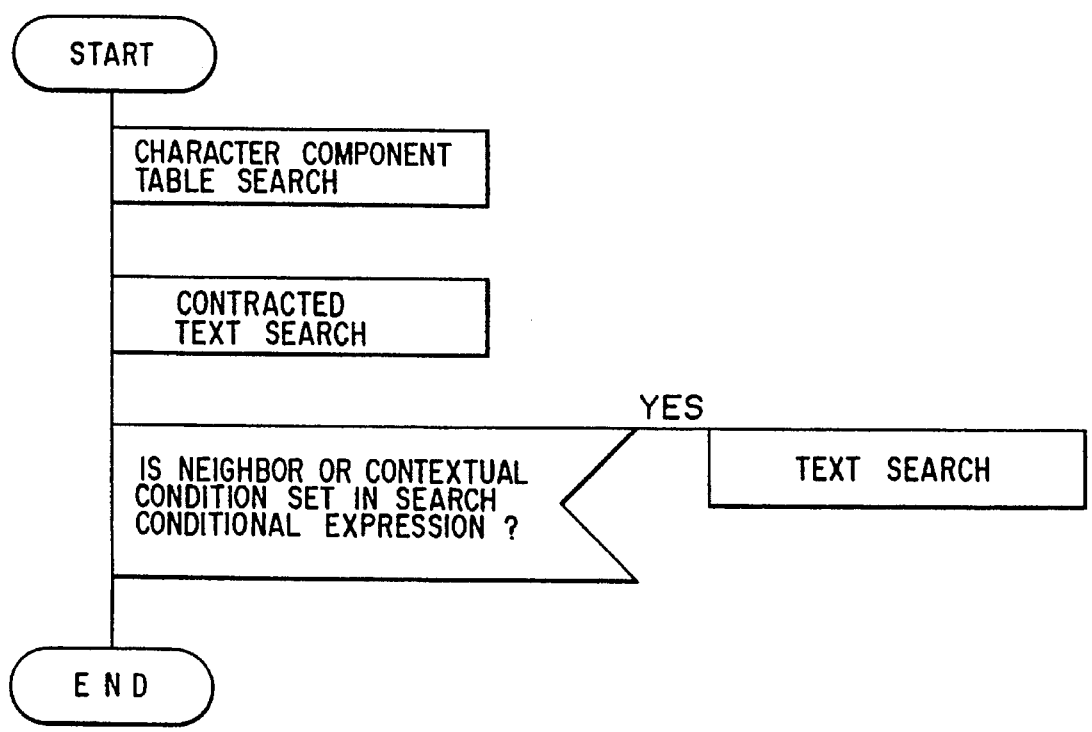

In this three-stage search, there is no necessity of text search in the case where both neighbor condition search and contextual condition search are not designated. Accordingly, retrieval can be perfected only by character component table search and contracted text search. In short, in the case where there is no neighbor or contextual condition contained in the designated search conditional expression as shown in FIG. 21, retrieval can be perfected only by detecting whether the designated key word exists as a word. Accordingly, retrieval can be perfected by character component table search to extract documents containing constituent characters of the designated key word and contract text search to extract documents containing the key word as a word from the contracted texts of the documents obtained by the character component table search. As a result, unnecessary text search requiring a large search time can be omitted, so that the total search time can be shortened.

Figure 22:
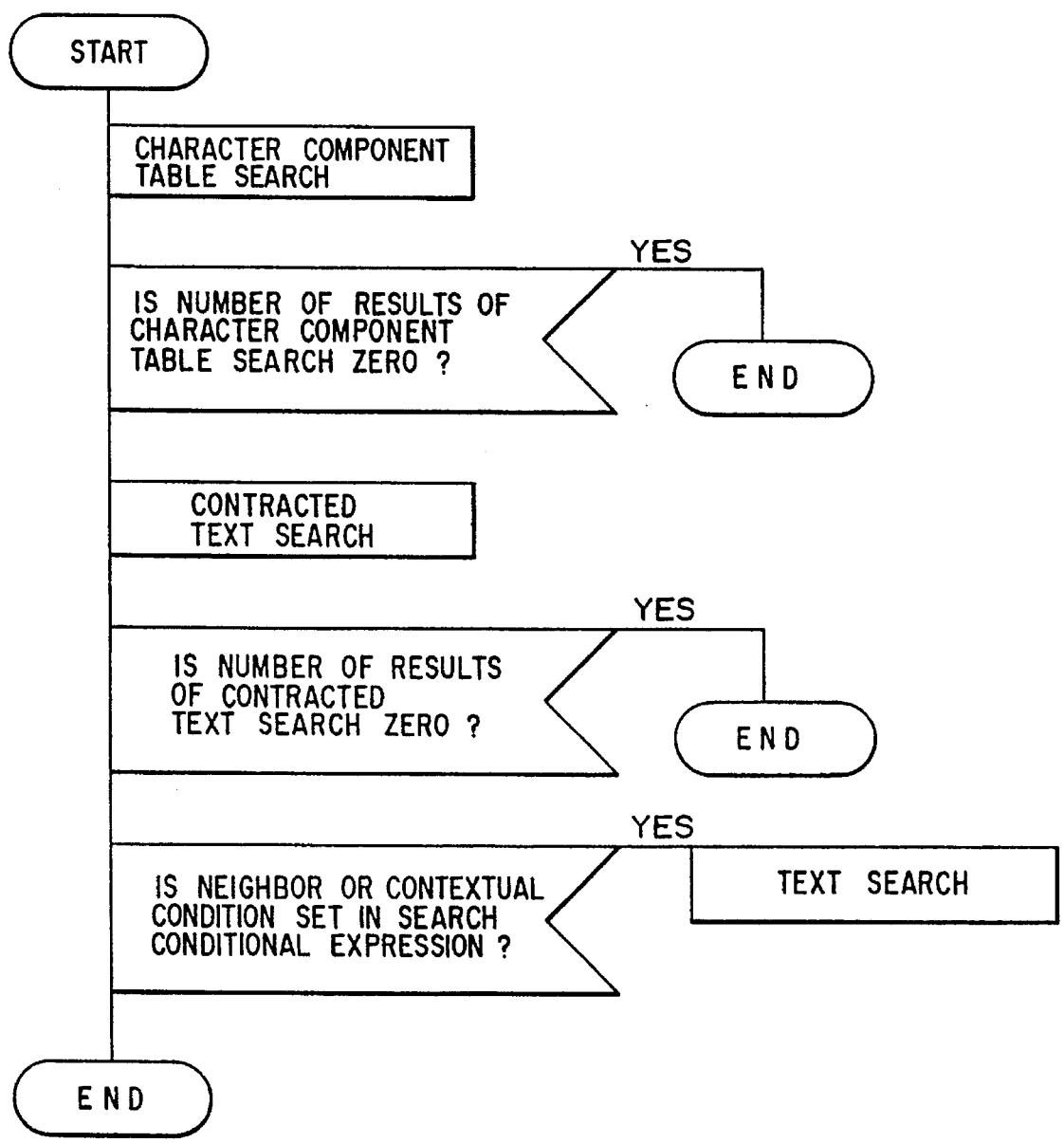

In the case where no document is obtained by the character component table search as a first stage of the three-stage hierarchical search, retrieval can be cut off soon. In short, the contracted text search as the next stage and the text search as the final stage can be omitted even though the neighbor or contextual condition is designated as shown in FIG. 22. Similarly, in the case where no document is obtained by the contracted text search, the text search as the next stage can be omitted even though the neighbor or contextual condition is designated. As this result, retrieval process can be carried out in a minimum time corresponding to the given search conditional expression.

In the aforementioned hierarchical presearch, a method of narrowing down the number of candidate documents based on the character component table and contracted text placed on the semiconductor memory and performing final search while reading the texts of the documents from the collective type magnetic disk unit is employed. In the method in which the contracted text is placed on the semiconductor memory, cost in the search system is increased by the use of the semiconductor memory. Accordingly, the semiconductor memory can be omitted by carrying out search with the contracted text placed on the magnetic disk unit, so that cost in the system can be saved.

However, in the case where contracted text search is carried out based on the result narrowed down by the character component table search, the contracted text is read selectively from the collective type magnetic disk unit. In this case, a relatively small quantity of multiple data are accessed, so that effective reading speed from the collective type magnetic disk unit, that is, "throughput" is greatly affected by seek time rather than data readout time. Accordingly, in the case where the number of documents is large as the result of the character component table search, contracted text search time becomes very large compared with the case where the contracted text is placed on the semiconductor memory having very short access time. Because the number of seekings can be reduced by collectively reading all documents as one file rather than selectively reading the contracted text, reading can be perfected in a further shorter time.

Figure 20B:
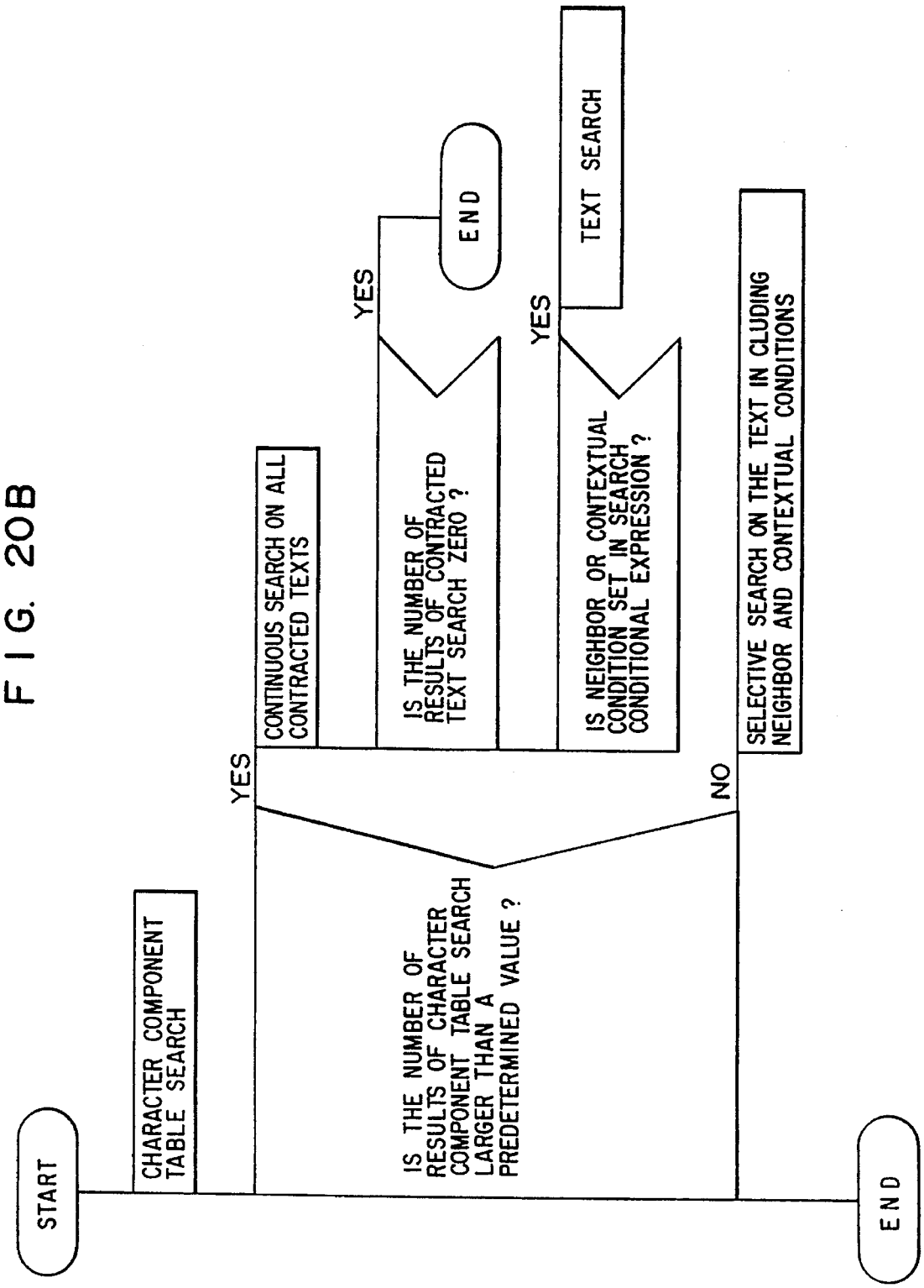

Accordingly, in the case where retrieval is made while the contracted text is placed on, not semiconductor memory, the magnetic disk unit, in order to save cost in the search system, retrieval with no large reduction of search speed can be perfected by the procedure as shown in FIG. 20A. In short, in the case where the number of documents obtained by the character component table search is larger than a predetermined number, the result of the character component table search can be so neglected that the presence of the designated key word is retrieved by newly reading the contracted text from the collective type magnetic disk unit. On the contrary, in the case where the number of documents obtained by the character component table search is smaller than a predetermined number, contracted text search is made by selectively reading the contracted text from the collective type magnetic disk unit.

The predetermined number herein used is the number of documents when the time required for selectively reading the predetermined number of contracted texts is equal to the time required for continuously reading the contracted texts as a file. Also in this case, and in the case where no document is obtained by the contracted text search, the search process can be cut off soon regardless of the designation of the neighbor and contextual conditions.

In the case where the quantity of the text data is small, the document is in general not redundant so that a large compression rate of the contracted text cannot be obtained. Accordingly, if file readout time is considered to be controlled by disk seek time and rotational delay, difference between the contracted text readout time and the text readout time is not large. In short, in the case where the number of documents obtained by the character component table search is smaller than the predetermined number, the text search method of selectively reading text data on the collective type magnetic disk as shown in FIG. 22B is efficient. In the case where the number of documents obtained by the character component table search is larger than the predetermined number, the result of the character component table search can be so neglected that the presence of the designated key word is retrieved by newly reading all the contracted texts from the collective type magnetic disk unit. In this case, if no document is obtained by the contracted text search, the search process is cut off soon regardless of the designation of neighbor and contextual conditions. If the number of documents obtained by the contracted text search is not zero, a judgment is made as to whether the conditional expression includes at least one neighbor or contextual condition. When the conditional expression includes at least one neighbor or contextual condition, text search is carried out. On the contrary, in the case where the number of documents obtained by the character component table search is smaller than the predetermined number, text search, inclusive of search based on the neighbor and contextual conditions, is made by selectively reading the texts from the collective type magnetic disk unit. When the average quantity of text data is relatively small, further efficient search can be made through the aforementioned search procedure.

Because the search process in which contracted texts are stored in the collective type magnetic disk unit can be carried out with no increase of search time by changing the contracted text readout method corresponding to the number of documents obtained by the character component table search, a low-cost high-performance full text search system can be provided.

In the following, a modified example of the synonym and different notation development according to the invention is explained.

Figure 28:
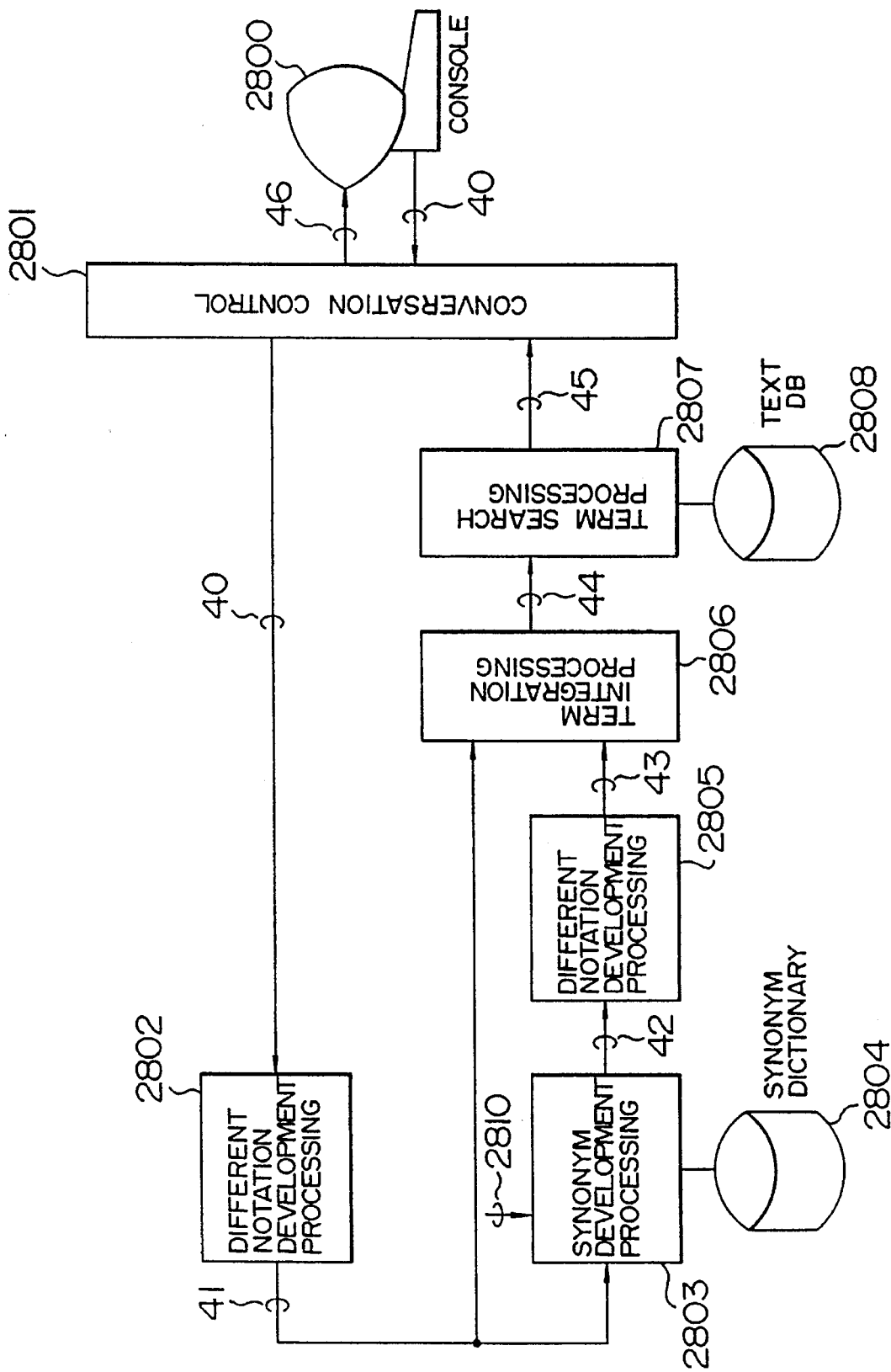
FIG. 28 is a block diagram showing the embodiment.

FIG. 28 is a block diagram showing the construction of an embodiment of the system according to the invention. The system in this embodiment comprises a console 2800, a conversation control portion 2801, different notation development processing portions 2802 and 2804, a synonym development processing portion 2803, a synonym dictionary file 2804, a term integration processing portion 2806, a term search processing portion 2807, and a text data base 2808. A search term 40 given through the console 2800 is delivered to the different notation development processing portion 2802 through the conversation control portion 2801. A group of terms 41 obtained by the different notation development processing portion 2802 are delivered to both the synonym development portion 2803 and the term integration processing portion 2806. In the synonym development processing portion 2803, a judgment is made by reference to the synonym dictionary 2804 as to whether the group of terms 41 are matched with headwords of the dictionary. When a term matched to a headwords is detected, synonym terms described in the dictionary correspondingly to the headword are delivered, as a group of terms 42, to the different notation development processing portion 2805 according to a synonym development mode signal 2810. In the different notation development processing portion 2805, the group of terms 42 obtained by synonym development are subjected to different notation development in the same manner as in the different notation development processing portion 2803, so that a group of terms 43 are delivered to the term integration processing portion 2806. The term integration processing portion 2806 receiving the term groups 41 and 43 from the different notation development processing portions 2082 and 2805 integrates the term groups 41 and 43 into one term group 44 and delivers the term group 44 to the term search portion 2807. The term search portion 2807 searches the text data base for terms contained in the received term group 44 and delivers identification information of hit documents as a search result 45 to the conversation control portion 2801. The conversation control portion 2801 receiving the search result 45 delivers information 46, such as the number of retrieved documents, text information and the like, to the console 2800.

The different notation development processing portions 2802 and 2805 are quite the same in construction. The term search portion 2807 can be realized by use of a known technique, for example, by use of Japanese Patent Unexamined Publication No. Sho-63-311530. Data used in the text DB 408 may be newspaper report data, document data generated by a word processor, and bibliographic item data in an electronic filing system, as long as the text DB is formed of character code information.

In the following, the construction and operation of the different notation development processing portions 2802 and 2805 and the synonym development processing portion 2803 are explained in detail.

Figure 29:
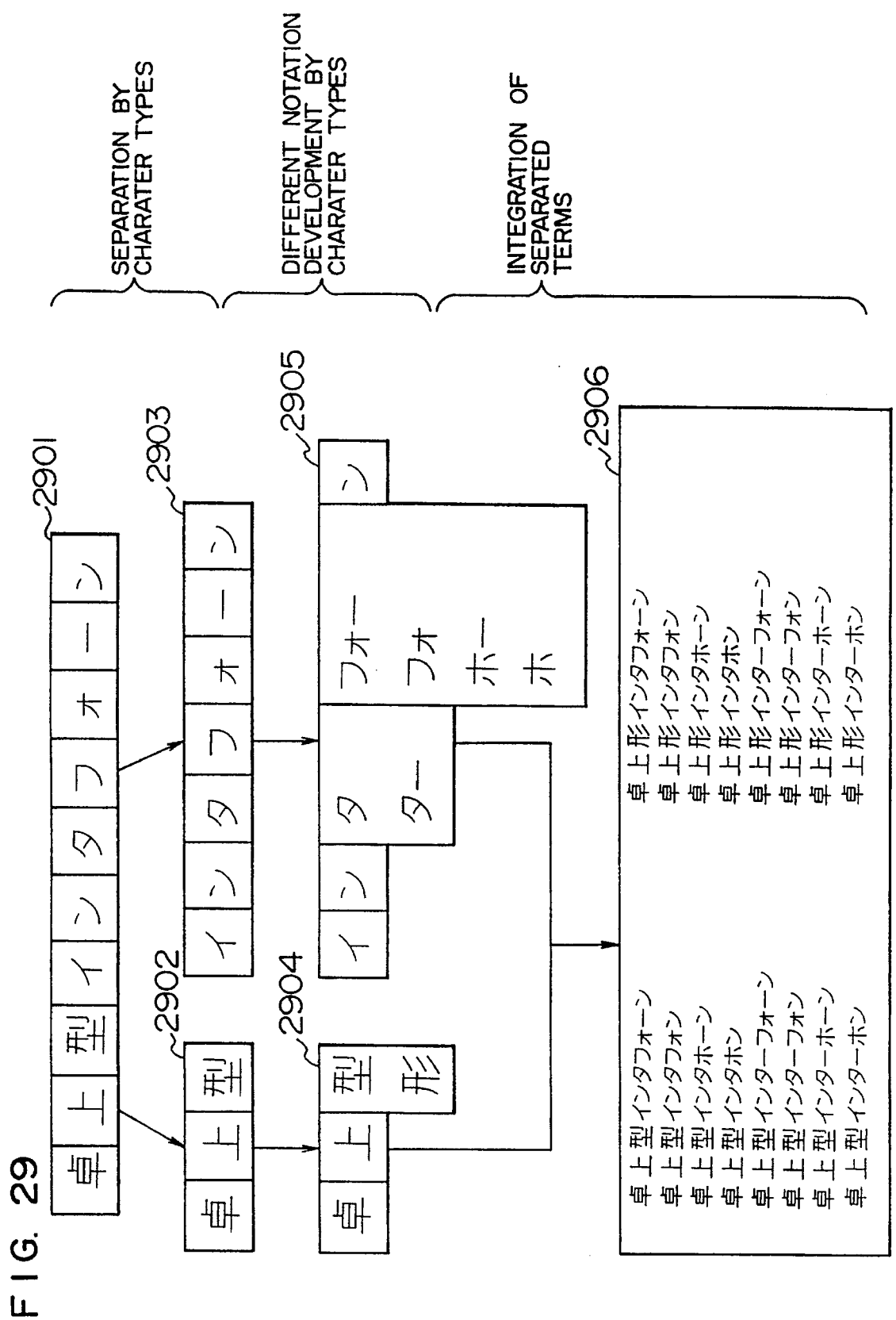
FIG. 29 is a view showing an example of steps of the different notation development process.

First, the outline of the different notation development process is described with reference to FIG. 29. A given term 2901 is separated by character types into partial terms.

For example, a given term 2901

"卓上型 イ ン タ フ ォ ー ン (takujōgataintafōn; kanji and katakana)"

is separated by character types into a kanji term 2902

"卓上型"

and a katakana term 2903

"イ ン タ フ ォ ー ン".

Then, the terms thus obtained are respectively subjected to different notation development to obtain a kanji different notation term list 2904 and a katakana different notation term list 2905. Then, the kanji different notation term list 2904 and the katakana different notation term list 2905 are respectively developed into term groups. The term groups are integrated into one final result 2906.

Figure 30:
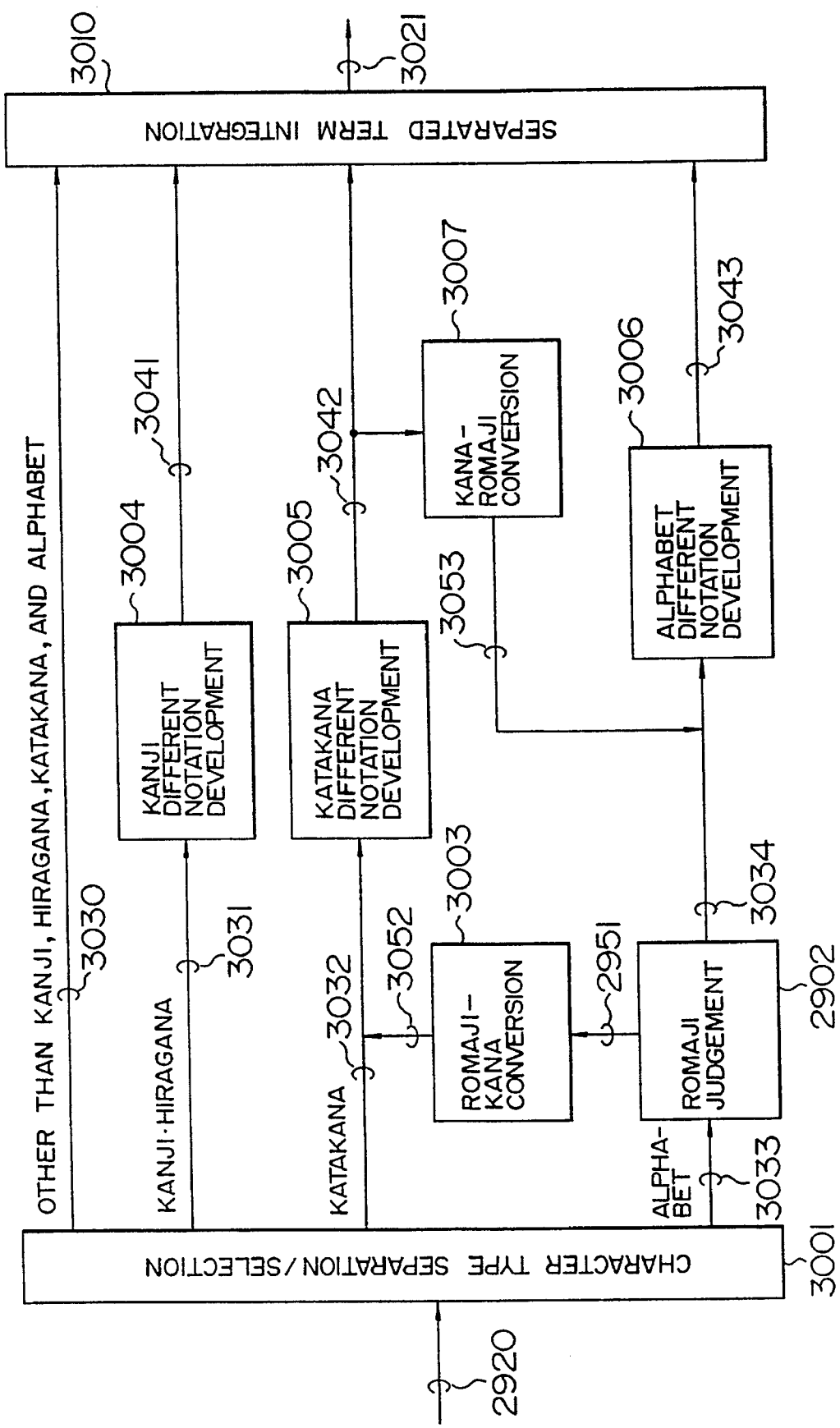
FIG. 30 is a block diagram of a different notation development means.

In the following, the different notation development process is described in detail with reference to FIG. 30. FIG. 30 is a block diagram showing an example of a different notation development means used in the present invention. In this example, the different notation development means comprises a character type separation/selection portion 3001, a romaji detection portion 3002, a romaji/kana conversion portion 3003, a kanji different notation development portion 3004, a katakana different notation development portion 3005, an alphabet different notation development portion 3006, a kana/romaji conversion portion 3007, and a separated term integration portion 3010.

A term 3020 given to the different notation development processing portion 2802 or 2805 is first delivered to the character type separation/selection portion 3001. In the character type separation/selection portion 3001, the given term 3020 is separated into 4 types of partial terms, namely, kanji and hiragana type terms 3031, katakana type terms 3032, alphabet type terms 3033 and other terms 3030, as described above. The partial terms thus obtained are classified by character types and then developed respectively. In the following, the outline of the development process applied to each character type is described.

(1) Terms except kanji and hiragana terms, katakana terms and alphabetic terms

This type terms include numeric characters, symbol strings, special characters, external character codes and the like. In this example, this type terms contained in the given term 3030 are directly delivered to the separated term integration portion 3010 with no development. However, it may be considered that an alphanumeric character is converted into a kansuji character (numeric character written in kanji) or a symbol "." is developed into "—" and "/".

(2) Kanji and hiragana terms

In respect to this type terms, the term 3031 is subjected to different notation development in the kanji different notation development portion 3004 to be developed with respect to new and old styles of kanji and declensional kana endings. The output terms 3041 from the kanji different notation development portion 3004 are delivered to the separated term integration portion 3010.

(3) Katakana terms

In respect to this type terms, the term 3032 is subjected to different notation development in the katakana different notation development portion 3005 to be developed with respect to notations of similar syllables. The terms 3042 obtained by the development are delivered to the separated term integration portion 3010. At the same time, the terms are delivered to the kana/romaji conversion portion 3007. Romaji terms 3053 obtained by the kana/romaji conversion portion 3007 are subjected to different notation development in the alphabet different notation development portion 3006 to be developed with respect to majuscules and minuscules of alphabets. The terms 3043 thus obtained are delivered to the separated term integration portion 3010.

43

(4) Alphabetic terms

This type terms are classified into two groups, namely, romaji expression in the Japanese language, and original expression in foreign languages.

First, in the romaji detection portion 3002, a judgment is made as to whether or not the term 3033 is romaji. Romaji notation (method of writing Japanese in Roman characters) is employed as a standard for the judgment. In short, when the arrangement of alphabetic characters is matched with the romaji notation, a decision is made that the term is romaji. On the contrary, when the term cannot be accepted as romaji, a decision is made that it is not romaji (that is, it is a term in a foreign language). The judgment may be made in the romaji/kana conversion portion 3003. In short, when romaji/kana conversion can be made, a decision is made that the term is romaji. On the contrary, when conversion cannot be made, a decision is made that the term is not romaji. As another method, a method using a foreign language dictionary may be employed for the judgment.

The terms 3051 judged to be romaji in the romaji detection portion 3002 are delivered to the romaji/kana conversion portion 3003 and converted into katakana terms 3052. The terms 3052 are subjected to different notation development in the katakana different notation development portion 3005 to be developed with respect to notations of similar syllables, thus to obtain a group of terms 3042. The group of terms 3042 are processed in the same manner as the katakana terms (3). In short, the group of terms 3042 obtained by katakana different notation development are delivered to the separated term integration portion 3010 and, at the same time, delivered to the kana/romaji conversion portion 3007. The group of katakana terms 3042 are respectively converted into romaji in the kana/romaji conversion portion 3007, so that a group of romaji terms 3053 thus obtained are delivered to the alphabet different notation development portion 3006. The group of romaji terms 3053 are subjected to different notation development in the alphabet different notation development portion 3006 to be developed with respect to majuscules and minuscules of alphabets. The terms thus obtained are delivered to the separated term integration portion 3010.

On the other hand, the terms 3034 judged to be not romaji in the romaji detection portion 3002 are delivered to the alphabet different notation development portion 3006 with no romaji/kana conversion. The terms 3043 obtained by the alphabet different notation development are delivered to the separated term integration portion 3010.

A flow of different notation development process has been described above. In the following, details of respective processing blocks in the different notation development process are described.

Figure 31:
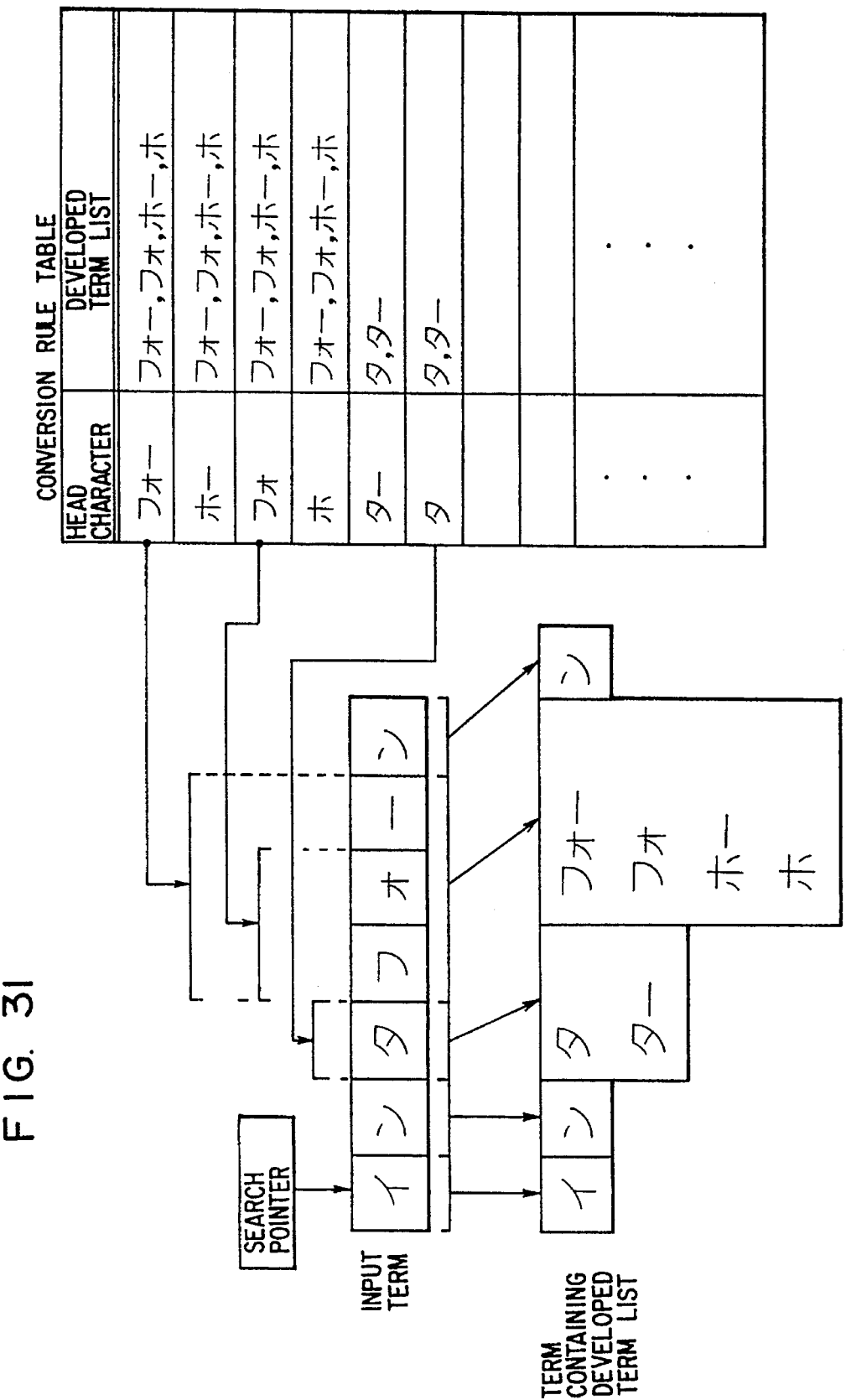
FIG. 31 is a view showing a conversion rule application process in the different notation development portion by use of a katakana term.

First, a process in the katakana different notation development portion 3005 is described. FIG. 31 is a view for explaining a process in the katakana different notation development portion 3005 in the case where a katakana term is given. In this case, the given term is as follows.

"インタフォーン (intafōn; katakana)"

The different notation development process is carried out by reference to a conversion rule. When a target of conversion exists as a partial term in the given term, the partial term is replaced with different notations by reference to the conversion rule. The form of a conversion rule table is also shown in the drawing. The conversion rule table is composed of a headword portion and a development term list portion. When a word matched with the headword portion of the conversion rule table exists in the given term, the word is successively replaced with a group of different notation terms described in the development term list portion.

44

The search for the headword is made by a maximum-length matching method, successively from the top of the given term. In short, in the case where two partial terms "フォー (fō; katakana)" and "フォ (fo; katakana)"

contained in the given term exist as headwords of the dictionary as shown in the drawing, longer one "フォー (fō; katakana)"

is adopted to the conversion rule.

The process of headword search and replacement with a development term list is explained with reference to FIG. 31. In the headword search, a search pointer is provided for comparison between the partial term in the given term and the headword. At the time of the comparison between the given term and the headword, each partial term of the given term with the search pointer at the head thereof is compared with respective headwords while the search pointer is shifted. First, the search pointer is set in the first character of the given term. Accordingly, in this example, the headword search is started from the character "イ (i; katakana)". Because there is no matched headword, the search pointer is shifted by one character to re-start headword search from a partial term with the character "ン (n; katakana)" at the head thereof. Because there is no matched headword, the search pointer is further shifted by one character to re-start headword search from the character "タ (ta; katakana)". Because a matched headword "タ (ta; katakana)"

is detected, the portion

"タ (ta; katakana)"

is successively replaced with

"タ (ta; katakana)" and "ター (tā; katakana)"

described in the development term list portion. Then, the search pointer is shifted by the number of characters used in the headword, that is, the search pointer is shifted by one character. Then, headword search is re-started from the character "フ (fu; katakana)", thus to obtain the following headwords.

"フォー (fō; katakana)" and "フォ (fo; katakana)"

Here, the two headwords are matched. In the case where a plurality of matched headwords are detected as described above, longest one is adopted to the conversion rule according to the maximum-length matching method. In this example, the headword "フォー (fō; katakana)"

is longer than the headword

"フォ (fo; katakana)".

Accordingly, the headword "フォー (fō; katakana)" is adopted to the development conversion rule, so that the partial term "フォー (fō; katakana)"

of the given term is successively replaced with terms

"フォー (fō; katakana)", "フォ (fo; katakana)",

"ホー (hō; katakana)" and "ホ (ho; katakana)"

described in the development term list portion. Then, the search pointer is shifted by the number of characters used in the headword "フォー (fō; katakana)", that is, the search pointer is shifted by three characters. Finally, headword search is re-started from the last character "ン (n; katakana)" of the given term. Because there is no matched headword, the character "ン (n; katakana)" is not developed. Thus, the headword search is finished because the search pointer is in the last position of the given term.

A final different notation development term is obtained by combining development lists of terms

"イン(タ, タ—)(フォー, フォ, ホー, ホ)ン"

containing developmeny lists generated as the result of the aforementioned process. In this example, there are two ways of developing the portion "タ (ta; katakana)" and four ways of developing the portion "フォー (fō; katakana)". As a result, the given term is developed into 2×4 terms, that is, 8 terms as follows.

| | | |
|---|---|---|
| 1) | インタフォーン | (intafōn; katanakan)" |
| 2) | インタフォン | (intafon; katanakan)" |
| 3) | インタホーン | (intahōn; katanakan)" |
| 4) | インタフホン | (intahon; katanakan)" |
| 5) | インターフォーン | (intāfōn; katanakan)" |
| 6) | インターフォン | (intāfon; katanakan)" |
| 7) | インターホーン | (intāhōn; katanakan)" |
| 8) | インターホン | (intāhon; katanakan)" |

Figure 32:
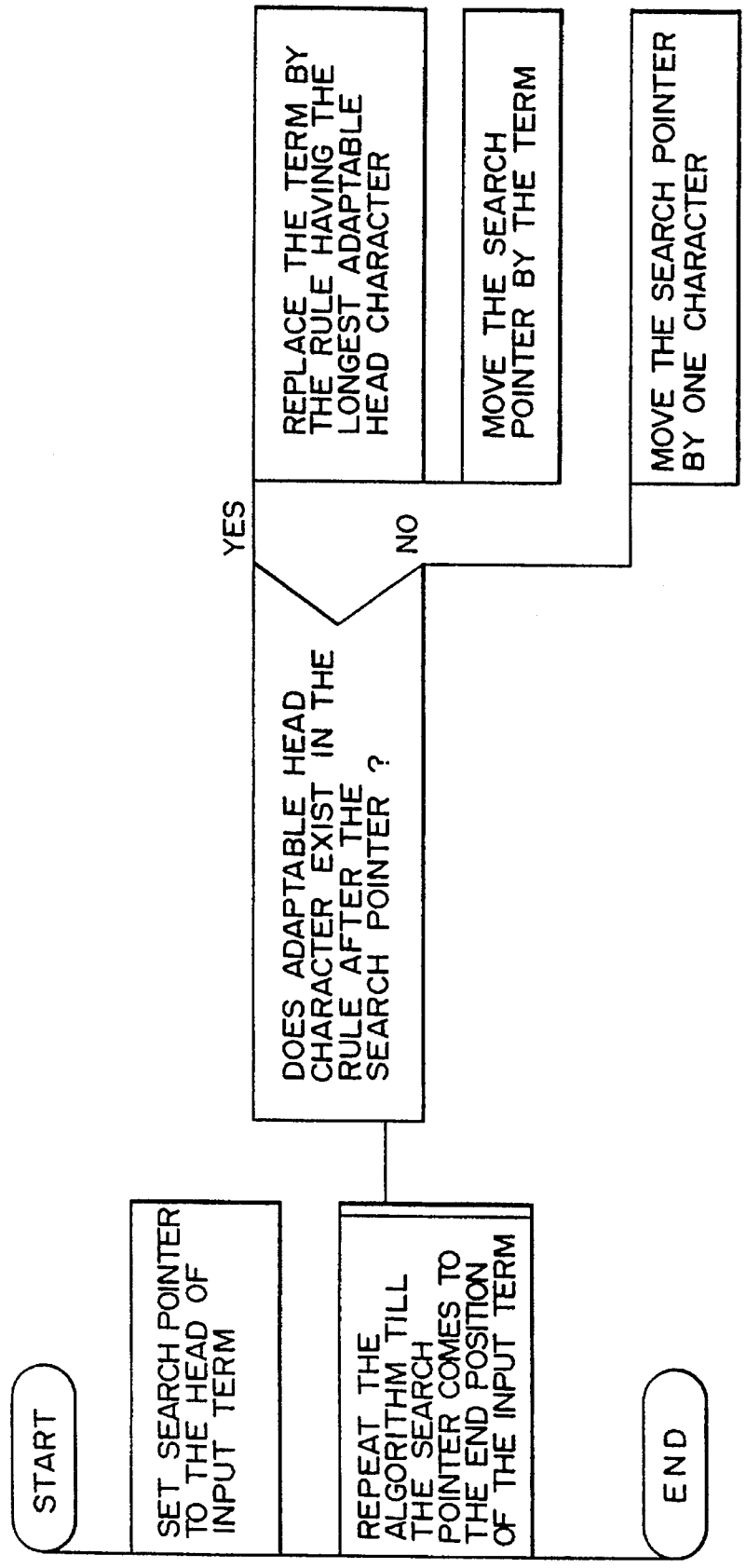
FIG. 32 is a pad view showing the different notation development process.

The aforementioned process of headword search and replacement with a development term list is explained with reference to a PAD view shown in FIG. 32. First, the search pointer is set in the head character of the given term. Then, headword search is started as to whether a headword of the conversion rule is matched with a term with the search pointer at the head thereof. If there is no matched headword, the search pointer is shifted by one character to re-start headword search with respect to a term with the search pointer at the head thereof. If matched headwords exist, longest one is adopted to replace the corresponding portion with the development term list. After replacement, the search pointer is shifted back by the number of characters used in the matched headword. The aforementioned procedure of headword search and replacement with a development list is repeated till the search pointer comes to the last position of the given term.

Figure 33:
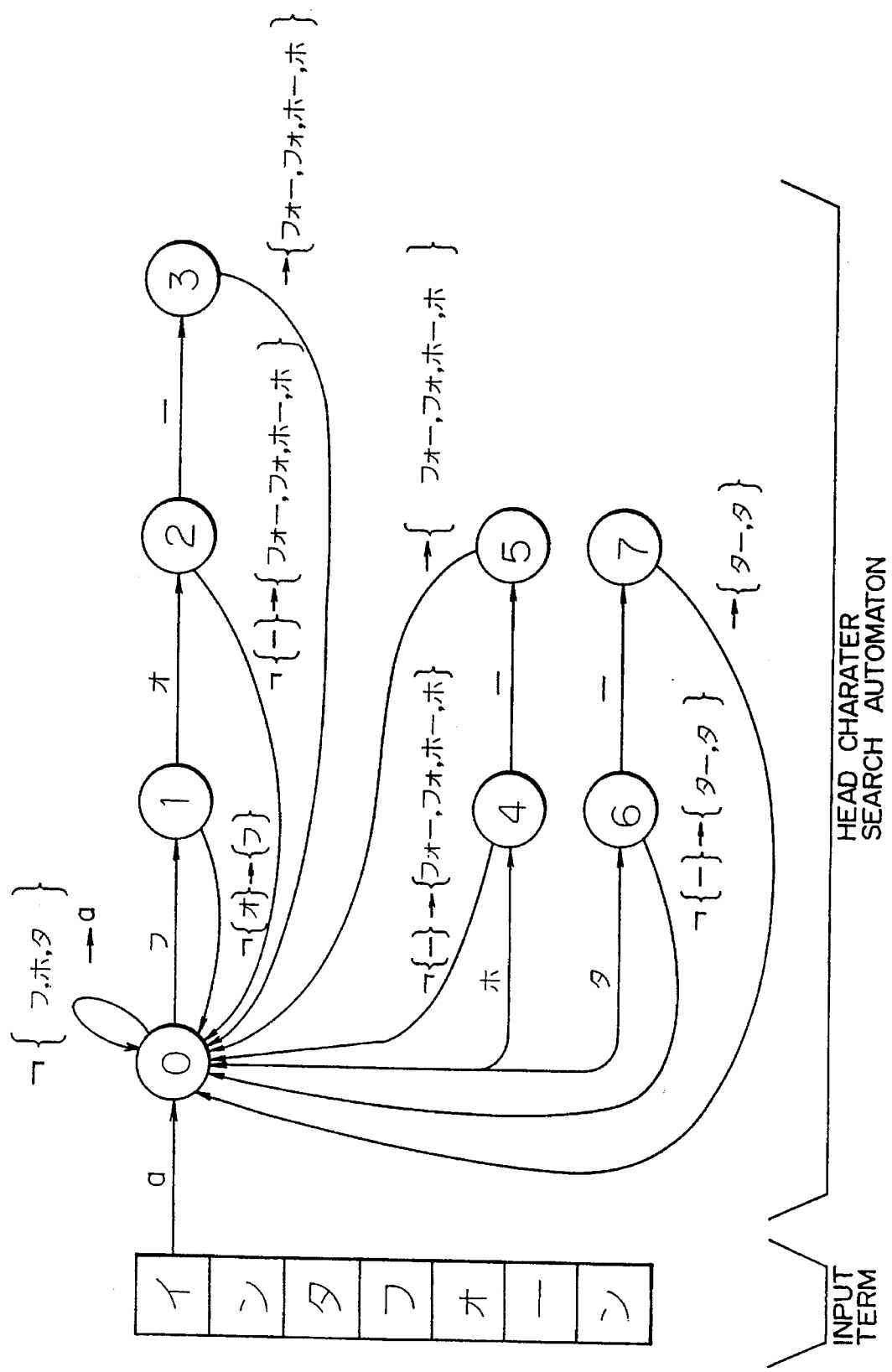
FIG. 33 is a view showing an example in which headword retrieval is carried out by use of a finite-state automaton.

Another embodiment as related to the headword search method used in the aforementioned different notation development is explained with reference to FIG. 33. In this embodiment, an automaton is used for headword search. In the following, the procedure thereof is described. First, an automaton as shown in the drawing is generated based on the conversion rule. In the different notation development process, characters contained in the given term are one-by-one inputted into the automaton to obtain terms containing development term lists as described above with reference to FIG. 31, as the operation output of the automa-ton.

In the following, the operation thereof is specifically explained. In the drawing, symbol a represents an input character, each circle represents a state of the automaton, and each numeric character given to the circle represents state number. Each character given to the line shows state transition in the direction of the arrow in the case where the character is given. Symbol "¬" shows characters other than the character escorted by the symbol. Symbol "→" shows the output of characters escorted by the symbol. The automaton is composed of a goto function table for controlling the operation and an output table for describing the output of each state. The goto function table is as shown in FIG. 34. In the drawing, an input character in each state and the state number of the transit state when the input character is given are described to make a pair. Transition to state 0 is not shown in the drawing. In short, when a character not described in the goto function table in each state is given, the state is transited to state 0. In the output table, an output term list generated in each state of the automaton is described as shown in FIG. 35. In the case where the automaton is operated, development terms are generated by reference to the output table only when the state is transited from a state except state 0 to state 0. When the term output is finished, the character causing the transition to state 0 is given to the automaton again to cause transition of the automaton by reference to the goto function table. In the case where the state is returned from state 0 to state 0, the input character is generated with no change.

The automaton system as to state transition control and output has been described above. In the following, the operation of the automaton system is explained in detail. The operation thereof when characters contained in an input term "インタフォーン (intafōn; katakana)" as shown in FIG. 33 enter one by one is described hereunder. First, the state of the automaton is state 0.

(1) When the character "イ (i; katakana )" enters, the character

"イ (i; katakana)"

is generated with no change and then the state is kept in state 0 because no transit state from state 0 is registered in the goto function table.

(2) When the character "ン (n; katakana)" enters, the character

"ン (n; katakana)"

is generated with no change and then the state is kept in state 0 because no transit state from state 0 is registered in the goto function table.

(3) When the character "タ (ta; katakana)" enters, state number 6 is read out as a transit state from the current state 0 by reference to the goto function table, so that the state is transited to state number 6.

(4) When the character "フ (fu; katakana)" enters, output terms in state 6

"タ (ta; katakana)" and "タ— (tā; katakana)"

are generated by reference to the output table because no transit state from state 6 at the character "フ (fu; katakana)" can be obtained from the goto function table and because the current state is not 0. Then, the state goes to 0. Further, in the new state 0, the input character "フ (fu; katakana)" is given to the automaton again. As a result, the state is transited from state 0 to state 1 according to the content of the goto function table.

(5) When the character " —ォン (o; katakana)" enters, the state is transited from state 1 to state 2.

(6) When the character "—" enters, the state is transited from state 2 to state 3 according to the content of the goto function table.

(7) When the character "ン (n; katakana)" enters, output terms in state 3

"フォー (fō; katakana)", "フォ (fo; katakana)",

"ホー (hō; katakana)" and "ホ (ho; katakana)"

are generated by reference to the output table because no transit state from state 6 at the character "ン (n; katakana)" can be obtained from the goto function table and because the current state is not 0. Then, the state goes to 0. Further, in the new state 0, the input character "ン (n; katakana)" is given to the automaton again. As a result, the character "ン (n; katakana)" is generated with no change because there is no transit state obtained from the goto function table.

(8) The procedure is finished because the last character of the input term is processed.

Thus, a term containing development lists

"イン(タ, ター)(フェー, フォ, ホー, ホ)ン"
is obtained.

Figure 36:
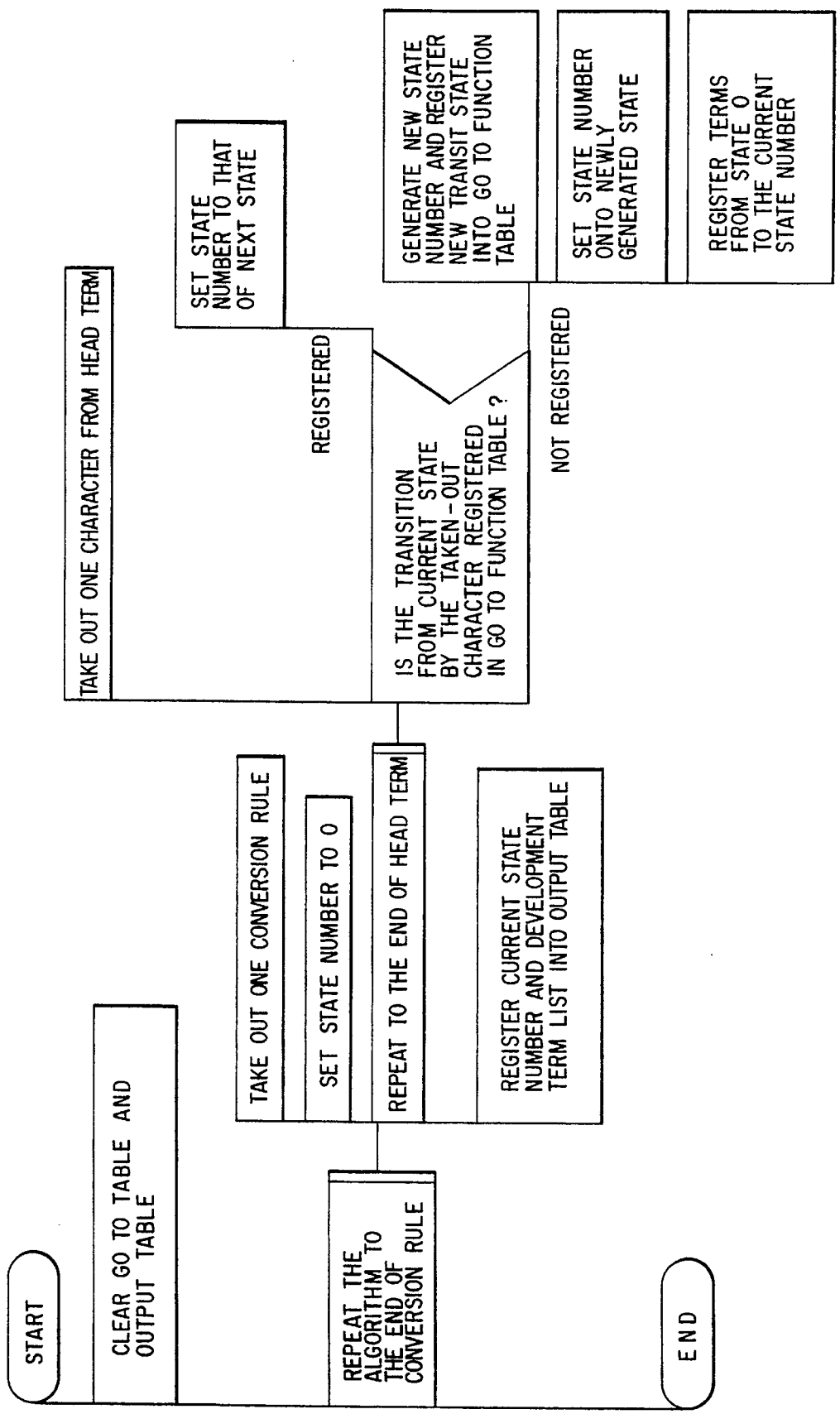
FIG. 36 is a pad view showing a method for generating both the goto function table and the output table in the retrieval automaton.
Figure 41:
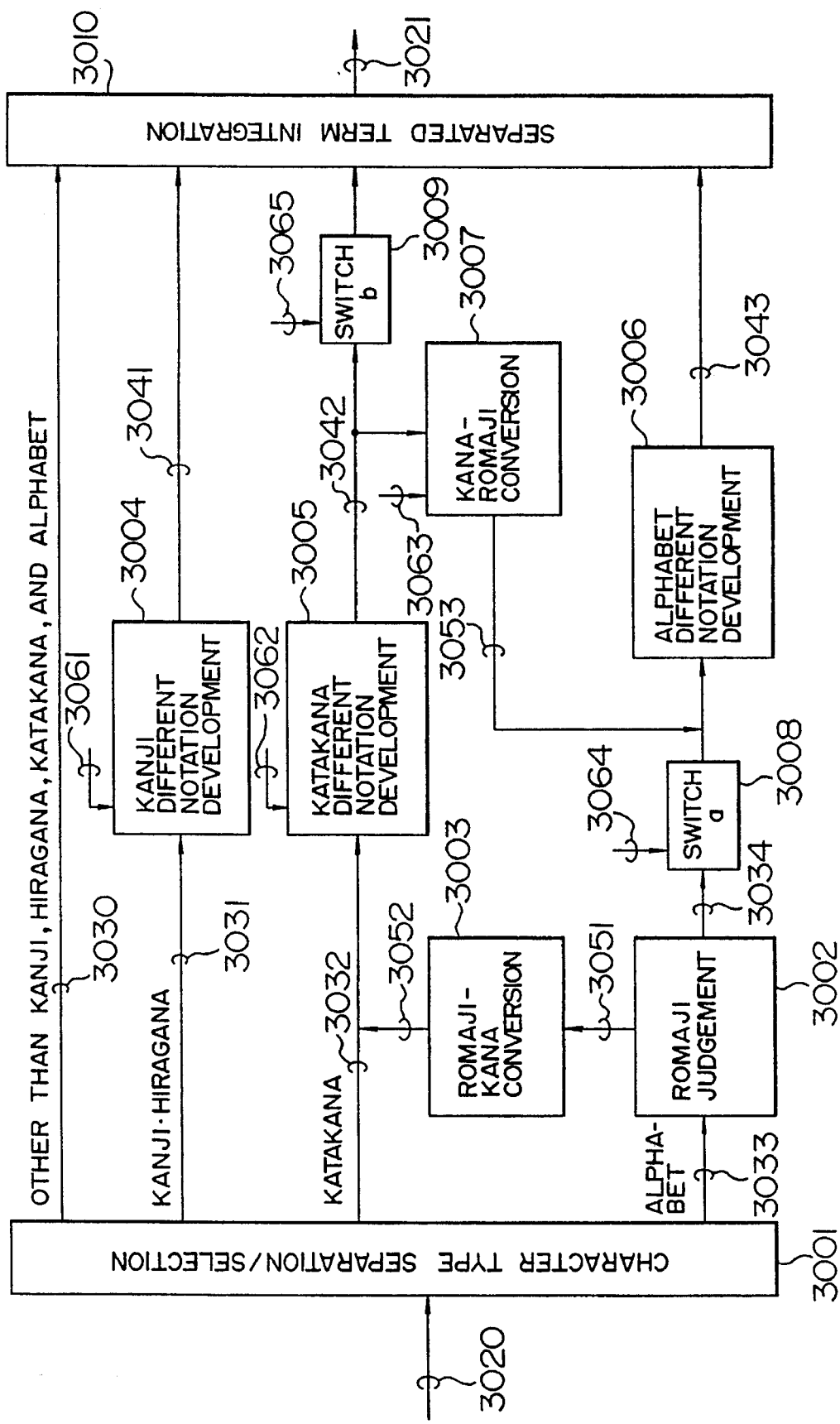
FIG. 41 is a block diagram showing an embodiment in which development modes in the different notation development means can be selected.

In the following, a system for generating a headword search automaton is described with reference to FIG. 36. The automaton is generated once before an input term is delivered to the automaton. The drawing is a PAD view showing a system for generating a search automaton, that is, a system for generating a goto function table and an output table. In the following, the content of the system is explained. First, both the goto function table and the output table are initialized. Then, the following procedure is repeated while picking up conversion rules one by one till the end thereof.

(1) The state number is set in 0.

(2) A goto function table is generated while picking up characters of a headword one by one till the end thereof. In short, when a transit state at the picked-up character has been registered, the state is transited to the transit state by reference to the goto function table. When no transit state has been registered, a new state number is generated and additionally registered in the goto function table. The, the current state is moved to the new state. Further, a term causing transition from state 0 to the current state is registered in the output table.

(3) After the procedure as shown in the paragraph (2) is applied to all characters of the headword, the current state number and the development term list for the conversion rule are registered in the output table.

The flow of the procedure is explained with reference to the following two practical conversion rules.

["フォー"→("フォー", "フォ", "ホー", "ホ")]
and
["フォ"→("フォー", "フォ", "ホー", "ホ")]

First, the headword in the first conversion rule

"フォー (fō; katakana)"

is processed as follows.

(1) Entry of the character "フ (fu; katakana)"

The goto function table has no transit state number registered therein because it is initialized. Accordingly, a new state number 1 is generated so that the state is moved to 1. The term causing transition from state 0 to state 1

"フ (fu; katakana)"

is registered, as an output of state number 1, in the output table.

(2) Entry of the character "—ホン (o; katakana)"

There is no definition of transit state from the current state 1 in the goto function table. Accordingly, a new state number 2 is generated so that the state is moved to 2. The term causing transition from state 0 to state 2

"フォ (fo; katakana )"

is registered, as an output of state number 2, in the output table.

(3) Entry of the character "—"

There is no definition of transit state from the current state 2 in the goto function table. Accordingly, a new state number 3 is generated so that the state is moved to 3. The term causing transition from state 0 to state 3

"フォー (fō; katakana )"

is registered, as an output of state number 3, in the output table. Because the character is the last character of the headword, the development term list in the conversion rule ("フォー", "フォ", "ホー", "ホ")

is registered, as an output of the state 3, in the output table by replacing the preliminarily registered output term "フォー (fō; katakana)"

with the list.

Then, the headword in the second conversion rule

"フォ (fo; katakana)"

is processed as follows. Before the process, the state is returned to 0.

(4) Entry of the character "フ(fu; katakana)"

The transit state number 1 is obtained by reference to the goto function table, so that the state is moved to 1.

(5) Entry of the character "ォ(o; katakana)"

The transit state number 2 is obtained by reference to the goto function table, so that the state is moved to 2. The output of the state 2 has been registered in the output table. Because the character is the last character of the headword, the output of the state 2 registered in the output table 2

"フォ (fo; katakana)"

is replaced with the following development term list in the conversion rule.

("フォー", "フォ", "ホー", "ホ")

Thus, an automaton for searching for the two conversion rules can be generated by the aforementioned procedure. A suitable automaton can be generated by applying the same procedure to other rules than the two rules.

Details of the conversion rule table for katakana different notation development as described above are shown in FIG. 37. As another method, the standard "Japanese Language Council Report in Showa 29: Notation of Word of Foreign Origin" in which general principles of notation with respect to similar syllabic notations of katakana terms are decided, can be used for generating the conversion rule table. In short, general principles for standardizing the notation of katakana terms are described in the report. By use of the principles reversely, conversion rules can be generated.

Although the procedure for katakana different notation development has been described, the same procedure can be applied to kanji different notation development by using a conversion rule table for kanji terms. An example of the conversion rule table for different notation development with respect to new and old styles of kanji is shown in FIG. 38. An example of the conversion rule table with respect to declensional kana endings is shown in FIG. 39.

The different notation development rule tables as shown in FIGS. 37 through 39 can be modified or changed if necessary. Accordingly, different notation development desired by a user can be made.

The foregoing is the details of the process in the kanji different notation development portion 3004 and the katakana different notation development portion 3005.

In the following, different notation development of romaji is described. In this embodiment, a method comprising the steps of: converting an input term written in romaji into a katakana term once; developing the katakana term into katakana different notations; and returning the katakana different notations to romaji by kana/romaji conversion, is used for different notation development of romaji. Accordingly, two portions, that is, the romaji/kana conversion portion 3003 and kana/romaji conversion portion 3007 as shown in FIG. 30, are used for different notation development of romaji.

First, the process in the romaji/kana conversion portion is described. When an alphabetic term is given, romaji/kana conversion is made. In the romaji/kana conversion portion 3003, romaji/kana conversion is made by reference to a romaji/kana conversion table as shown in FIG. 40. In the drawing, the first record shows that romaji "A" corresponds to katakana "ア". A record having a plurality of character strings in its romaji item shows that each romaji character string corresponds to a katakana character string in the katakana item. For example, each of romaji character strings "SYA" and "SHA" corresponds to a katakana character string

"シャ".

These are based on the directive system notation of romaji and the Hepburnian system notation of romaji, respectively. Accordingly, romaji can be converted into katakana in the romaji/kana conversion portion 3003 regardless of the difference in notation of romaji, for example, directive system notation, Hepburnian system notation or mixed notation of romaji. The conversion method is the same as in the kanji different notation development and the katakana different notation development. In short, the given term written in romaji is successively replaced with katakana character strings in the conversion table by searching for romaji character strings contained in the given term by the maximum-length matching method. If no matched romaji character string is detected in the conversion table, no katakana character string is generated because the given term is judged to be not romaji.

In the following the kana/romaji conversion portion 3007 is described. In this portion, the conversion table in FIG. 40 is used with no change. In short, the given term is successively replaced with romaji based on the conversion table by searching for katakana character strings contained in the given term by the maximum-length matching method. When a plurality of romaji notations corresponding to katakana exist as the aforementioned example

"シャ", the portion is replaced with a list of partial terms. Accordingly, the result of romaji different notation development can be obtained by developing the given term into terms containing development lists and combining the development lists in the same manner as in the katakana different notation development. This is explained taking the case of the input term "シシャモ (shishamo; katakana)" as an example. By a matching process based on the katakana/romaji conversion table with respect to the input term "シシャモ (shishamo; katakana)", a term containing development lists

"(SI, SHI) (SYA, SHA) MO"

is obtained. Accordingly, by combining the development lists, 4 romaji different notation terms 1) "SISYAMO",
2) "SISHAMO",
3) "SHISYAMO", and
4) "SHISHAMO"

are obtained.

The foregoing is the description about the processes in the different notation development system.

Although the aforementioned embodiments have shown the case where all of kanji and hiragana terms, katakana terms, romaji terms and alphabetic terms are subjected to the development processes, the invention can be applied to the case where these development processes may be used selectively. In short, the output term after different notation development can be controlled to select one character type or mixed type from the following character types.

1) Kanji and hiragana term
2) Katakana term
3) Romaji term
4) Alphabetic term

Thus, a search process satisfying the requirement of a user without wasteful development procedure can be attained by selecting different notation development by character types.

In the following, a method for controlling character types in the result of the different notation development is described.

The output character type control is attained by providing both a switch a 3008 for output control of the alphabetic term 3034 and a switch b 3009 for output control of the katakana term 3042 in the embodiment in FIG. 30. Further, control signal lines 3061, 3062, 3063, 3064 and 3065 are provided for the purpose of output control of the kanji different notation development portion 3004, the katakana different notation development portion 3005, the kana/romaji conversion portion 3007 and the switches a and b 3008 and 3009, respectively. By ON/OFF control of the control signals based on a mode of different notation development result output character type designated by a user, different notation development corresponding to the mode can be attained. When, for example, romaji different notation development is unnecessary, the control signal 3063 for the kana/romaji conversion portion 3007 is turned off to stop the output thereof. Combinations of control signals for controlling the conversion portion, development portions and switches by such development modes are shown in FIG. 42. In the drawing, the development modes show that the following different notation developments c: kanji and hiragana different notation development k: katakana different notation development r: romaji different notation development a: alphabet different notation development are carried out to generate respective different notations. Development modes represented by a plurality of characters show the designation of the output of a plurality of different notations. For example, the development mode "cka"

shows a mode in which different notations of kanji and hiragana, katakana and alphabets are generated as the result of different notation development. In the table, the symbol ○ shows the fact that the term output is made from a corresponding module. Each column having no symbol ○ shows the fact that no term is generated. For example, the term development mode "cka"

shows the fact that output terms are generated from the romaji/kana conversion portion 3003, the kanji different notation development portion 3004 and the katakana different notation development portion 3005; the input term is allowed to be passed through the switches a and b 3008 and 3009; and no output term is generated from the kana/romaji conversion portion 3007.

Finally, a synonym development process is described,

The synonym development processing portion 2803 has a synonym dictionary as shown in FIG. 43. In the drawing, record number is serial number given to each headword in the dictionary. In each headword, same-rank words, higher-rank words, lower-rank words and related words are defined, respectively. In the drawing, the number described in each of the items of same-rank words, higher-rank words, lower-rank words and related words represents record number in the dictionary. For example, the headword "計算機 (keisanki; kanji)"

has the following two same-rank words represented by record number 2 and record number 3.

"コンピュータ (konpyūta; katakana )" and

"情報処理装置 (jōhoshorisōchi; kanji)"

In the synonym development, the mode can be designated by a user through the synonym development mode control signal 2810 as shown in FIG. 28 to select items in the dictionary. In short, modes which can be designated by a user are as follows.

u: development using same-rank words b: development using higher-rank words n: development using lower-rank words r: development using related wordsFurther, the modes u, b, n and r may be used suitably in combination.

The synonym development process is carried out by searching for dictionary headwords contained in a term given to the synonym development portion. In short, headword search is carried out by the maximum-length matching method from the head of the given term in the same manner as headword search in the conversion rule in the different notation development process. In the case of same-rank word development, matched partial terms in the given term are successively replaced with same-rank word lists. At this time, matched headwords are added to the same-rank word lists, respectively. In the cases of higher-rank word development, lower-rank word development and related word development, the aforementioned replacement is generated only when the given term perfectly coincides with a headword. In short, development is not made when the given term is partially matched with a headword. This reason is that words not clear in their meanings are made up by replacement with partial terms in the higher-rank word development, lower-rank word development and related word development.

In the following, an example of the synonym development process is described.

When the given term is

"大型計算機 (ogatakeisanki; kanji)", a headword

"計算機 (keisanki; kanji)"

matched with a partial term started from the third character of the given term is detected by searching for headwords in the synonym dictionary. From the record number 1 in the synonym dictionary "計算機 (keisanki; kanji)", the record number 2 as a same-rank word "コンピュータ (konpyūta; katakana)" and the record number 3 as a same-rank word "情報処理装置 (jōhoshorisōchi; kanji)"

are obtained in the form of a same-rank word list as follows.

("計算機", "コンピュータ", "情報処理装置")

By replacing the portion of the given term with the list, a term containing a development list

"大型(計算機, コンピュータ, 情報処理装置)"

is obtained in the same manner as in the case of different notation development process. By combining such development lists (in this case, one list), the following three same-rank terms can be obtained.

(1) "大型計算機 (ogatakeisanki; kanji)"

(2) "大型コンピュータ (ogatakonpyūta; kanji and katakana)"

(3) "大型情報処理装置 (ogatajōhoshorisōchi; kanji)"

In the following, an example of the higher-rank word development process is described.

When the given term is

"計算機 (keisanki; kanji)", the given term perfectly coincides with a headword

"計算機 (keisanki; kanji)"

obtained by searching for headwords in the synonym dictionary. Accordingly, the record number 4 as a higher-rank word "電子機器 (denshikiki; kanji)"

is generated. Although this example shows the case where one higher-rank word exists, it is a matter of course that the invention can be applied to the case where a plurality of higher-rank words may exist. In the case where a plurality of higher-rank words exist, the words are generated in the form of a list as described above.

The same procedure as used in the higher-rank word development can be used in lower-rank word development and related word development. When no matched term exists in the dictionary in the synonym development, there is no term generated from the synonym development processing portion 2803.

An example of the synonym development processing system has been described above. In the synonym development using such a dictionary, a long time is often required for headword search when the number of records in the dictionary increases. As a method for solving this problem, a method of searching for headwords in the dictionary by reference to an index table. The outline of the method is shown in FIG. 44. Headwords in the synonym dictionary are arranged in alphabetical order in advance. The index table is provided separately from the synonym dictionary. In the index table, first characters of headwords in the synonym dictionary are collected and the start positions in the dictionary, of headwords containing the first characters are registered. For example, the index table shows that headwords with the character "A" at the head thereof exist from the record number 1. In headword search, record number is obtained by reference to the index table to make access to the synonym dictionary based on the record number. The necessity of scanning all headwords in the synonym dictionary is eliminated by the aforementioned method, so that processing time can be shortened. For example, in the case of searching for terms having the character "計 (kei; kanji)" at the head thereof, the terms having the character "計 (kei; kanji)" at the head thereof are found to exist from the record number 501, by the index table. Accordingly, wasteful term search for headwords smaller in record number than the record number 501 can be omitted. Further, by arranging headwords in alphabetical order, headword search after the detection of a headword having a different character at the head thereof can be omitted. For example, in search for headwords having the character "計 (kei; kanji)" at the head thereof, unnecessary search after the detection of a head word "情報処理装置 (jōhoshorisōchi; kanji)" having a character except the character "計 (kei; kanji)" at the head thereof can be omitted.

Although this embodiment has shown the case where record number is used for describing a same-rank word or the like both in the index table and in the dictionary, the speed of access to the dictionary can be improved further by describing the same-rank word by use of address for specifying the position thereof in the dictionary. Address is used for indicating the first position of headwords in the dictionary. For example, the address may be determined by the number of bytes counted from the head of the dictionary. Access to the dictionary can be specified directly by use of the address, so that the access speed can be improved compared with the case of using the record number.

An embodiment of the automaton according to the present invention will be described hereunder with reference to FIGS. 45 through 55.

Figure 5:
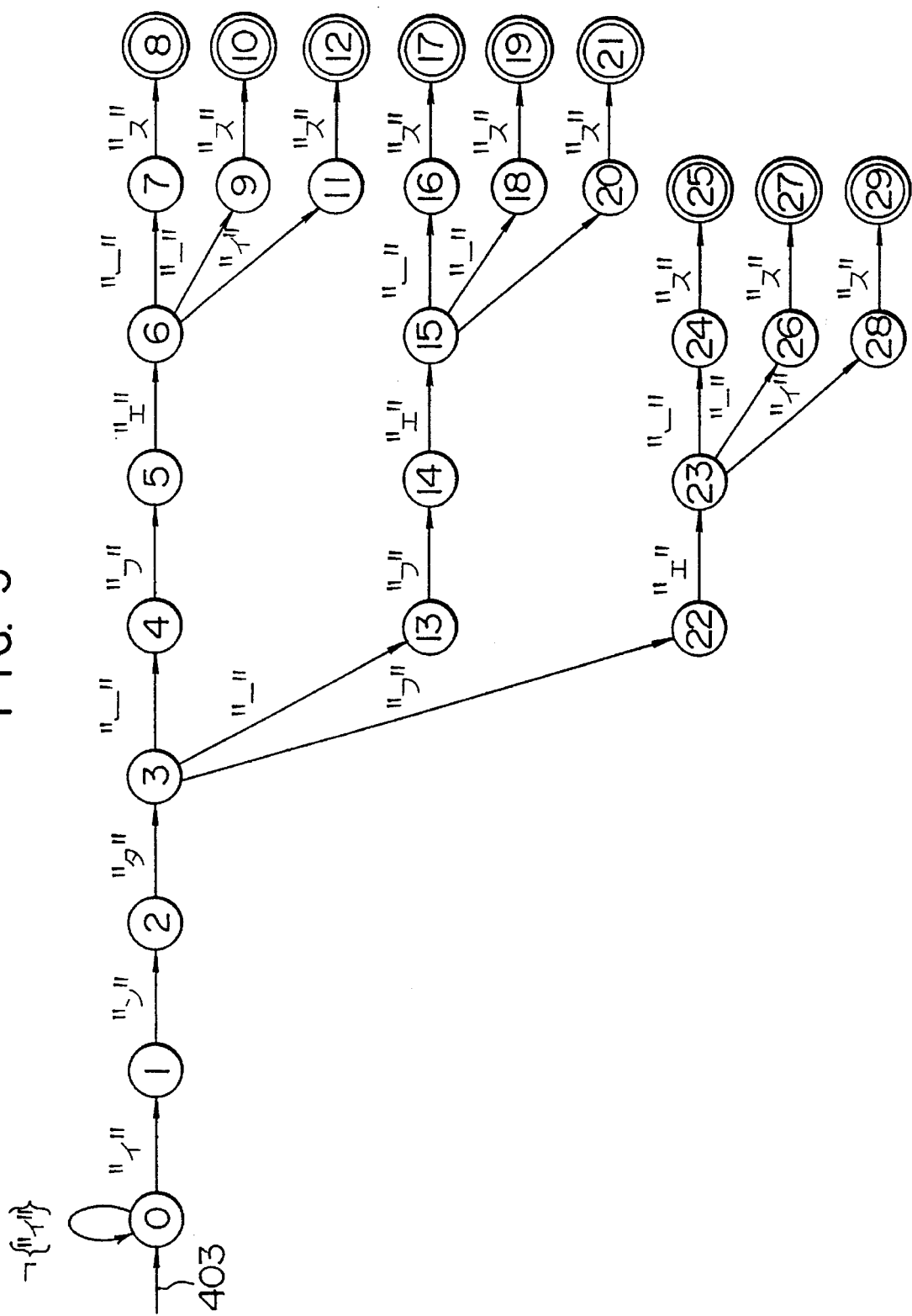

A different notation search automaton as to the operation thereof is described with reference to the state transition view of the collection allowed automaton shown in FIG. 46. Hereinafter, the collection allowed automaton is simply called "automaton". In the drawing, the automaton is provided to search for nine search terms, that is, "インタフェース ( intafēsu; katakana)" and different notations "インターフェース (intāfēisu; katakana)", "インタフェイス (intafeisu; katakana)", "インターフェイス (intāfeisu; katakana)", "インターフェイス (intafēisu; katakana)", "インタフェース (intafesu; katakana)", "インターフェース (intafēsu; katakana)", "インタフェイス (intāfēsu; katakana)" and "インターフェース (intāfēsu; katakana)", similarly to the automaton as shown in FIG. 5.

Figure 46:
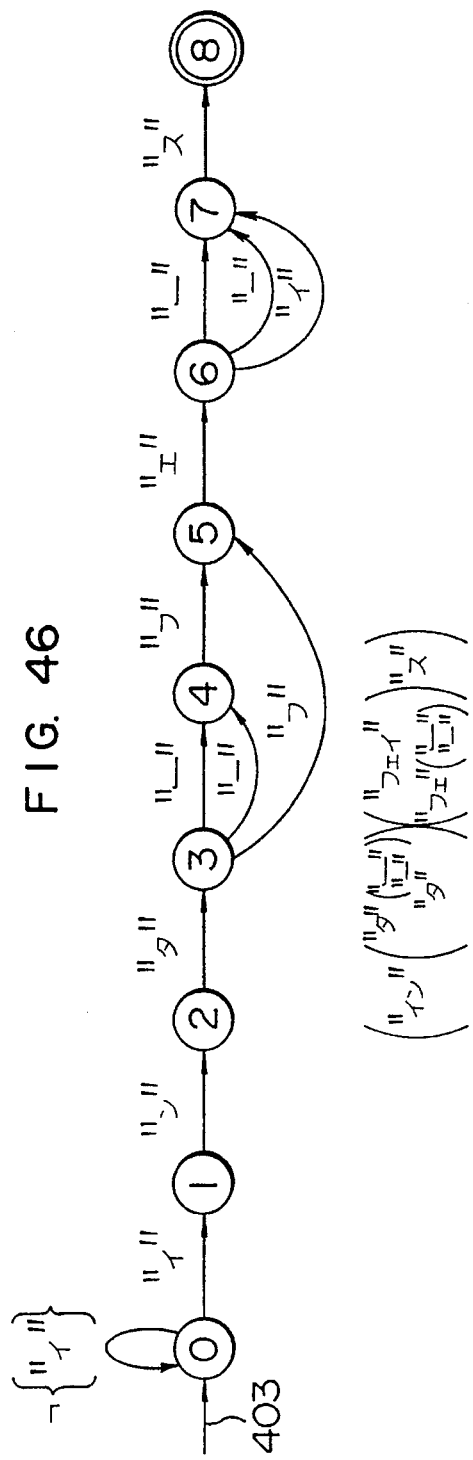

Those notations can be represented by a complex expression character stream (Expression 1) as shown in the lower portion of FIG. 46. The different notations of "フェー (fē; katakana)" represented by $$\begin{pmatrix} \text{"フェイ}(fei; katakana)\text{"} \\ \text{"フェー}(f\bar{e}; katakana)\text{"} \end{pmatrix} \begin{pmatrix} \text{"—"} \\ \text{"-"} \end{pmatrix}$$

are explained.

Because "フェー (fē; katakana)" can be replaced by "フェイ (fei; katakana)" based on a phonetic different notation, the following notation can be obtained.

$$\begin{pmatrix} \text{"フェイ}(fei; katakana)\text{"} \\ \text{"フェー}(f\bar{e}; katakana)\text{"} \end{pmatrix}$$

Because "—" as the long sound of "フェー (fē; katakana)" can be replaced by "-" based on a long sound different notation, the following notation can be obtained.

$$\begin{pmatrix} \text{"—"} \\ \text{"-"} \end{pmatrix}$$

When the long sound different notation $$\begin{pmatrix} \text{"—"} \\ \text{"-"} \end{pmatrix}$$

is applied to $$\begin{pmatrix} \text{"フェイ}(fei; katakana)\text{"} \\ \text{"フェー}(f\bar{e}; katakana)\text{"} \end{pmatrix},$$

the following notation is obtained.

$$\begin{pmatrix} \text{"フェイ}(fei; katakana)\text{"} \\ \begin{pmatrix} \text{"—"} \\ \text{"-"} \end{pmatrix} \end{pmatrix}$$

Because partial terms given in parentheses are equivalent to each other, transitions based on the final characters of the partial terms can be collected in one transit state by using the complex expression character stream.

However, when a state is included in the transition of another partial term, for example, in the case of $$\begin{pmatrix} \text{"タ"} \begin{pmatrix} \text{"—"} \\ \text{"-"} \end{pmatrix} \\ \text{"タ"} \end{pmatrix},$$

the current state in the transition of the next character "フ (fu; katakana)" may be state 3 as a transit state of "タ (ta; katakana)" or may be state 4 as a transit state of "タ— (tā; katakana)". Accordingly, transitions are described so that the two places are taken as current states. At this time, the transit states are collected into one state 5.

By collecting transitions as described above, the number of states can be reduced greatly to be about one-third as much as the number of states in the automaton in FIG. 5.

The automaton generating method used herein is disclosed in A. V. Aho and M. J. Corasick: "Efficient String Matching", CACM, Vol 18, No. 6, 1975. The automaton is controlled by the concurrent state automaton method. In the following, the contents thereof is explained in detail.

In the following, a method of controlling the goto function of the automaton is described. This method is provided to control the goto function with no use of "failure process". In short, this method is provided to express state transitions of the automaton by using a plurality of tokens instead of "failure process".

In the conventional automaton method which has been described above, the state transition view of the automaton is generated under the condition that only one active state exists except for the initial state or in other words only one transition state (in which a token is placed) in course of comparison exists. As this result, when a discord with the given term occurs in the course of comparison, the motion of the token becomes so discontinuous that the "failure process" must be made.

In this method, the failure process can be omitted by using a method in which a token is generated whenever an active state is produced and in which the token is eliminated whenever a discord occurs in the course of comparison. Accordingly, a plurality of tokens can exist concurrently on the state transition view in some cases where the given term requires such a plurality of tokens. In this sense, this method is called "concurrent state automaton method".

According to this method, the "failure process" becomes useless. Accordingly, a term search system in which calculation of a state effected by failure is unnecessary even at the time of generation of the automaton can be provided.

First, a token generating method in a start state is described. In the start state, comparison is made whenever an input character is given. In the case where the input character is matched with a transition character, a new token is generated and moved from the start state to a transit state. However, in the case of state transition from the start state to the start state, there is no token generated. Accordingly, the transition from the start state to the start state becomes ineffective. Accordingly, the transition can be omitted.

In the following, the operation of the automaton in the case where for example a string of characters "インタフェイス (intafeisu; katakana)" are given one by one is described.

When "イ (i; katakana)" is given, it is matched with a transition character in the start state. Accordingly, a token T1 is generated and moved to state 1. When "ン (n; katakana)" is given in the condition that the token T1 reaches state 1, the token T1 is moved to state 2. At the same time, comparison of "ン (n; katakana)" is made in the start state. However, because it is not matched with the transition character in the start state, a new token is not generated. When an input character "タ (ta; katakana)" is then given in state 2, the token T1 is moved to state 3. At the same time, because the input character is not matched with the transition character in the start state, a new token is not generated. When "フェ (fe; katakana)" is then continuously given, the token T1 is successively moved to state 4, state 5 and state 6. Because mismatch is obtained as the result of comparison in the start state while the token T1 is moved to state 6, a new token is not generated. When "イ (i; katakana)" is then given, the token T1 is moved from state 6 to state 7. Because, at this time, coincidence is obtained as the result of comparison in the start state, a new token T2 is generated and moved to state 1. When "ス (su; katakana)" is then given, the token T1 is moved from state 7 to state 8. At this time, the token T2 is eliminated because mismatch is obtained as the result of comparison in state 1. Further, because mismatch is obtained as the result of comparison in the start state, a new token is not generated. When the token T1 reaches state 8, the retrieval of the term "インタフェイス (intafeisu; katakana)" is terminated.

By controlling state transitions by using such a plurality of tokens, different notation allowed retrieval in which the number of states in the automaton can be reduced to about one-third can be provided.

In the following, a processing method for fixed-length don't care character designation retrieval in which fixed-length don't care characters are designated in a search term is described.

Figure 7:
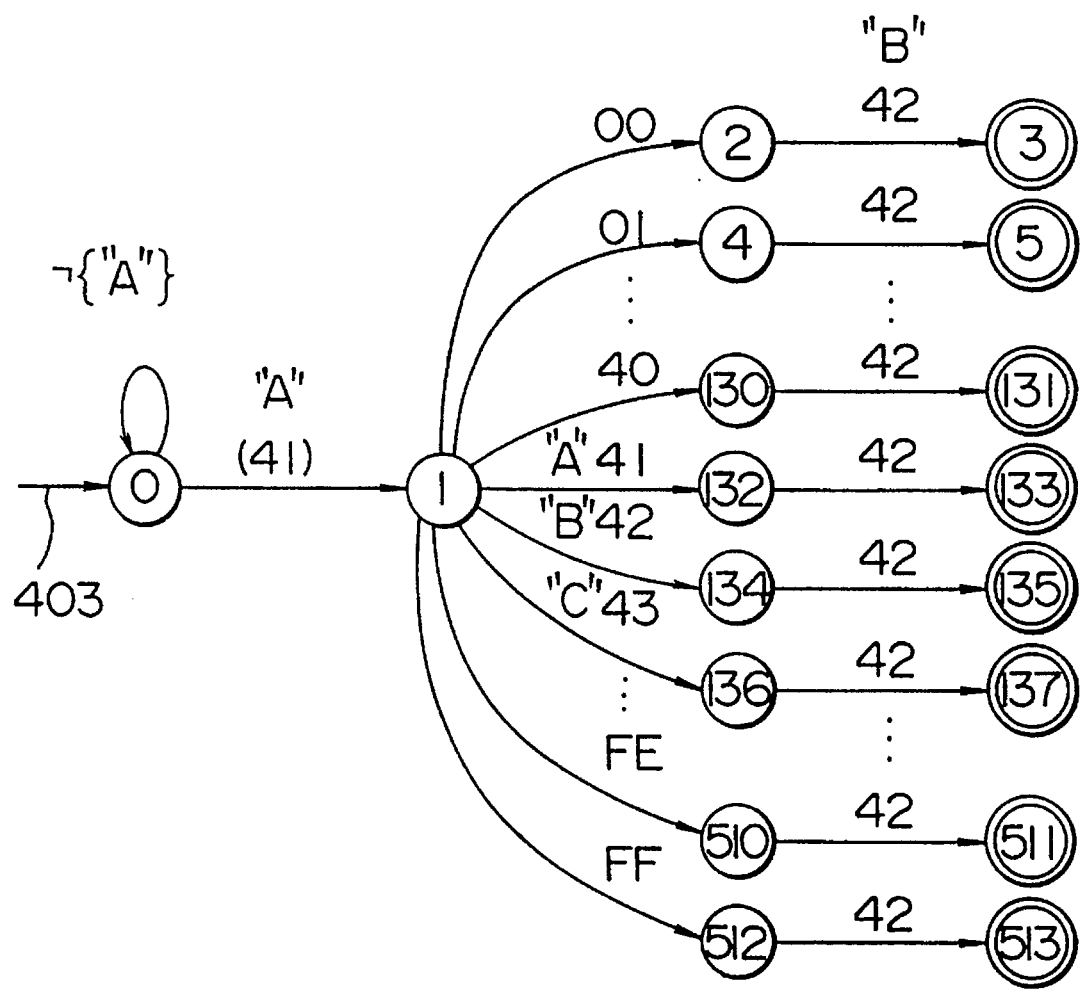
Figure 9:
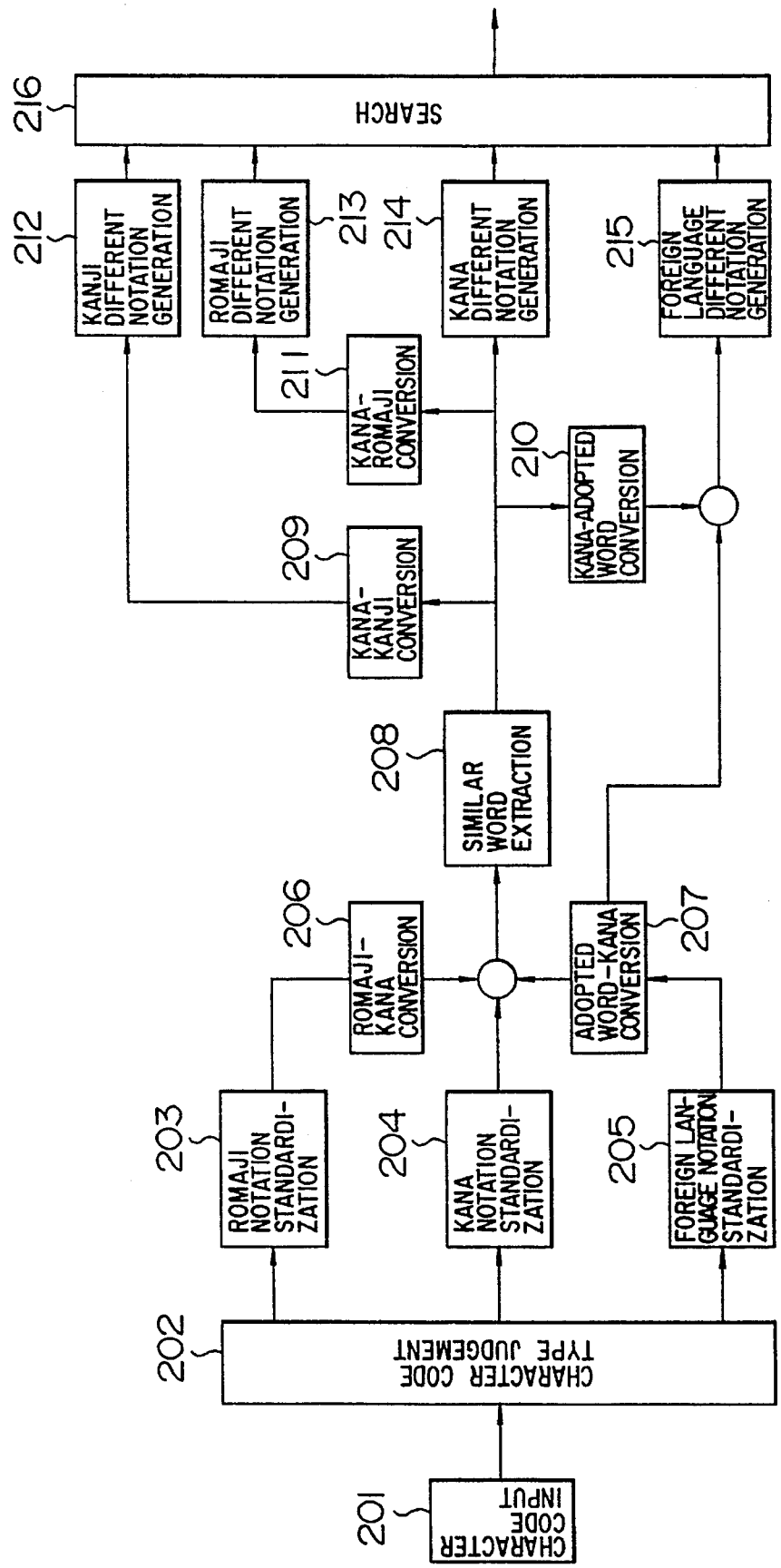
FIG. 9 is a block diagram showing conventional construction of different notation development.
Figure 47:
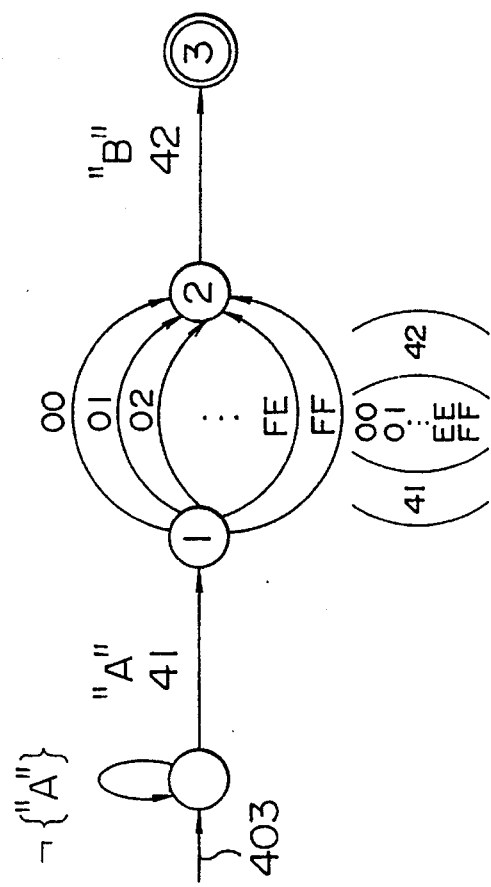

An automaton as shown in FIG. 47 is used. The shown in the drawing is an automaton in the case where "A?B" is retrieved similarly to FIG. 7. By using the aforementioned method using collective transition, the number of states in the automaton in FIG. 47 is reduced to about 1/150 that in the automaton in FIG. 7.

The automaton generating method is the same as the aforementioned different notation automaton generating method.

In the following, the operation of the method in the case where a term "AXB" is given is explained as an example.

When "A" is given, coincidence is obtained as the result of comparison in the start state. Accordingly, a new token T1 is generated and moved to state 1. When "X" is then given, the token T1 is moved from state 1 to state 2. Because, at the same time, mismatch is obtained as the result of comparison in the start state, a new token is not generated. When "B" is then given, the token T1 is moved from state 2 to state 3. Because, at the same time, mismatch is obtained as the result of comparison in the start state, a new token is not generated. State 3 is marked with a double circle, so that the retrieval of "A?B" is terminated.

By controlling state transitions by using such a plurality of tokens, as similarly to different notation allowed retrieval, fixed-length don't care character designation retrieval in which the number of states in the automaton can be reduced to about 1/150 can be provided.

In the following, a processing method using an automaton for distance designation retrieval in which character distance such as upper-limit distance, lower-limit distance, upper-and-lower-limit distance and the like is designated is described.

First, a distance designation method for designating upper-limit distance is described. The case where the upper-limit distance designation that the distance between "A" and "B" is not more than the distance of 4 characters is made is taken as an example. The upper-limit distance designation can be represented by fixed-length don't care characters. In this example, the upper-limit distance designation that the distance between "A" and "B" is not more than the distance of 4 characters can be represented by five key words "AB", "A?B", "A??B", "A???B" and "A????B".

Figure 48:
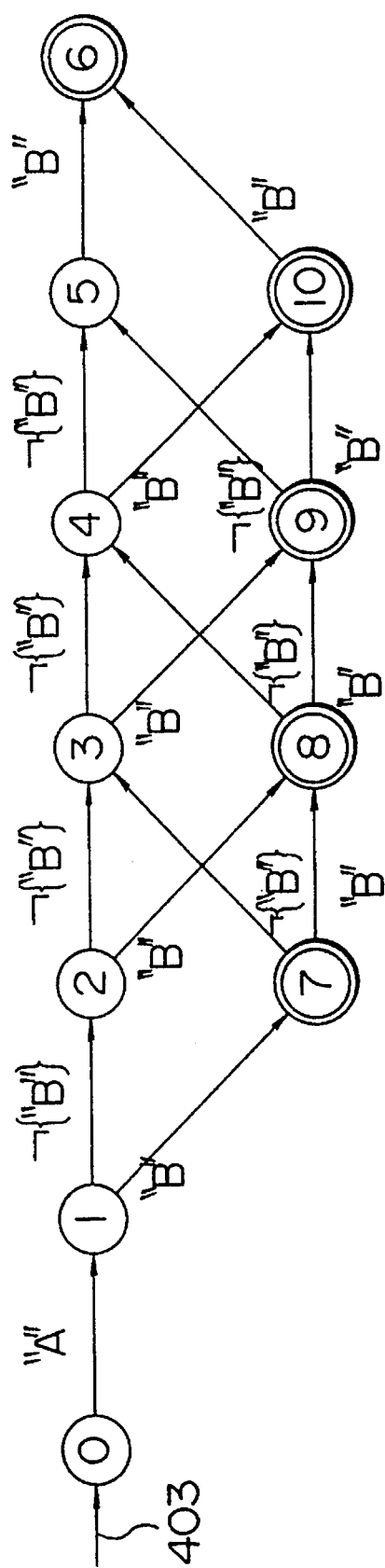

A method of generating an automaton from these key words is described below. First, an automaton for "AB" is generated. At this time, state 0, state 1 and state 7 are generated. Then, an automaton for "A?B" is generated. Because the second character "?" can be replaced by an arbitrary character, it is necessary to generate a new transit state caused by a transition character except the transition from state 1 to state 7 caused by the transition character "B". In short, a transition from state 1 to state 2 caused by a transition character ¬ {"B"} is generated. Further, as a transition caused by the third transition character "B", transitions from states 2 and 7 (which are transit states of the second character "?") to state 8 are generated. By applying the aforementioned rule to other key words "A??B", "A???B" and "A????B", an automaton as shown in FIG. 48 can be generated. The method of generating the automaton is the same as the aforementioned method of generating the automaton for fixed-length don't care characters.

In the following, the operation of the automaton in the case where for example a string of characters "ABCBBBC" are given one by one is described. When "A" is given, coincidence is obtained as the result of comparison in the start state. Accordingly, a token is generated and moved to state 1. When "B" is given, the token is moved to state 7 to verify "AB" having "A" and "B" adjacent to each other. When "C" is further given, the token is moved to state 3. When "B" is then given, the token is moved to state 9 to verify "ABCB" having "A" and "B" arranged at a distance of 2 characters.

When "B" is then given, the token is moved to state 10 to verify "ABCBB" having "A" and "B" arranged at a distance of not more than 3 characters. When "B" is then given, the token is moved to state 6 to verify "ABCBBB" having "A" and "B" arranged at a distance of 4 characters. When "C" is further given, the token is eliminated in state 6 because there is no transit state of the token.

It is apparent from the above description that search terms having "A" and "B" arranged at a distance of not more than 4 characters, that is, "AB", "ABCB", "ABCBB" and "ABCBB", have been verified from "ABCBBC". In short, it is apparent that search for key words "AB", "A??B", "A???B" and "A????B" has been made.

Also in the case of the automaton, upper-limit distance designation retrieval can be provided by controlling tokens in the same manner as in the case of fixed-length don't care characters.

In the following, a distance designation method for designating lower-limit distance is described. The case where the lower-limit distance designation that the distance between "A" and "B" is not less than the distance of 2 characters is made is taken as an example. The lower-limit distance designation cannot be represented by don't care characters, because the upper-limit distance is infinite. If the lower-limit distance designation that the distance between "A" and "B" is not less than the distance of 2 characters is represented by fixed-length don't care characters, the number of key words becomes infinite as "A??B", "A???B", A????B", . . .

A method for solving this problem is described below with reference to the automaton as shown in FIG. 49.

First, an automaton is generated by a key word in which the lower-limit distance is represented by fixed-length don't care characters. The method of generating the automaton is the same as in the case of fixed-length don't care characters. Because the lower-limit distance in this example is 2, an automaton is generated by using "A??B" as a search term. Then, with a state (in this example, state 3) transited by the lower-limit distance as a temporary start state, an automaton with respect to states connected to the start state is generated. The automaton can be generated by use of the conventional method 1 in which transitions are described for all input characters. Thus, even in the case where the lower-limit distance is infinite, an automaton can be generated.

The method of generating the automaton is the same as in the case of the upper-limit distance designation automaton.

In the following, the operation of the automaton in the case where for example a string of characters "ACDEFB" are given one by one is described. When "A" is given, coincidence is obtained as the result of comparison in the start state. Accordingly, a token is generated and moved to state 1.

When "C" is given, the token is moved to state 2. When "D" is further given, the token is moved to state 3 because "D" is a character except "B". When "E" is then given, the token loops in state 3.

When "F" is then given, the token loops in state 3 again in the same manner as described above. When "B" is further given, the token is moved to state 4. Because state 4 is marked with a double circle, the term having "A" and "B" arranged at a distance of not less than 2 characters has been verified.

In short, it is apparent that search for "ACDEFB" as a term having "A" and "B" arranged at a distance of not less than 2 characters (in this example, at a distance of 4 characters) has been made.

In the following, a retrieval method in which a variable-length don't care character is designated in a key word using lower-limit distance designation is described.

The variable-length don't care character "*" can be realized by using distance designation in the case where the lower-limit distance is designated to be zero. In short, "AB*CD" can be replaced with the lower-limit distance designation that the distance between "AB" and "CD" is not less than 0 character. An automaton in this case is as shown in FIG. 50. Such retrieval in which a variable-length don't care character is designated can be provided in the same manner as in the case of lower-limit distance designation.

The automaton generating method and the operation thereof are the same as in the case of the aforementioned lower-limit distance designation automaton.

Figure 51:
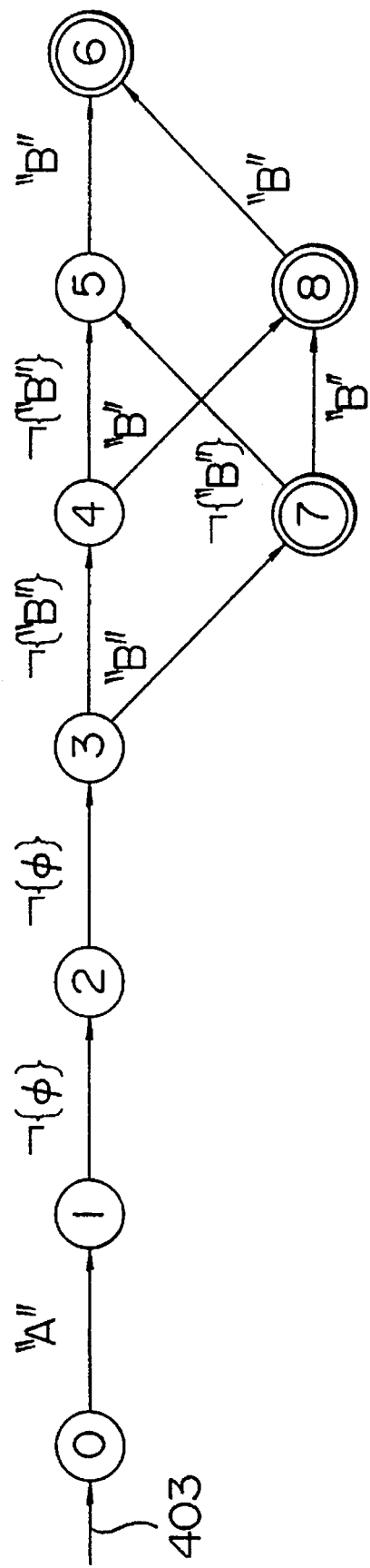

Finally, a method for realizing upper-and-lower-limit distance designation is described below. The upper-and-lower-limit distance designation that the distance between "A" and "B" is not less than 2 characters and not more than 4 characters is taken as an example. The upper-and-lower-limit distance designation can be represented by fixed-length don't care characters. In this example, the distance designation that the distance between "A" and "B" is not less than 2 characters and not more than 4 characters can be represented by four key words "A?B", "A??B", "A???B" and "A????B". An automaton as shown in FIG. 51 can be generated from these key words in the same manner as in the case of fixed-length don't care characters.

The automaton generating method and the operation thereof are the same as in the case of the aforementioned lower-limit distance designation automaton.

A processing method used in one-character error allowed retrieval in which an error of one character is allowed is described below.

The case where "ABCD" is designated as a key word is taken as an example. In this example, an automaton is generated with respect to "ABCD" as a correct key word, with respect to "ABC", "ABD", "ACD" and "BCD" as one-character-deleted key words, with respect to "A?CD", "AB?D" and "ABC?" as one-character-different key words and with respect to "A?BCD", "AB?CD", "ABC?D" and "ABCD?" as one-character-inserted key words. These key words can be represented by the following complex expression character stream.

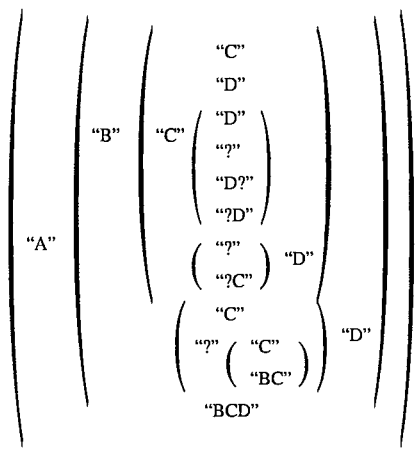

Figure 52:
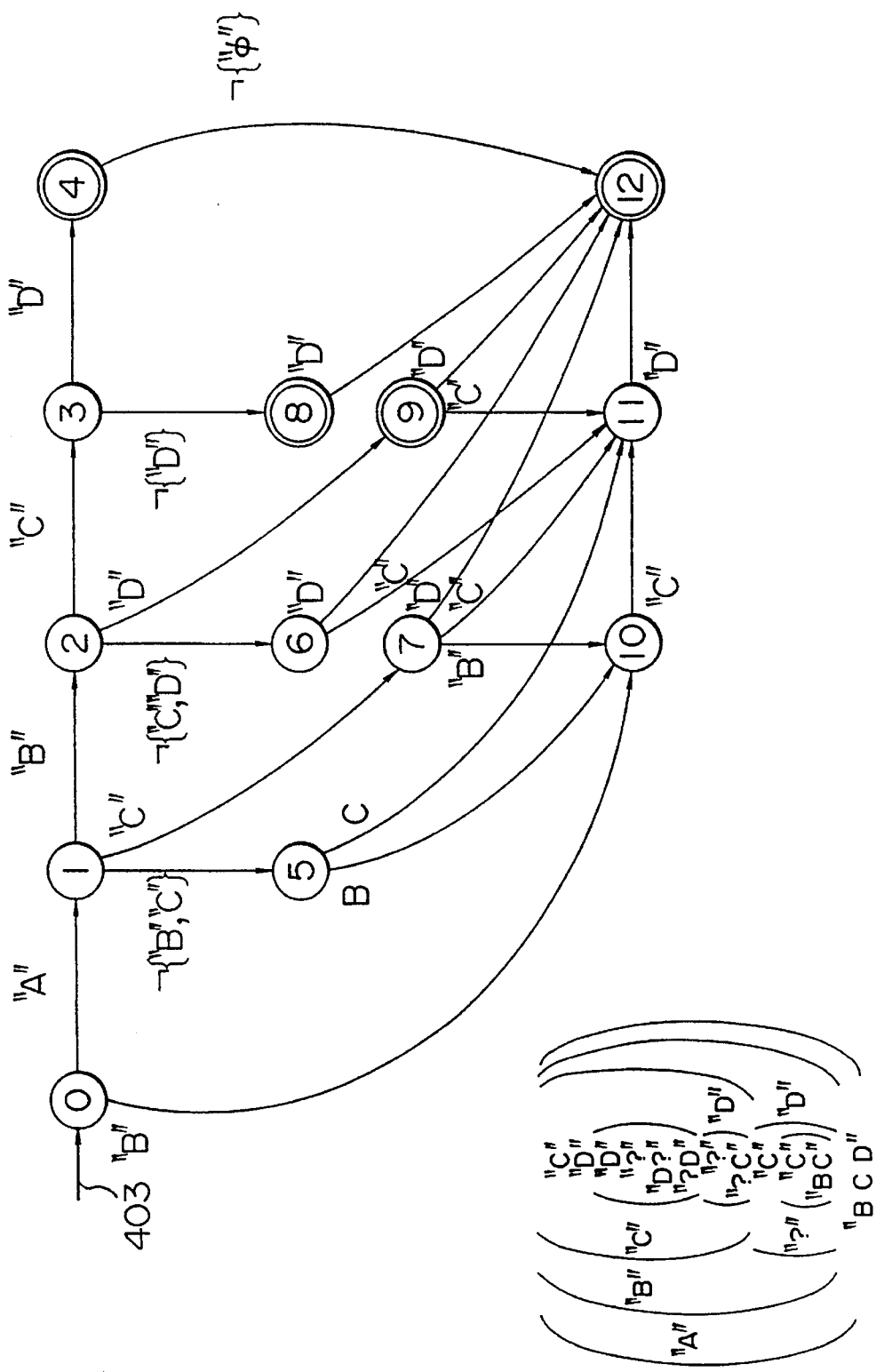

An automaton as shown in FIG. 52 can be generated based on the complex expression character stream in the same manner as in the case of fixed-length don't care characters.

The automaton generating method and the operation thereof are the same as in the case of the aforementioned upper-and-lower-limit distance designation automaton.

A processing method used in one-character-shifting allowed retrieval in which shifting of one character is allowed is described below.

The case where "ABCD" is designated as a key word is taken as an example. In this example, an automaton is generated with respect to "ABCD" as a correct key word and with respect to "BACD", "ACBD" and "ABCD" as one-character-shifted key words. These key words can be represented by the following complex expression character stream.

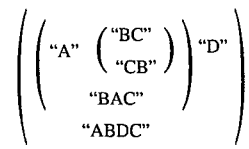

Figure 53:
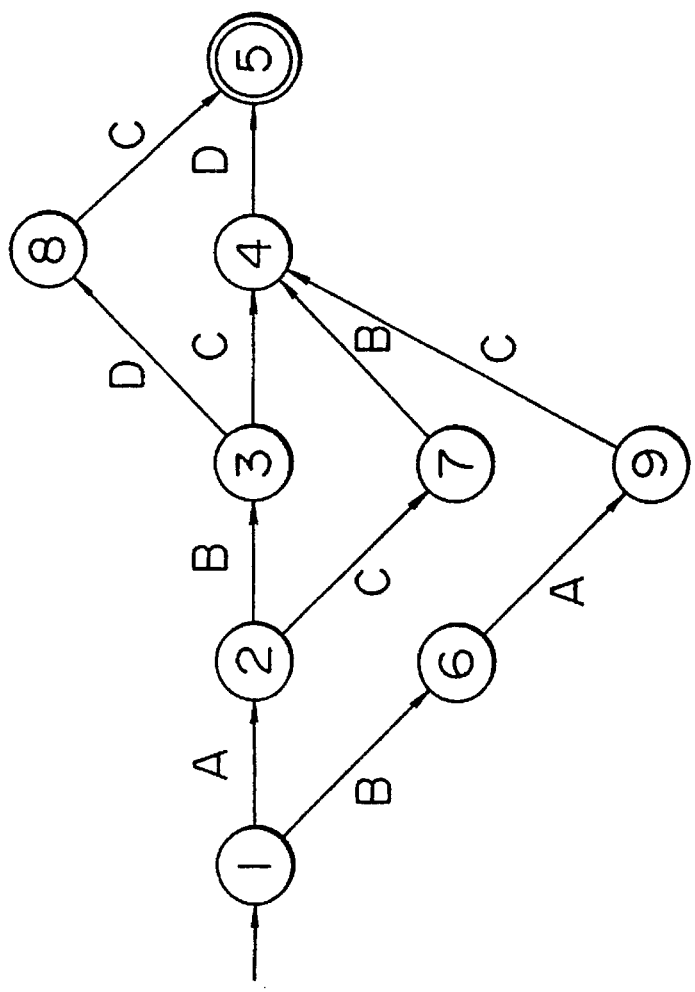

An automaton as shown in FIG. 53 can be generated based on the complex expression character stream in the same manner as in the case of fixed-length don't care characters.

The automaton generating method and the operation thereof are the same as in the case of the aforementioned one-character error allowed automaton.

As described above, according to the present invention, an automaton for realizing retrieval functions, such as different notation retrieval, fixed-length don't care character designation retrieval, character distance designation retrieval, variable-length don't care character designation retrieval, one-character error allowed retrieval, one-character-shifting allowed retrieval, and the like, can be generated with reduction of the number of states. Accordingly, not only the time required for generating the automaton can be shortened but the goto function table can be reduced in size. Consequently, a term search system small in hardware quantity can be provided.

An embodiment of a term search system equivalent to the search engine 1106 in FIG. 10 and using the aforementioned term search method will be described below.

Figure 45:
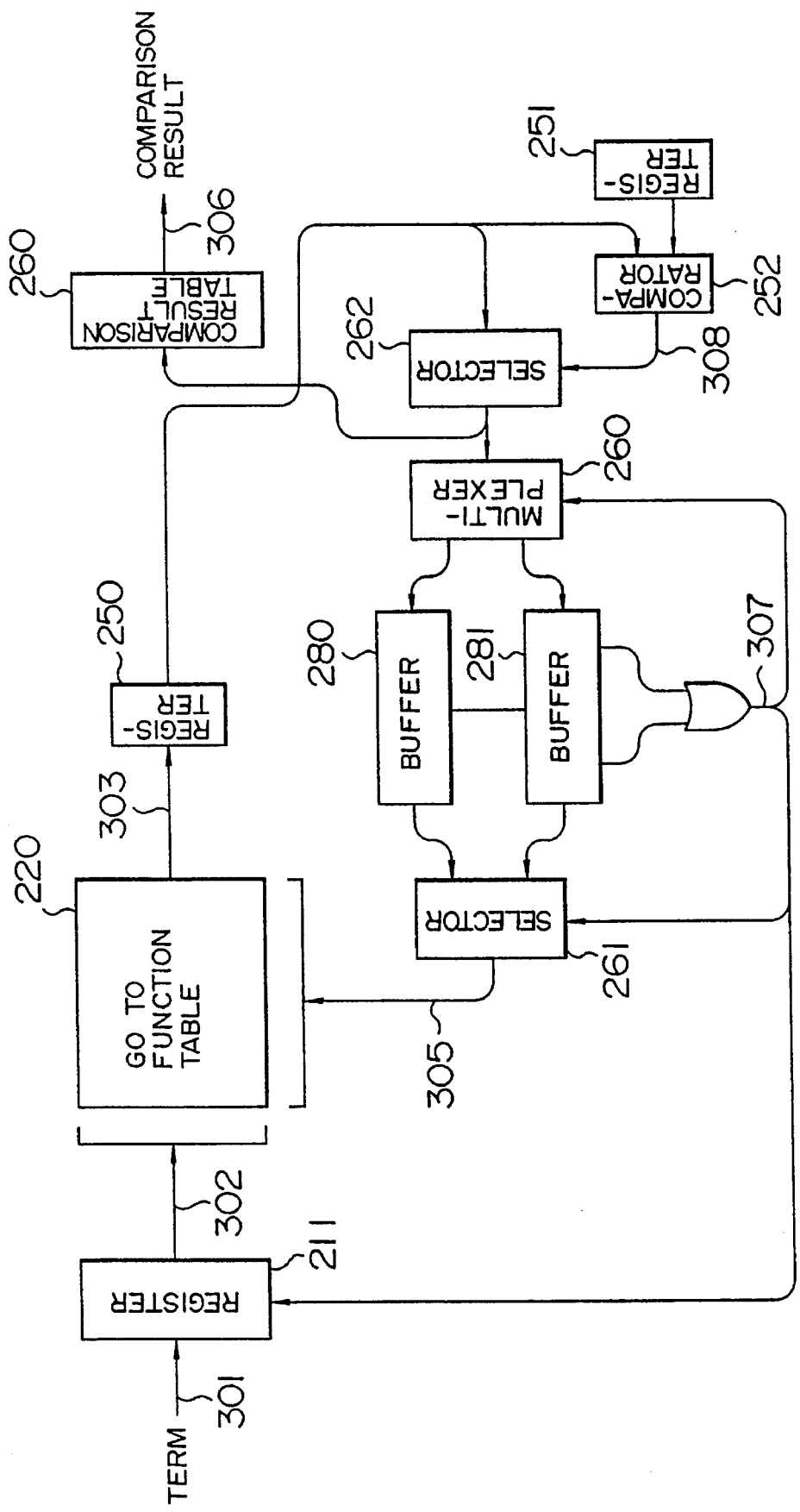
FIG. 45 is a block diagram of a character retrieval circuit using a finite-state automaton as an embodiment of the invention.

An example of construction of the system is shown in FIG. 45. In this embodiment, the system comprises a goto function table 220 for receiving both character code and state number and for generating transit state number, an output table 260 for receiving state number and for generating comparison result ID as to whether or not a matched search term is detected, a selector 262 for controlling the elimination of a token, a comparator 252 for judging whether the token can move to a transit state as information for controlling the elimination of the token, a register 251 for storing initial state number, and buffers 280 and 281 for storing current state number and transit state number.

The state transition operation of the automaton using this embodiment is described below. In FIG. 45, a sting of characters 301 read out from a predetermined search data base are one-by-one stored in a register 211. Each character code 302 generated from the register 211 is given, as address information, into the goto function table 220 in which the transition table of the automaton according to the present invention is stored. The goto function table 220 generates the transit state number 303 from the current state number 305 and the character code 302. When the transit state number is given as the initial state number, it shows that the transition of the automaton is not described. Therefore, it is necessary to eliminate the token when the transit state number is given as the initial state number. The transit state number 303 is stored in the register 250 and then stored in selected one of the buffers 280 and 281 via the selector 260 and multiplexer 260. At this time, the selector 262 controls whether or not the token is to be eliminated. The judgment as to whether or not the token is to be eliminated is made by examining through the comparator 252 whether or not the transit state number 303 is different from the initial state number (in this example, state number 0) stored in the register 251.

In short, in the case where the transit state number 303 is given as the initial state number, it shows that there is no state to which the token can move. Accordingly, the transit state number 303 is not selected by the selector 262. Therefore, the transit state number 303 is not delivered to the multiplexer 260, so that the token is eliminated.

On the contrary, in the case where the transit state number is different from the initial state number, it shows that there is a state to which the token can move. Accordingly, the transit state number 303 is selected by the selector 262 and delivered to the multiplexer 260, so that the token is not eliminated.

By eliminating the token as described above when the transit state is given as the initial state number, the problem that the token of the initial state number is accumulated in the buffers 280 and 281 so that redundant tokens exist in the buffers 280 and 281 to cause overflow can be solved.

Figure 55:
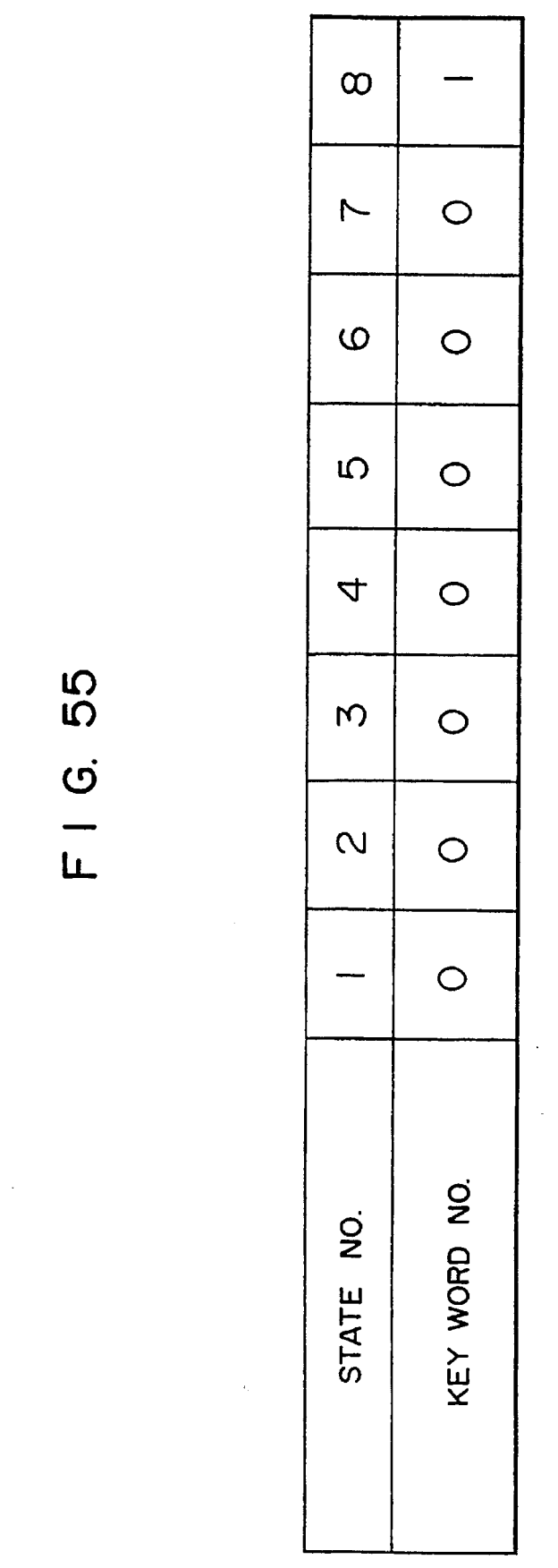

The buffers 280 and 281 are respectively used for reading data and writing data, thus to attain high-speed processing. The two buffers can be collected as one buffer to reduce the circuit size. However, processing speed is lowered when the two buffers are collected. The start transit state number as an initial value is set in each top address of the buffers 280 and 281. The transit state number 303 delivered to the buffers 280 and 281 is stored successively from the address next to the start state. The current state number 305 is successively read from one of the buffers 280 and 281 selected by the selector 261. When all is read out, a readout end signal 307 is generated. The multiplexer 260 and the selector 261 are synchronized with each other. In respect to the selecting operation, the selector 261 selects the buffer 281 when the multiplexer 260 selects the buffer 280. On the contrary, when the multiplexer 260 selects the buffer 281, the selector 261 selects the buffer 280. The selection switching of the buffers 280 and 281 is made in the timing when the readout end signal 307 for one of the buffers 280 and 281 selected by the selector 261 is generated. The goto function table as shown in FIG. 55 is stored in the goto function table 220. This corresponds to the automaton as shown in FIG. 46. The register 211 generally fetches term data synchronously with the register 250. The register 211 keeps the term data till the readout end signal is generated. In short, the register 211 waits for next input till all current state numbers are read out. Predetermined codes for identifying respective search terms correspondingly to the end state as an end point of each term are stored in the search result table 260. The content of the search result table 260 corresponding to the automaton as shown in FIG. 46 is shown in FIG. 55. When the search term number is not zero, it shows an effective search term number. In short, when the search term number corresponding to the state number is not zero, it is delivered, as the result of comparison, to the query resolver 1145 as shown in FIG. 10. A retrieval process can be carried out by repeating the aforementioned operation for each constituent character of the input term in the form of execution of the automaton as shown in FIG. 46.

The comparing operation in this method in the case where an input term, for example, "インタフェイス (intafeisu; katakana)" is given is described below.

First, as initial setting, the following process is carried out.

The goto function table as shown in FIG. 54 is stored in the goto function table 220. The search result table as shown in FIG. 55 is stored in the search result table 260. These tables correspond to the automaton as shown in FIG. 46.

The start state number 0 as an initial value is stored in each top address of the buffers 280 and 281. The initial state number 0 is stored in each of the registers 250 and 251. The multiplexer selects the buffer 281. The selector 261 selects the buffer 280. Accordingly, the transit state number 303 is equal to the start state number 0.

In the following, the comparing operation based on the initial setting is described.

First, the first character "イ (i; katakana)" is stored in the register 211. Then, the transit state number 1 is read out from the goto function table 220 with the character code 302 and the current state number 305 as a readout address and then stored in the register 250. At this time, the current state number 305 is zero.

The comparator 252 makes a comparison between 0 as the initial state number stored in the register 251 and 1 as the transit state number 303 stored in the register 250. Because they are not equal, the selector 262 selects the transit state number 303. This shows that a transition from state 0 to state 1 caused by the transition character "イ (i; katakana)" is described.

Because the search term number of the search result table 260 in state 1 is zero, the comparison result 306 is not generated. This shows that the comparison result is not stored in state 1.

Because the multiplexer 281 selects the buffer 281, the transit state number 1 is stored, as a second transit state number after the start state number, in the buffer 281. Because all current state numbers are read out from the buffer 280, an end signal 307 is generated.

As a result, the multiplexer 260 selects the buffer 280 and, on the other hand, the selector 261 selects the buffer 281. In short, two transit state numbers in the buffer 281 are used as current state numbers for transitions corresponding to the next character.

When these operations are regarded as state transitions of the automaton, a judgment is made as to whether the transition character "イ (i; katakana)" is described in state 0 as a current state number stored in the buffer 280. Then, when the transition is not described, the next current state number is processed. On the contrary, when the transition is described, the transit state number is stored in the buffer 281 and, at the same time, a judgment as to whether the comparison result is stored is made by checking whether an effective term ID is stored in the address of the output table designated by the transit state number. Because, in this case, the transition is described, state 1 as the transit state number is stored in the buffer 281. However, though the output table is examined, the output is not stored. Accordingly, the comparison result is not generated.

Then, the second character "ン (n; katakana)" is stored in the register 211. Then, the transit state number 0 is read out from the goto function table 220 with the character code 302 and the current state number 305 as a readout address and then stored in the register 250.

The comparator 252 makes a comparison between 0 as the initial state number stored in the register 251 and 0 as the transit state number stored in the register 250. Because they are equal, the selector 262 does not select the transit state number 303. Therefore, the transit state number 303 is not stored in the buffer 280. This shows that a transition caused by the transition character "ン (n; katakana)" is not described in state 0.

In this method, generation of a token in the transition from the start state to the start state is prevented by the aforementioned control.

Then, a second transit state number 1 is read out from the buffer 281. With the character code 302 and the transit number of 1 as an address, a transit state number 2 is obtained from the goto function table 220 and stored in the register 250. The comparator 252 makes a comparison between 0 as the initial state number stored in the register 251 and 2 as the transit state number 303 stored in the register 250. Because they are not equal, the selector 262 selects the transit state number 303. This shows that a transition from state 1 to state 2 caused by the transition character "ン (n; katakana)" is described.

Because the search term number of the search result table 260 in state 2 is zero, the comparison result 306 is not generated. This shows that the comparison result is not stored in state 2.

Because the multiplexer 260 selects the buffer 280, "2" as the transit state number 303 is stored, as a second transit state number after the start state number, in the buffer 280.

Because all current state numbers are read out from the buffer 281, an end signal 307 is generated.

As a result, the multiplexer 260 selects the buffer 281 and, on the other hand, the selector 261 selects the buffer 280. In short, two transit state numbers in the buffer 280 are used as current state numbers for transitions corresponding to the next character.

When these operations are regarded as state transitions of the automaton, a judgment is made as to whether the transition character "ン (n; katakana)" is described in state 0 as a current state number stored in the buffer 281. In this case, it is not described. Accordingly, comparison in state 1 as the next current state number is made in the same manner as described above. In this case, the transition to state 2 is described. Accordingly, state 2 is stored, as a transit state number, in the buffer 280. Because the comparison result is not stored in state 2, the comparison result is not generated.

The third character "タ (ta; katakana)" is subjected to comparison in the same manner as the second character. Accordingly, the comparing operation for the third character will be described briefly. A comparing operation in state 0 as the current state number registered in the buffer 280 is carried out. Because, in this case, there is no description, a comparing operation in state 2 as the next current state is carried out in the same manner as described above. Because the transition to state 3 is described, state 3 is stored, as a transit state number, in the buffer 280. Because the comparison result is not stored in state 3, the comparison result is not generated.

The fourth character "フ (fu; katakana)" is subjected to comparison in the same manner as the third character. Accordingly, the comparing operation for the fourth character will be described briefly. A comparing operation in state 0 as the current state number registered in the buffer 281 is carried out. Because, in this case, there is no description, a comparing operation in state 3 as the next current state is carried out in the same manner as described above. Because the transition to state 4 is described, state 4 is stored, as a transit state number, in the buffer 280. Because the comparison result is not stored in state 4, the comparison result is not generated.

The fifth character "エ (e; katakana)" is subjected to comparison in the same manner as the fourth character. Accordingly, the comparing operation for the fifth character will be described briefly. A comparing operation in state 0 as the current state number registered in the buffer 280 is carried out. Because, in this case, there is no description, a comparing operation in state 4 as the next current state is carried out in the same manner as described above. Because the transition to state 5 is described, state 5 is stored, as a transit state number, in the buffer 281. Because the comparison result is not stored in state 5, the comparison result is not generated.

Then, the sixth character "イ (i; katakana)" is read in the register 211. In this step, the number of tokens is increased from 2 to 3. Accordingly, this step will be described in detail.

With the character code 302 and the transit state number of 0 as an address, "1" as a transit state number is obtained from the goto function table 220 and stored in the register 250. The comparator 252 makes a comparison between 0 as the initial state number stored in the register 251 and 1 as the transit state number stored in the register 250. Because they are not equal, the selector 262 selects the transit state number 303. Because the key word number of the search result table in state 1 is zero, the comparison result 306 is not generated. Because the multiplexer 260 selects the buffer 280, 1 as a transit state number is stored, as a second transit state number after the start state number, in the buffer 280.

Then, a second transit state number 6 is read out from the buffer 281. With the character code 302 and the transit number of 6 as an address, a transit state number 7 is obtained from the goto function table 220 and stored in the register 250. The comparator 252 makes a comparison between 0 as the initial state number stored in the register 251 and 7 as the transit state number stored in the register 250. Because they are not equal, the selector 262 selects the transit state number. Because the key word number of the search result table in state 7 is zero, the comparison result 306 is not generated. Because the multiplexer 260 selects the buffer 280, 7 as a transit state number is stored, as a third transit state number, in the buffer 280. Because all current state numbers are read out from the buffer 281, an end signal 307 is generated.

As a result, the multiplexer 260 selects the buffer 281 and, on the other hand, the selector 261 selects the buffer 280. In short, three transit state numbers in the buffer 280 are used as three current state numbers for transitions corresponding to the next character.

Then, the seventh character "ス (su; katakana)" is read in the register 211 to be subjected to comparison. With the character code 302 and the transit state number of 0 as an address, a transit state number 0 is obtained from the goto function table 220 and stored in the register 250. The comparator 252 makes a comparison between 0 as the initial state number stored in the register 251 and 0 as the transit state number stored in the register 250. Because they are equal, the selector 262 does not select the transit state number 303. Accordingly, the transit state number is not stored in the buffer 281.

Then, a second transit state number 1 is read out from the buffer 281. With the character code 302 and the transit number of 0 as an address, a transit state number 0 is obtained from the goto function table 220 and stored in the register 250. The comparator 252 makes a comparison between 0 as the initial state number stored in the register 251 and 0 as the transit state number stored in the register 250. Because they are equal, the selector 262 does not select the transit state number. Accordingly, the transit state number is not stored in the buffer 281.

In this embodiment, elimination of a token is made by the aforementioned control.

Further, a third transit state number 7 is read out from the buffer 281. With the character code 302 and the transit number of 7 as an address, a transit state number 8 is obtained from the goto function table 220 and stored in the register 250. The comparator 252 makes a comparison between 0 as the initial state number stored in the register 251 and 8 as the transit state number stored in the register 250. Because they are not equal, the selector 262 selects the transit state number.

Because the key word number of the search result table 260 in state 8 is 1, the key word number 1 is obtained as the comparison result. Because the multiplexer 260 selects the buffer 281, 8 of the transit state number is stored, as a second transit state number after the start state number, in the buffer 281.

Because all current state numbers are read out from the buffer 280, an end signal 307 is generated.

As this result, the multiplexer 260 selects the buffer 280 and, on the other hand, the selector 261 selects the buffer 281. In short, two transit state numbers are used as two current state numbers for transitions corresponding to the next character.

As described above, search for the term "インタフェイス (intafeisu; katakana)" can be attained by controlling tokens.

According to this embodiment, a term search system free from the concept "failure" can be provided by controlling such a plurality of tokens. Accordingly, not only the time required for generating the automaton can be shortened but the number of states can be reduced. Consequently, an advantage arises in that the goto function table can be reduced in size.

Next, an embodiment of a magnetic disk unit used for realizing the present invention will be described with reference to FIGS. 56 to 70.

Figure 57:
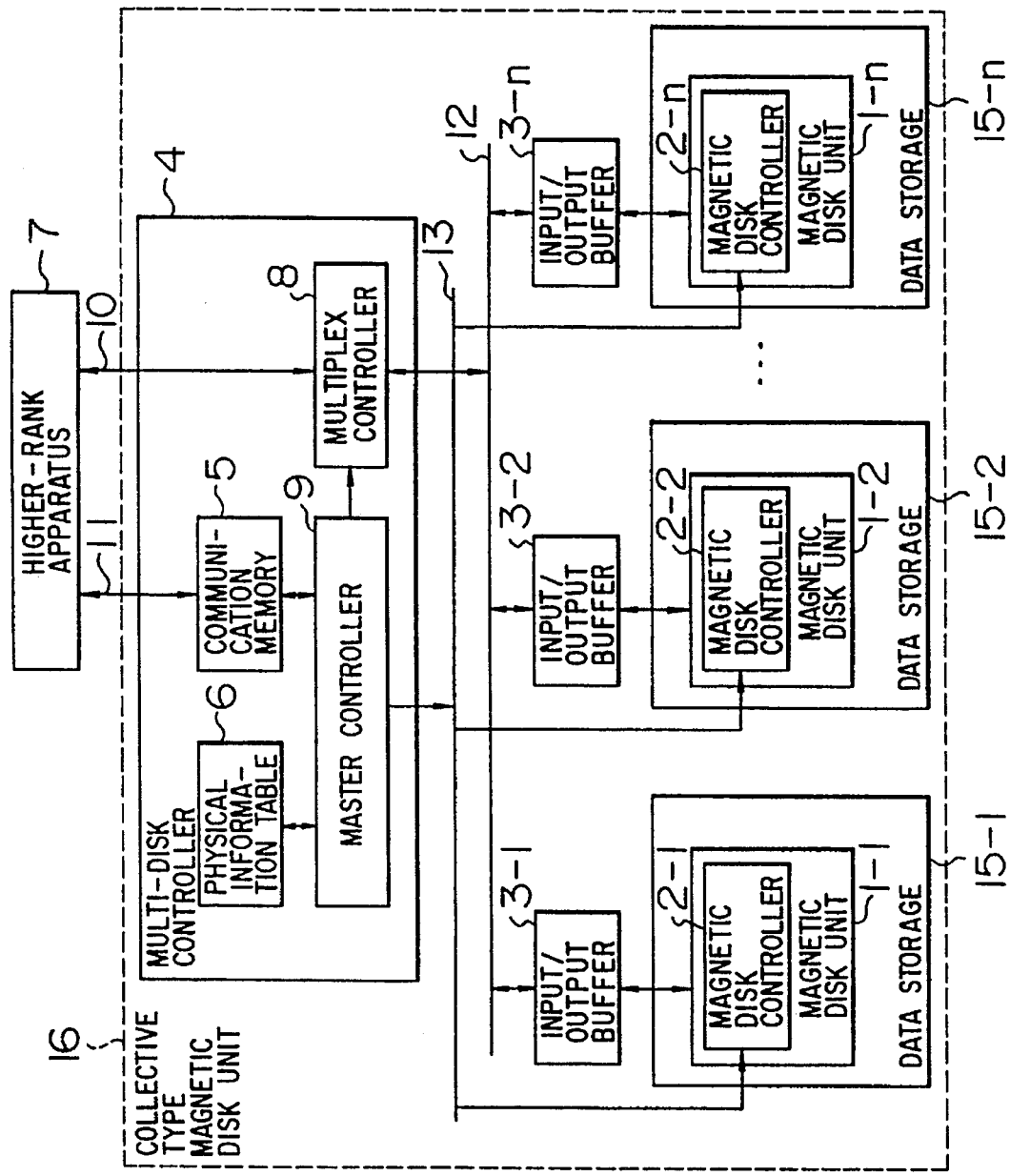
FIG. 57 is a block diagram showing another embodiment.

FIG. 57 shows an arrangement of a collective type magnetic disk unit, which is constituted by: n data storages 15 each having a magnetic disk device 1; input/output buffers 3 each having capacity corresponding to one cylinder of the magnetic disk device 1 and being connected to their associated data storages 15; and a multi-disk controller 4 for controlling the data storages 15 and the input/output buffers 3.

In this arrangement, each of the data storages 15 is constituted by one magnetic disk device 1, and each of the input/output buffers 3 is constituted by one memory having capacity corresponding to one cylinder of the magnetic disk device 1.

The multi-disk controller 4 is constituted by a communication memory 5 in which the file ID of a file as a subject of access can be set directly through a higher-rank apparatus 7, a multiplex controller 8 for controlling a high speed data bus 10, a physical information table 6 as a converting table for obtaining the physical information of storage destination for the magnetic disk unit from the file ID, and a master controller 9 for controlling the communication memory 5, the multiplex controller 8 and the physical information table 6.

The higher-rank apparatus 7 is constituted by a host controller for giving a command to the collective type magnetic disk unit, and a term search system for detecting a designated term from inputted data and outputting the detected information.

Before a data base constituting data files is built up in this collective type magnetic disk unit, processing for defining the structure of the data base is performed.

In this collective type disk unit, in order that logically related files are disposed closely in their physical storage positions, at first, physical cylinders are allotted according to a logical classification ID having a hierarchical structure. In the case of putting a plurality of files into access at the same time, there are many cases that logically related files are chosen as the subject. Therefore, by making their storage positions close to each other, the distance of a magnetic head moving between cylinders of a magnetic disk device is shortened, so as to shorten the seek time which is a part of the access time.

Figures 58A, 58B:
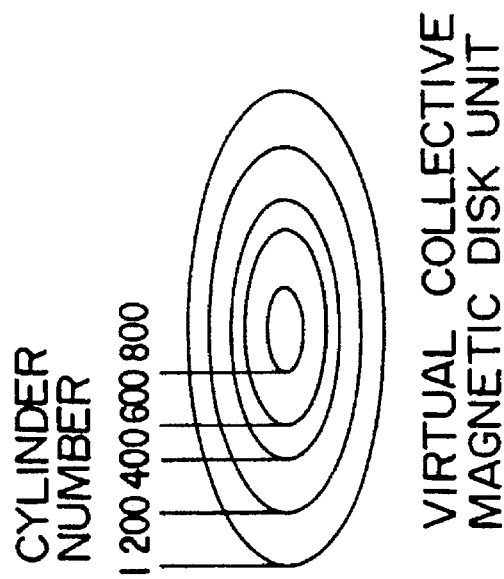
FIGS. 58A and 58B are views showing an example of construction of a structure definition table.
Figure 61:
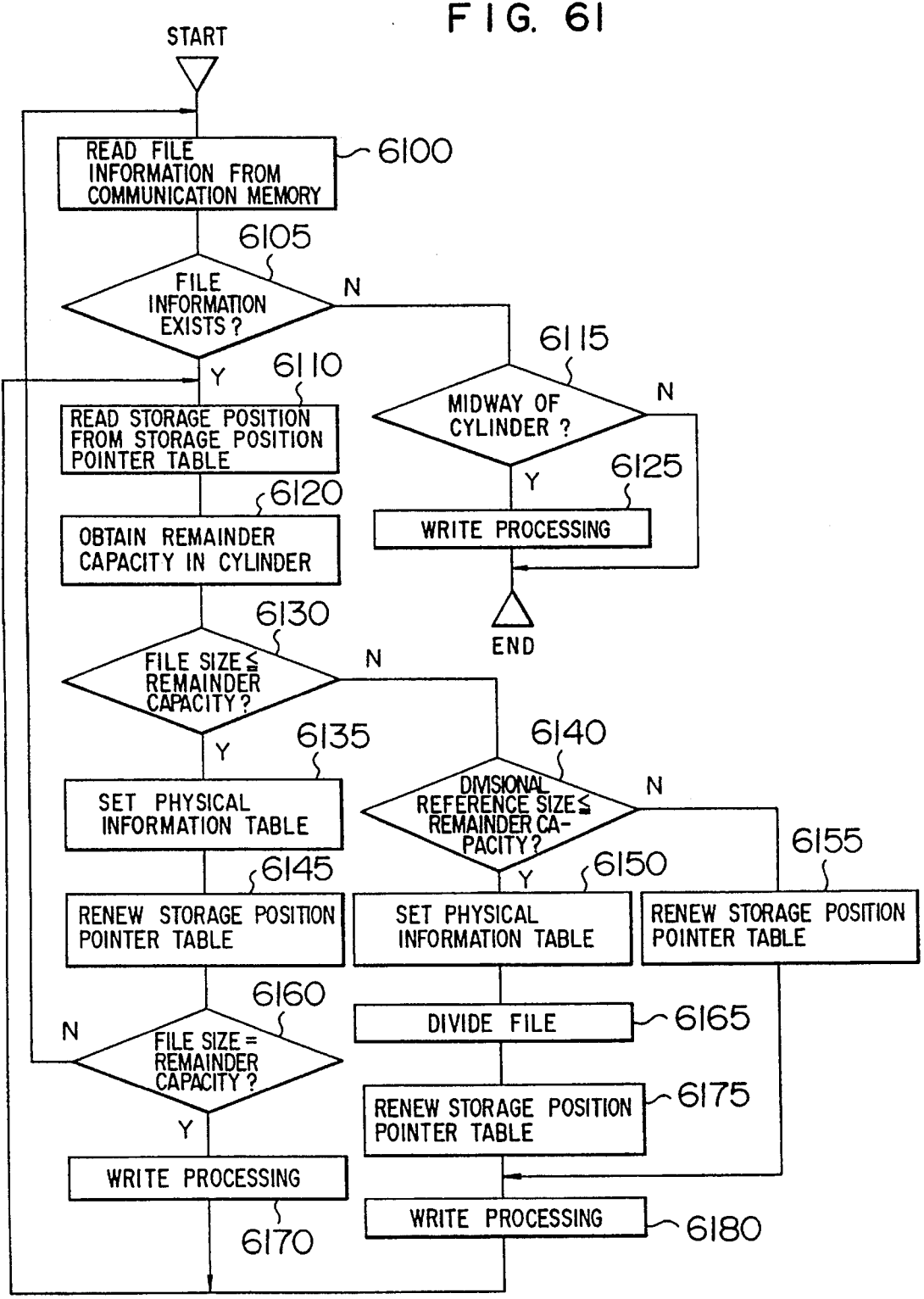
FIG. 61 is a flow chart of file writing in the embodiment shown in FIG. 57.

In allotment of physical cylinders according to a logical classification ID having a hierarchical structure, after the higher-rank apparatus 7 stores in the communication memory 5 the data base structure defining information constituted by a group of memory capacities which are necessary for the logical classification ID and the above-mentioned file classification, the higher-rank apparatus 7 gives a data base structure defining command to the multi-disk controller 4. On the basis of the data base structure defining information set in the communication memory 5, the master controller 9 in the multi-disk controller 4 given the structure defining command makes up on a memory in the master controller 9 a structure defining table having a structure shown in FIGS. 58A and 58B and showing how physical positions are corresponding to logical sorts. FIGS. 58A and 58B show an example having two hierarchies respectively having two classifications, in which the whole of magnetic disk devices is regarded as one magnetic disk unit, and the storage position and memory capacity of each classification are shown by the position and number of cylinders respectively.

In the processing for defining the structure of a data base, in order to hold the physical positions of storage destinations of written files, the master controller 9 in the multi-disk controller 4 makes up on the memory in the master controller 9 a storage position pointer table having a structure shown in FIG. 58A and showing the physical positions of the storage destinations of the written files. When the structure definition is finished, the storage destination pointer table shows the start positions in the start sectors, the start sectors, the start tracks and the start cylinders of the respective logical classifications set in the structure definition. In FIGS. 59A to 59D, the storage position pointer information is stored in the case where files are stored according to the classification in the example shown in FIG. 53A.

Next, building a data base will be described. In this collective type magnetic disk unit, management information using a file ID (constituted by a logical classification ID and a number peculiar thereto in the logical classification) is made up as means for designating a file as a subject of access by use of the file ID.

After the higher-rank apparatus 7 stores in the communication memory 5 the file information constituted by a plurality of pairs of the file ID and the file size of files to be written into the communication memory 5, the higher-rank apparatus 7 gives a write command to the multi-disk controller 4. The multi-disk controller 4 supplied with the write command executes processing along the flow chart shown in FIG. 61. The master controller 9 in the multi-disk controller 4 reads a file ID in the file information from the communication memory 5, and reads out from the storage position pointer table the storage position to store the file indicated by the file ID.

If the storage position is obtained, the remainder capacity to write in the physical cylinder therein is obtained. If the size of the file given by the file size of the file information is smaller than the remainder capacity, the storage position (the disk number, the cylinder number, the track number, the sector number and the position in the sector), the file size and the number of overlain disks are written in the physical information table 6 having a file ID in FIG. 60A as an entry. The number of overlaid disks indicates the number of magnetic disk devices overlaid by a file, for a file to be a subject is separated when the file cannot be written in one cylinder of one magnetic disk device, and the remainder of the separated file is written in the next disk. This value of the number of overlaid disks is counted up if this is a separated remainder file. The entry of the physical information table 6 is shown by a file ID given by the file information.

After writing into the physical information table, the storage position pointer is advanced by the file size.

If the file size is equal to the remainder capacity, it is the time a cylinder of one magnetic disk device 1 is full, and processing for writing into the magnetic disk device 1 is performed.

If the file size is larger than the remainder capacity, the remainder capacity is compared with divisional reference size. The divisional reference size is a value set in the structure defining processing. If a file is stored over two magnetic disk devices 1 though the remainder capacity of a cylinder is very small, it is necessary to control the two magnetic disk devices 1 in reading the file, so that the overhead is increased by the processing of the controlling. Therefore, the divisional reference size is for writing a file from the head of a cylinder of the next magnetic disk device 1 if the remainder capacity is smaller than a certain reference value which is set as a reference.

If the remainder capacity is not smaller than the divisional reference size, after the storage position and the file size are stored in the physical information table 6, the file is divided into a file to be written in the remainder capacity and the remainder file remaining to be written. The storage physical position and the file size are written in the physical information table 6.

The magnetic disk device 1 having made up the physical information fulfiling one cylinder performs write processing. Returning through the loop, the remainder file becomes a file of the subject to be processed next.

If the remainder capacity is smaller than the divisional reference size, after advancing the storage position pointer table to the head of the next cylinder, the master controller returns through the loop, makes the file of the processing subject that of the next processing subject as it is, and continues the processing. At this time, the magnetic disk device 1 having made up the physical information fulfiling one cylinder performs write processing.

In the write processing, the master controller 9 gives a seek command to each magnetic disk device 1 to start a seek operation. Next, giving a transfer request of a file to the higher-rank apparatus 7, the master controller 9 requires the higher-rank apparatus 7 to transfer the file and at the same time controls the multiplex controller 8 to change a data bus, so as to transfer the transferred file to the input/output buffer 3 designated by the physical information. When the seek operation is finished and the transfer of a file is finished, the master controller 9 supplies a write command to a magnetic disk device 1, and the magnetic disk device 1 executes a write operation.

The above-mentioned operation is repeated so that a data base is constructed.

Figure 62:
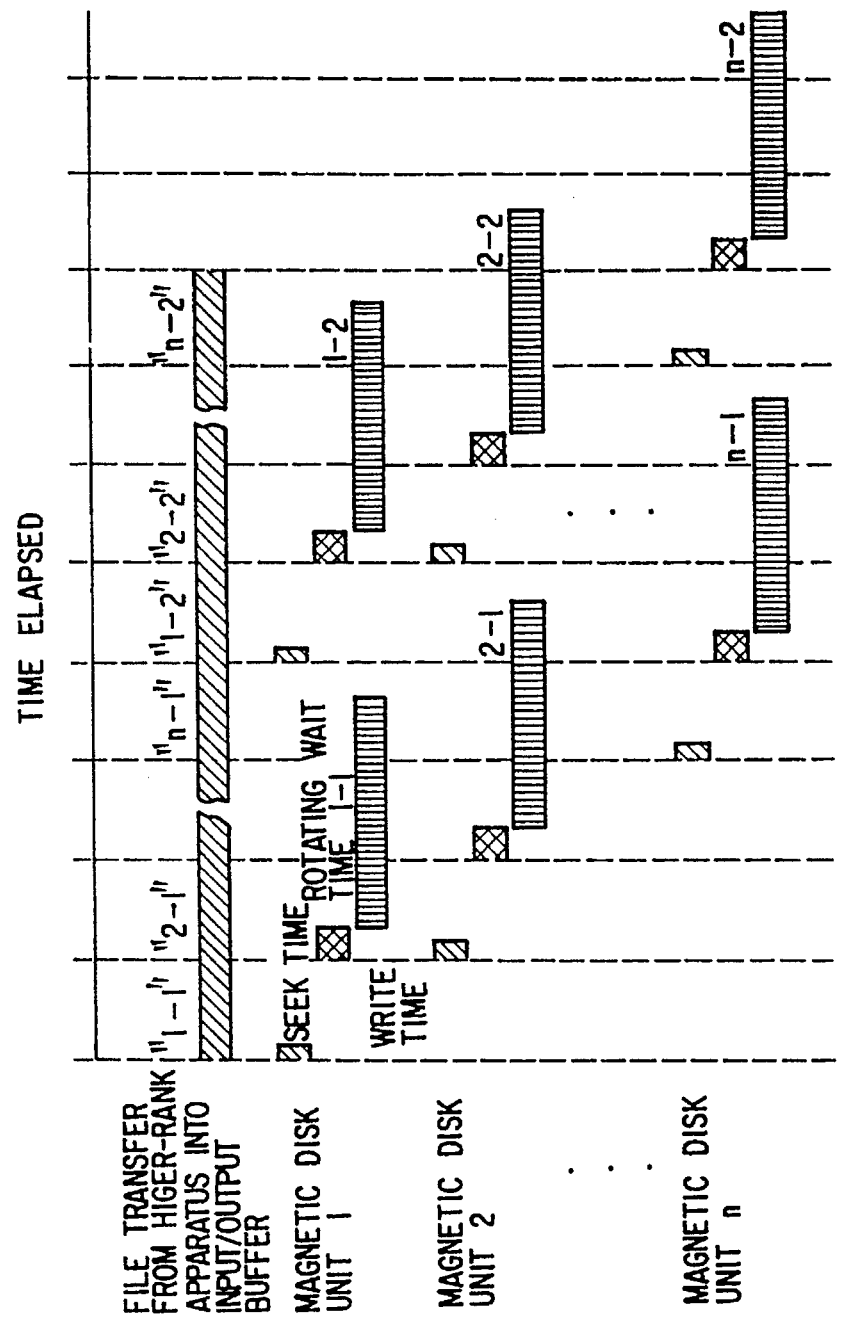
FIG. 62 is a timing chart of a file writing process in the collective-type magnetic disk device in FIG. 57.

FIG. 62 shows a relationship of time in write processing, in which data "1-1", "2-1", . . . , "n-1", "1-2", "2-2", . . . sequentially transferred from the higher-rank apparatus 7 are stored in the input/output buffers 3-1, 3-2, . . . , 3-n, 3-1, 3-2, . . . by the multiplex controller 8 in the multi-disk controller 4. At this time, for example, the magnetic disk device 1-1 starts seeking in accordance with a command of the master controller 9 immediately before starting transferring the data "1-1". As soon as the transfer of the data "1-1" is finished, the master controller 9 supplies a write command to the magnetic disk device 1-1. After rotating and waiting till reaching the designated write position, the magnetic disk device 1-1 starts writing the data "1-1" of the input/output buffer 3-1 into the designated sector, track, cylinder.

In the meantime, the other magnetic disk devices also perform the same processing as shown in FIG. 62.

As is apparent from FIG. 62 and the above description with reference thereto, each magnetic disk device can write files continuously and parallelly, so that it is possible to build up a data base in a short time.

Next, read processing of a file will be described. Additionally, in the case where a plurality of files to be read are on the same cylinder of the same magnetic disk device, description will be made as to means for reading not only the files to be read but also unnecessary files among the files onto an input/output buffer temporarily and deleting the unnecessary files at the time of transferring to an higher-rank apparatus.

After storing in the communication memory 5 the file information constituted by a plurality of file IDs of files to be read, the higher-rank apparatus 7 supplies a read command to the multi-disk controller 4.

Figure 63:
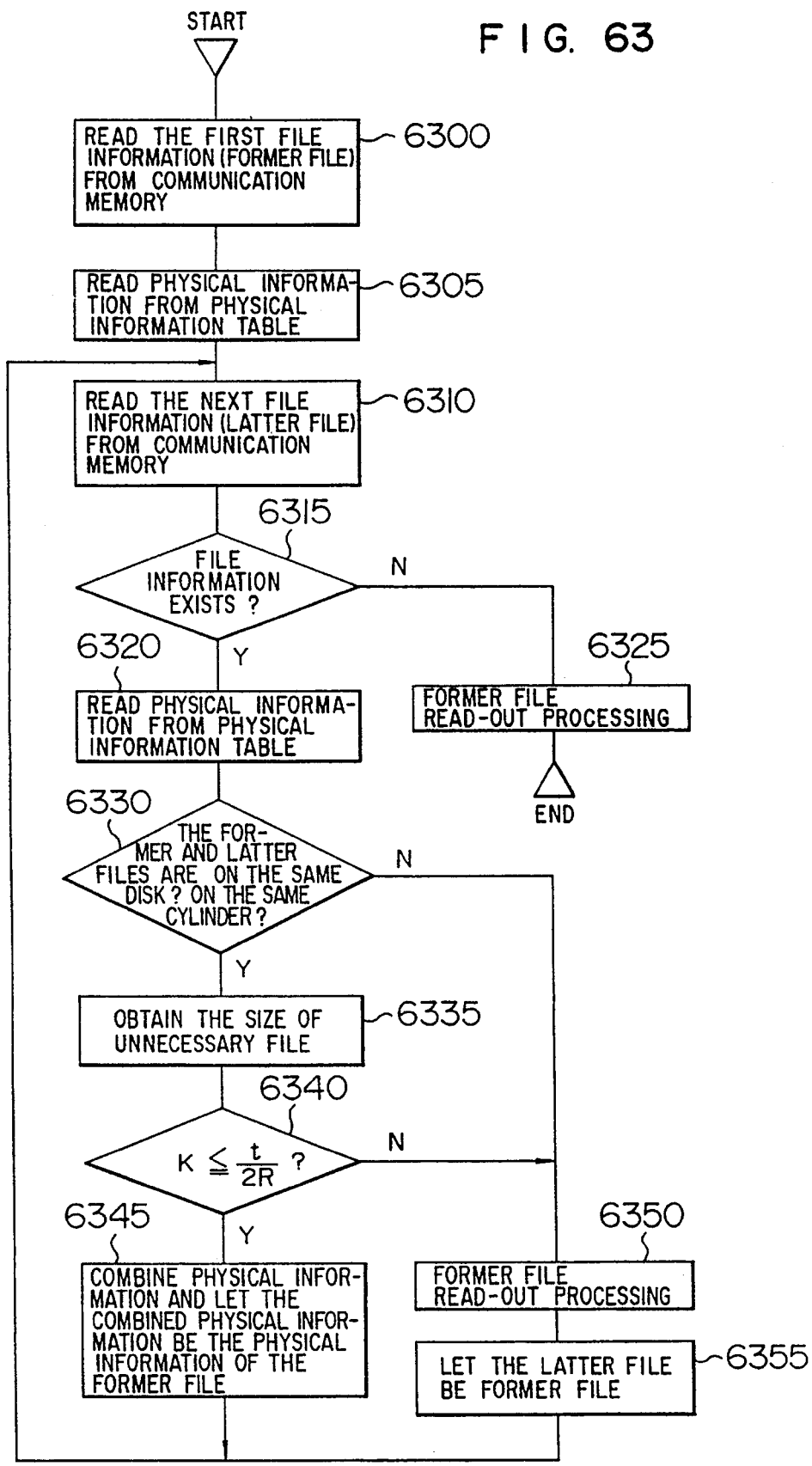
FIG. 63 is a flow chart of a file reading process in the embodiment in FIG. 57.

The multi-disk controller 4 supplied with the read command executes processing along the flow chart shown in FIG. 63.

The master controller 9 in the multi-disk controller 4 reads from the communication memory 5 a file ID of a file to be read first, and searches the file ID for the physical information about the storage of the file, with reference to the physical information table 6. This file is named a preceding file, and the physical information is named the physical information of the preceding file. Next, the master controller 9 reads from the communication memory 5 a file ID of a file to be read next, and searches the file ID for the physical information about the storage of the file, with reference to the physical information table 6. This file is named a succeeding file, and the physical information is named the physical information of the succeeding file.

From the obtained physical informations, the master controller 9 inquires if the preceding and succeeding files are in the same cylinder or not; if yes, inquires if there are a group of not-designated unnecessary files or not; and if yes, obtains the total size of the group of the files. If the size of the unnecessary files is small, the master controller 9 combines the physical informations so as to read the preceding and succeeding files by one read command. Next, making the combined physical information that of a preceding file and returning through the loop, the master controller 9 reads the next file ID from the communication memory 5, makes the file a succeeding file, and performs the same processing.

If the preceding and succeeding files are not in the same cylinder or the size of the unnecessary files are large, the master controller 9 executes read processing from the magnetic disk unit having the preceding file. Making the physical information of the succeeding file be that of the preceding file, and returning through the loop, the master controller 9 reads the next file ID, makes the file be a succeeding file, and performs the same processing.

Such an operation is repeated till all of designated files are read out.

In the processing of reading a preceding file from a magnetic disk device, at first, the master controller 9 supplies a seek command, to move a magnetic head to the physical position indicated by the physical information of the preceding file, to the magnetic disk controller 2-i of the magnetic disk device 1-i indicated by the physical information of the preceding file, so that the magnetic disk device 1-i starts a seek operation. When the seek operation is finished, if the input/output buffer 3-i is in a writable state, the master controller 9 supplies a read command to the magnetic disk controller 2-i, so as to start storing in the input/output buffer 3-i the file read from the magnetic disk device 1-i. When the storing is finished, the master controller 9 controls the multiplex controller 8, so as to start transferring data from the input/output buffer 3-i to the higher-rank apparatus 7.

Figure 64:
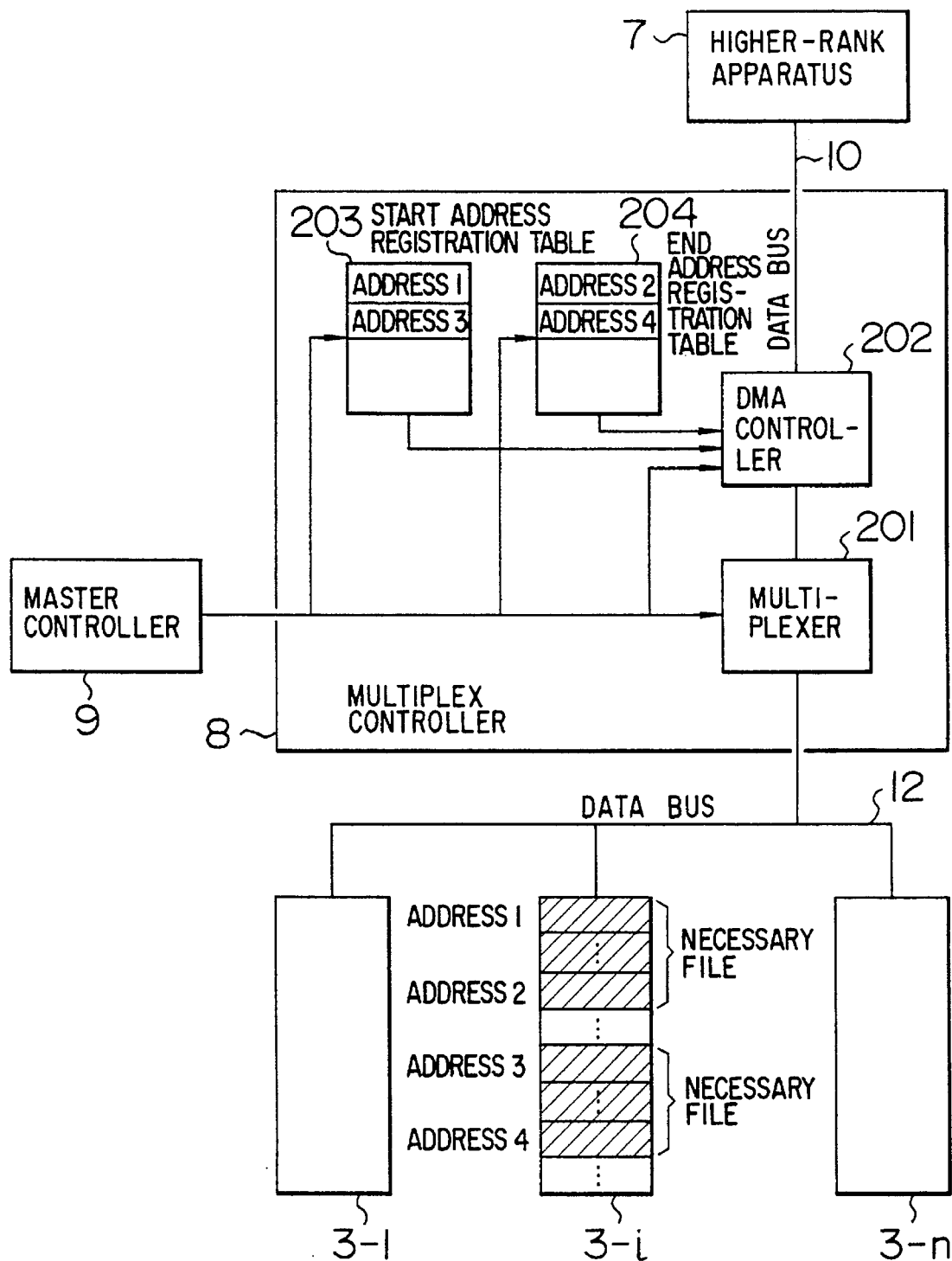
FIG. 64 is a view showing an example of construction of a multiplex controller.

As shown in FIG. 64, the multiplex controller 8 is constituted by a multiplexer 201 for selecting one of the input/output buffers 3-1 to 3-n and connecting the data bus of the selected ith input/output buffer 3-i to the data bus of the higher-rank apparatus 7, a DMA controller 202 for supplying data from the input/output buffer 3-i to the higher-rank apparatus 7 without the intermediate of the master controller 9, and start and end address registration tables 203 and 204 for storing start and end addresses to designate the transfer region of the input/output buffer 3-i for the DMA controller 202.

After having set the start and end addresses containing a file to be transferred of the input/output buffer 3-i in the start and end address registration tables 203 and 204 respectively, the master controller 9 issues a start command to the DMA controller 202 if data transfer is not being carried out from any other input/output buffer 3 to the higher-rank apparatus 7. The DMA controller 202 transfer only the data in a designated range while referring to the start and end address registration tables 203 and 204 at the transfer speed required by the higher-rank apparatus 7 without intervention by the master controller 9.

In order to read preceding and succeeding files in accordance with one read command, in the case where processing for combining their physical informations is performed and the files are read onto the input/output buffer 3-i, a plurality of addresses are set in the start and end address registration tables 203 and 204 so that all of necessary files are transferred, and then the same processing is performed.

The processing for combining the physical information to read the preceding and succeeding files in accordance with one read command is performed if the following conditions are satisfied.

Let the sizes of the preceding and succeeding files f1 and f2 [Byte], the size of the sum of a group of unnecessary files k [Byte], the effective transfer speed from each magnetic disk device 1 to each input/output buffer 3 without a seek operation t [Byte/sec], the rotation speed R [rps] and the average seek time s [sec], and the average rotation wait time is (½R), and the condition that the time to read out a plurality of files at a time is smaller than the time to read one by one is expressed by:

$$S + \frac{1}{2R} + \frac{f1 + k + f2}{t} \leq \left( S + \frac{1}{2R} + \frac{f1}{t} \right) + \left( \frac{1}{2R} + \frac{f2}{t} \right)$$

and that can be expressed by:

$$k \leq \frac{t}{2R} \qquad (3)$$

Figure 65:
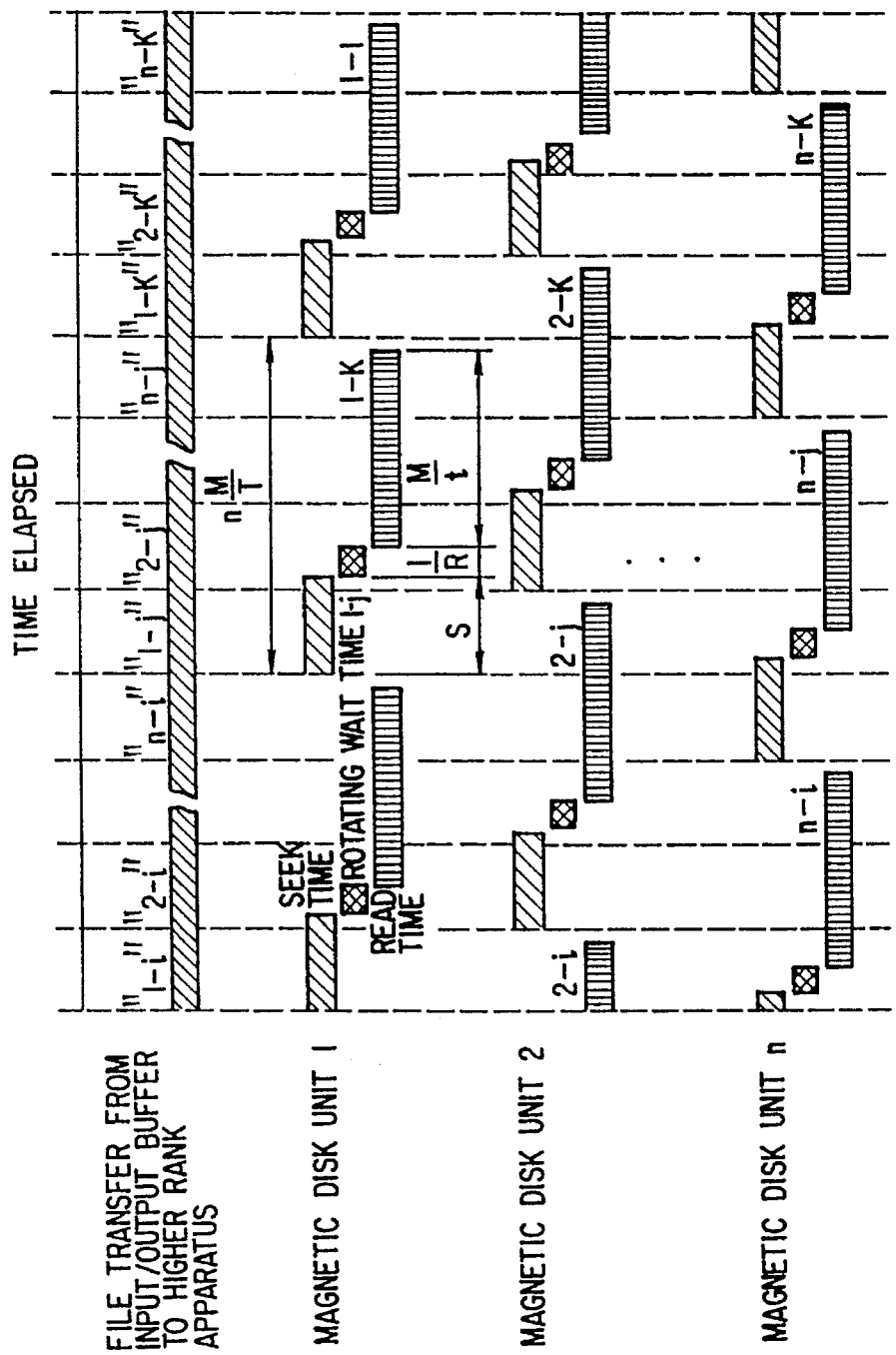
FIG. 65 is a timing chart of a file reading process in the collective-type magnetic disk device in the embodiment in FIG. 57.

Let the transfer speed demanded by the higher-rank apparatus 7 T [Byte/sec], the capacity of one cylinder of each magnetic disk unit 1M [Byte], the transfer speed from each magnetic disk unit 1 to each input/output buffer 3 t [Byte/sec], the minimum seek time of each magnetic disk device 1 s [sec] and the rotation speed R [rps], and if the minimum seek time s [sec] is larger than the time (M/T) to transfer files in the ith input/output buffer 3-1 to the higher-rank apparatus 7, the processing for reading files has a relationship of time as shown in FIG. 65. If the time (s+1/R+M/t) that the ith magnetic disk device 1-i reads out files onto the input/output buffer 3-i is within the time (nM/T) to transfer all of files on the input/output buffers 3 to the higher-rank apparatus 7, the transfer speed demanded by the higher-rank apparatus 7 is satisfied. It is assumed here the seek time to read continuous cylinders is the minimum seek time. And it is assumed the rotation wait time takes the maximum value (1/R) to satisfy the transfer speed demanded by the higher-rank apparatus 7, no matter where a magnetic head is at the time of a read command being given to a magnetic disk device 1. This relationship is expressed by:

$$s + \frac{1}{R} + \frac{M}{t} \leq n \frac{M}{T}$$

and that can be expressed by:

$$n \geq T \left\{ \frac{1}{t} + \frac{1}{M} \left( s + \frac{1}{R} \right) \right\} \qquad (1)$$

Figure 66:
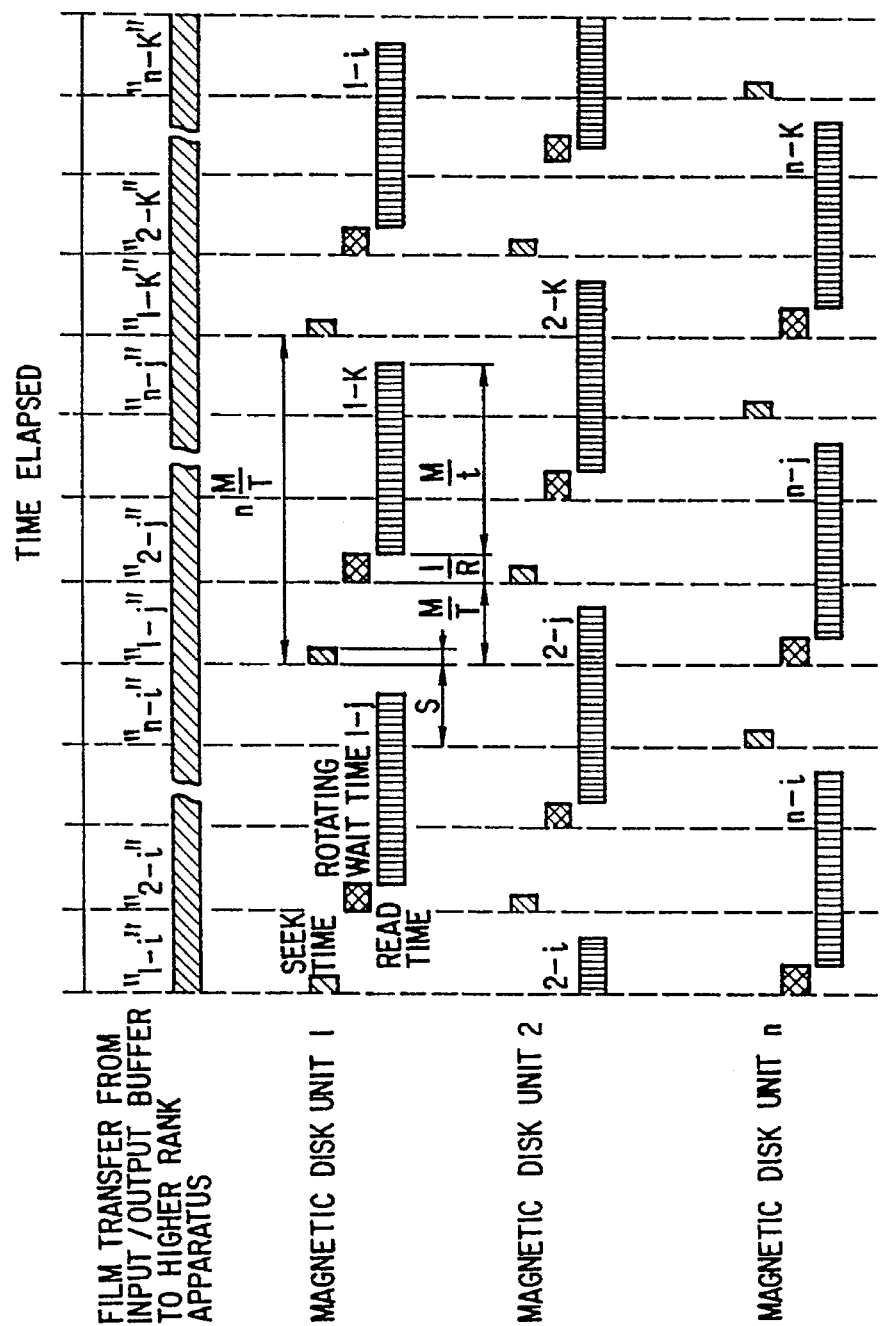
FIG. 66 is a timing chart of a file reading process in the collective-type magnetic disk device in the embodiment in FIG. 57p.

On the other hand, in the case where the minimum seek time s [sec] is not more than the time (M/T) to transfer files on the ith input/output buffer 3-i to the higher-rank apparatus 7, the processing for reading files has a relationship of time as shown in FIG. 66. In this case, when the seek operation is finished, the input/output buffer 3-i is transferring files to the higher-rank apparatus 7, so that a read command cannot be given to the ith magnetic disk device 1-i. Therefore, a read command is given to the ith magnetic disk device 1-i at the time when the input/output buffer 3-i finishes transferring files to the higher-rank apparatus 7. Therefore, if the time (M/T+1/R+M/t) that the ith magnetic disk device 1-i reads out files onto the input/output buffer 3-i is within the time (nM/T) to transfer all of files on the input/output buffers 3 to the higher-rank apparatus 7, the transfer speed demanded by the higher-rank apparatus 7 is satisfied. This relationship is expressed by:

$$\frac{M}{T} + \frac{1}{R} + \frac{M}{t} \leq n \frac{M}{T}$$

and that can be expressed by:

$$n \geq 1 + T\left(\frac{1}{t} + \frac{1}{RM}\right) \quad (2)$$

From these conditional expressions, it is possible to obtain the number of magnetic disk devices combined to satisfy the transfer speed demanded by the higher-rank apparatus 7, so that it is possible to make a collective type magnetic disk unit have the best cost performance if the collective type magnetic disk unit is constituted by the minimum number of magnetic disk devices satisfying the expression (1).

For example, assume that a collective type magnetic disk unit is constituted by magnetic disk devices 1 in which one cylinder constituted by six tracks respectively having the capacity 20 k (kilo) [Byte] has the capacity 120 k [Byte], and let the transfer speed demanded by the higher-rank apparatus 7 2M (Mega) [Byte/sec], the effective transfer speed from each magnetic disk device 1 to each input/output buffer 3 without a seek operation 1M [Byte/sec], the minimum seek speed of each magnetic disk device 1 10 m (milli) [sec] and the rotation speed 50 [rps], and the expression (1) is expressed by:

$$s = 10 \times 10^{-3} \leq \frac{M}{T} = \frac{120 \times 10^3}{2 \times 10}$$

$$n \mu 1 + 2 \times 10^6 \times \left(\frac{1}{10} + \frac{1}{120 \times 10 \times 50}\right)$$

The minimum number n that satisfies this expression is four.

Figure 67:
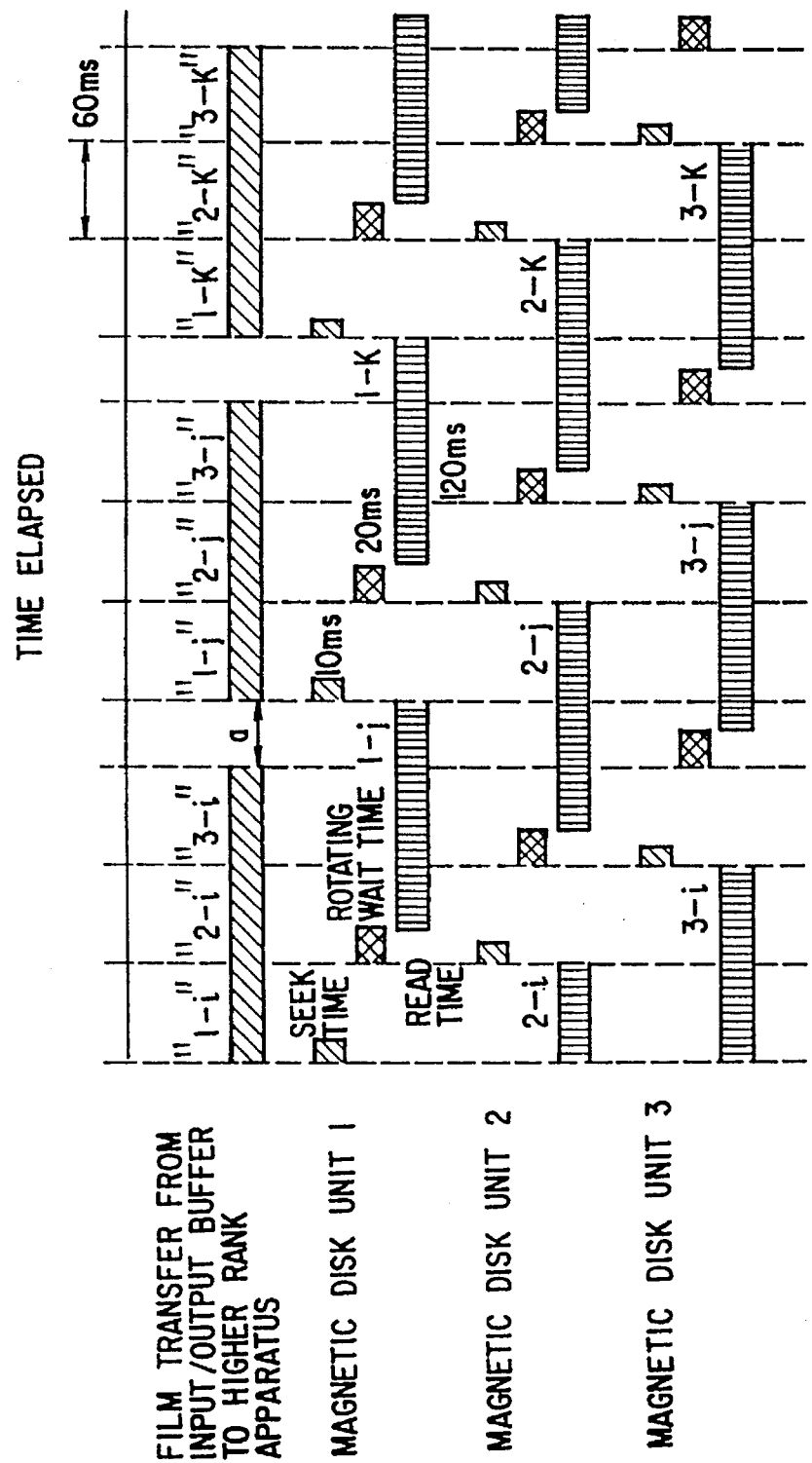
FIG. 67 is a timing chart of a file reading process in the collective-type magnetic disk device composed of three magnetic disk devices in the embodiment in FIG. 57.
Figure 68:
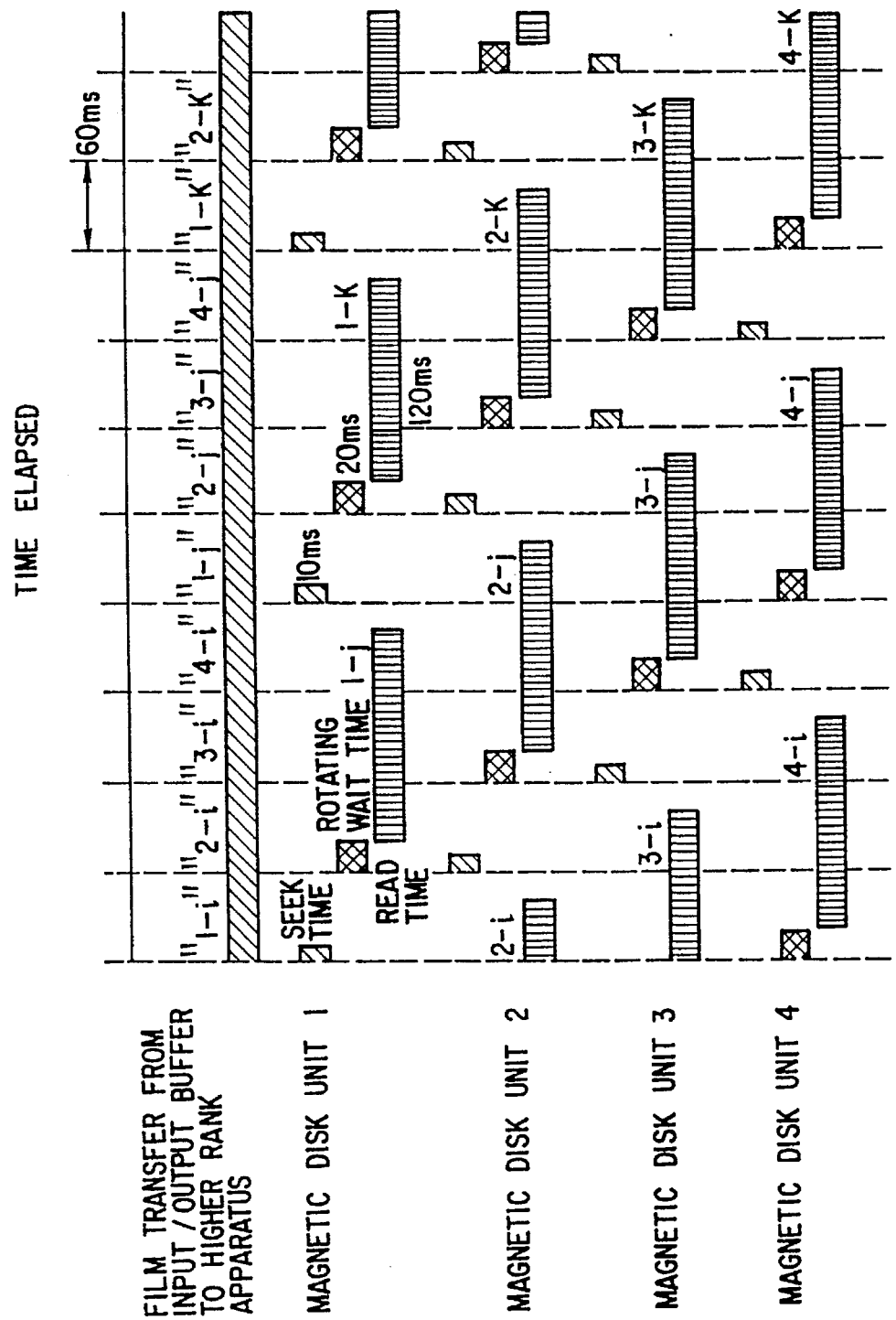
FIG. 68 is a timing chart of a file reading process in the collective-type magnetic disk device composed of four magnetic disk devices in the embodiment in FIG. 57.
Figure 69:
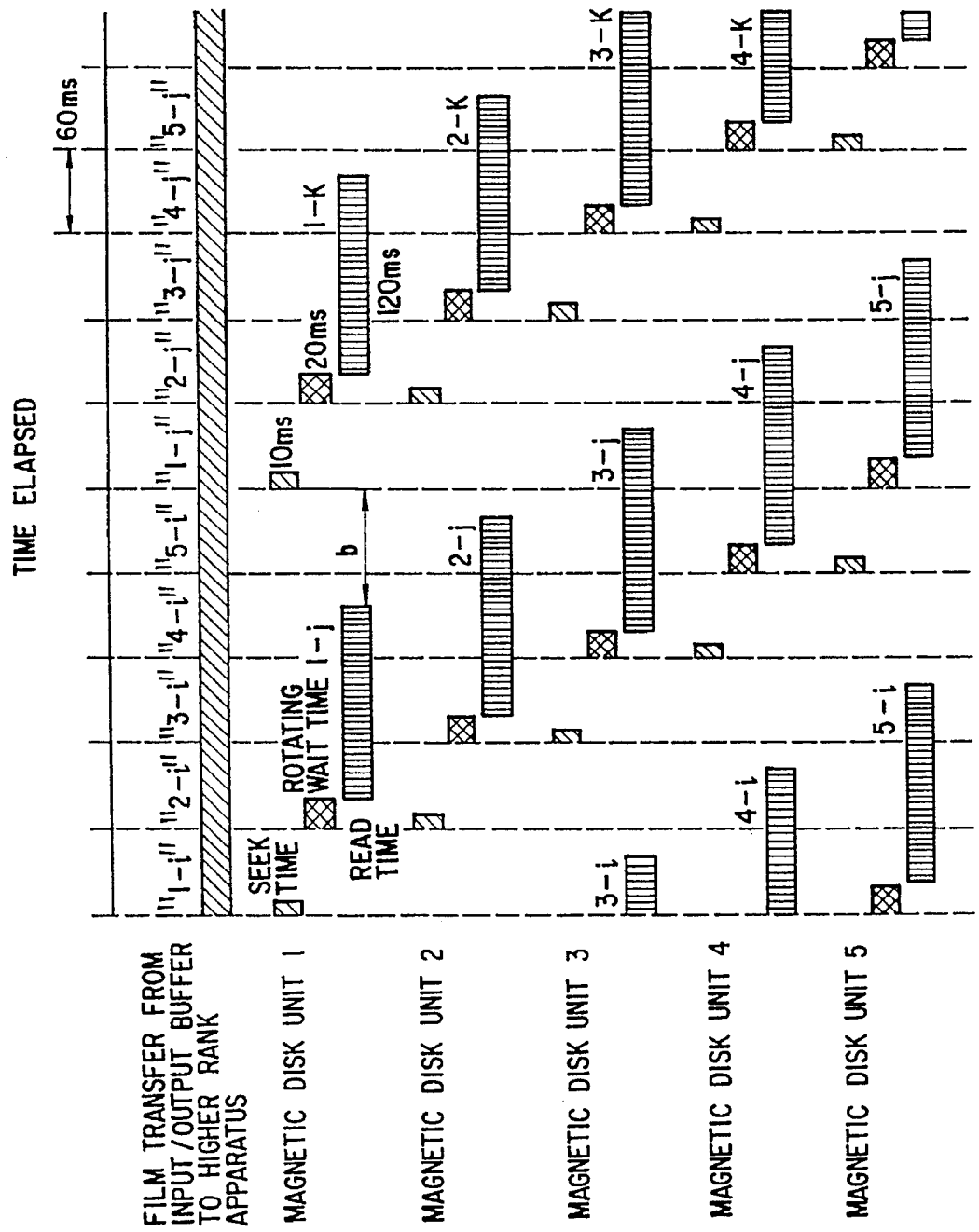
FIG. 69 is a timing chart of a file reading process in the collective-type magnetic disk device composed of five magnetic disk devices in the embodiment in FIG. 57.

FIGS. 67 to 69 show the respective time relationships when a collective type magnetic disk unit constituted by three, four or five magnetic disk devices 1 is reading.

In the collective type magnetic disk unit constituted by three magnetic disk devices 1 as shown in FIG. 67, as is apparent from the same drawing, the time to read data from each magnetic disk device 1 to each input/output buffer 3 is not in time for the transfer time from the input/output buffer 3 to the higher-rank apparatus 7, so that there occurs time a not to transfer data from the input/output buffer 3 to the higher-rank apparatus 7, and the transfer speed from the input/output buffer 3 to the higher-rank apparatus 7 becomes about 1.6M [Byte/sec] which cannot satisfy the transfer speed demanded by the higher-rank apparatus 7.

In the collective type magnetic disk unit constituted by five magnetic disk devices 1 as shown in FIG. 69, although the transfer speed demanded by the higher-rank apparatus 7 is satisfied, time b that one magnetic disk device 1 is not performing processing is longer than that in the collective type magnetic disk unit constituted by four magnetic disk devices 1 as shown in FIG. 68, so that the efficiency of use of magnetic disk devices is deteriorated.

Therefore, in the case where a collective type magnetic disk unit is constituted by four magnetic disk devices 1 corresponding to the minimum number n satisfying the expression (1), it is possible to make the collective type magnetic disk unit have the best cost performance.

Another embodiment of a term search system to which the present invention is applied will be described with reference to FIG. 56.

In the collective type magnetic disk unit which has been described with reference to FIG. 57, in the case of reading only designated files, if the designated files are among the magnetic disk devices 1-1 to 1-n averagely, performing the above-mentioned operation in the first embodiment can make the data transfer speed to the higher-rank apparatus 7 higher. However, in the case where the designated files are in only one magnetic disk device 1-i, reading from the magnetic disk device 1-i is performed continuously. In this case, since transferring data to the higher-rank apparatus 7 is performed by the two-step reading that data is read from the magnetic disk device 1-i to the input/output buffer 3-i once and then the data is transferred from the input/output buffer 3-i to the higher-rank apparatus 7, so that transferring data is deteriorated. In such a manner, there can occur a case that it is impossible to effectively make the data transfer speed to the higher-rank apparatus 7 higher if designated files are in a portion of magnetic disk devices 1. This second embodiment is therefore to make files stored impartially, to make all of magnetic disk devices 1 always perform a read operation, and to thereby make the data transfer speed to the higher-rank apparatus 7 higher.

Additionally in this embodiment, in order to make the memory capacity further high, the number of magnetic disk devices is increased.

Figure 56:
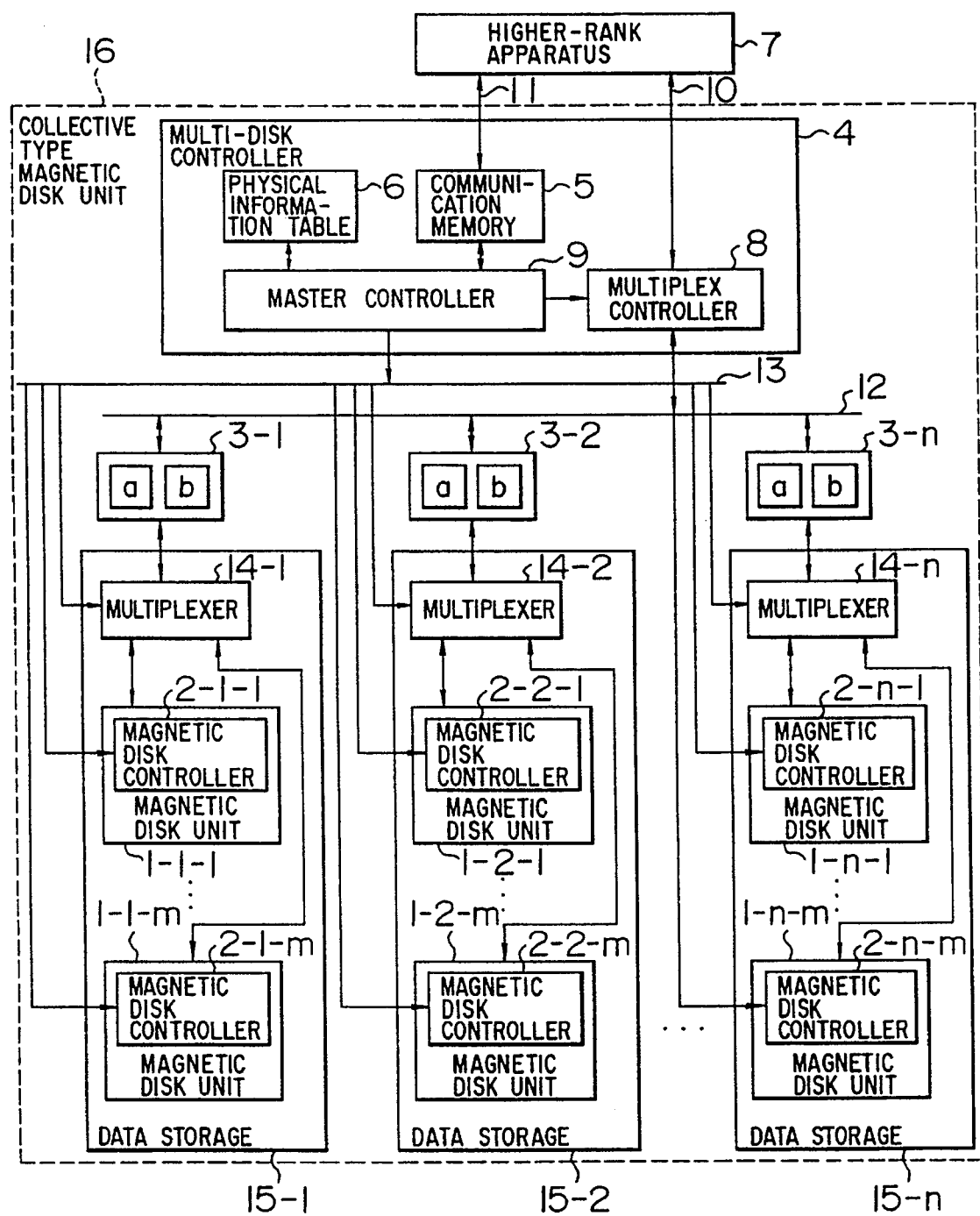
FIG. 56 is a block diagram showing an example of construction of a collective-type magnetic disk device as an embodiment of the present invention.

FIG. 56 shows an arrangement of an collective type magnetic disk unit according to the present invention, the difference point of which from that in FIG. 57 is that each input/output buffer 3 is constituted by two input/output buffers 3a and 3b each having capacity corresponding to one cylinder of each magnetic disk device 1 in order to store in the second input/output buffer 3b files read from a magnetic disk device 1 while data in the first input/output buffer 3a is transferred to the higher-rank apparatus 7.

Additionally each data storage 15 is constituted by m magnetic disk devices 1-i-1 to 1-i-m and a multiplexer 14, so that a collective type magnetic disk unit has (n×m) times as much memory capacity as that of one magnetic disk device.

Describing the operation, first, processing for defining the structure of a data base is performed in the same manner as that in FIG. 57, but the information to distinguish the m magnetic disk devices 1 connected through a multiplexer 14 to an input/output buffer 3 is added to the structure defining information.

Although building up a data base is performed in the same manner as that in FIG. 57, there are some difference points. One difference point from the arrangement in FIG. 57 is that each file given by file information is divided into the number of constituting magnetic disk devices, and distributed to and stored in all the magnetic disk devices. Another difference point is that each multiplexer 14 is controlled so that data in each input/output buffer 3 is stored in one 1-i-j of m magnetic disk devices given by storage physical information.

As a method of dividing a file, there is a method to divide the file size by the number of magnetic disk devices so as to obtain a divided size, and store the file every divided size from the head of the file sequentially in the order from the first magnetic disk device 1-1-j to 1-2-j, 1-3-j, . . . , or a method to store the file every predetermined size such as one byte sequentially in the order from the first magnetic disk device 1-1-j to 1-2-j, 1-3-j, . . . .

In the case where the file size cannot be divided by the number of magnetic disk devices, invalid data is added to the tail of the file so that the file size takes a multiple of the number of the magnetic disk devices, thereby making the head of the file always be in the first magnetic disk device 1-1-j.

Next, reading files will be described. Although this is also performed in the same manner as that in the embodiment in FIG. 57, since there are two input/output buffers 3 (3a and 3b) in this arrangement, processing for reading the next file can be started as soon as a file read out from each magnetic disk device 1 is stored into its corresponding input/output buffer 3.

Figure 70:
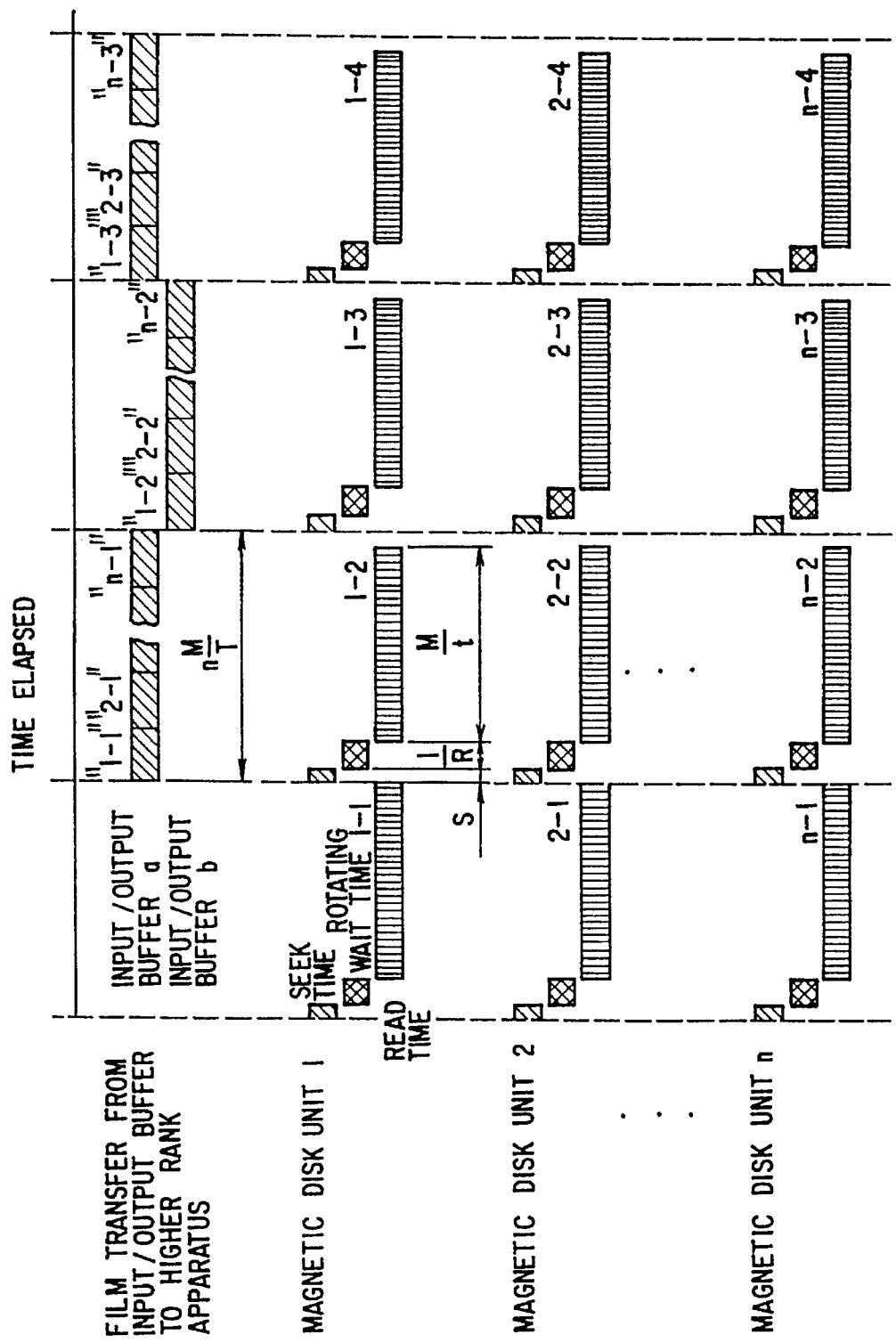
FIG. 70 is a timing chart of a file reading process in two collective-type magnetic disk devices in the embodiment in FIG. 56.

FIG. 70 shows a relationship of time in processing for reading files, in which there is no wait time before each input/output buffer 3 is put in a data writable state, so as to realize a high speed transfer in comparison with that in the embodiment in FIG. 57. The relationship to satisfy a transfer speed demanded by an higher-rank apparatus 7 under the same conditions as those in the embodiment in FIG. 57 is good if the time to read a file from one magnetic disk device 1-i-j to one 3a–i of two input/output buffers 3-i is within the time (nM/T) to transfer a file from all input/output buffers 3b-1 to 3b-n in the other side to the higher-rank apparatus 7, and this is expressed by:

$$s + \frac{1}{R} + \frac{M}{t} \leq n \frac{M}{T}$$

and this expression can be easily changed by:

$$n \geq 1 + T \left\{ \frac{1}{t} + \frac{1}{M} \left( s + \frac{1}{R} \right) \right\} \quad (1\text{-}1)$$

From this condition, it is possible to obtain the number of data storages 15 to satisfy the transfer speed demanded by an higher-rank apparatus in the same manner as that in the embodiment 1.

In order to obtain a large memory capacity, each data storage 15 is constituted by m magnetic disk devices 1 and a multiplexer 14, so that it is possible to increase the memory capacity by m times.

If a collective type magnetic disk unit is constituted by magnetic disk devices the number of which is the minimum number decided on these, it is possible to make the collective type magnetic unit have the best cost performance.

Although it is performed to start a seek operation of each magnetic disk device in the embodiment in FIG. 70 at the time of finishing transferring data of the input/output buffers 3-1 to 3-n to an higher-rank apparatus, it is apparent that it may be performed at the time of finishing each reading.

Although the cases by use of magnetic disk devices have been described in the above two embodiments, it is obvious that the same result can be obtained in the case by use of other storages such as optical disk devices having rotating storage media.

Next an embodiment in which a document information retrieval system according to the present invention can be connected with the outside through a LAN or the like will be described with reference to FIGS. 71 to 74.

Figure 71:
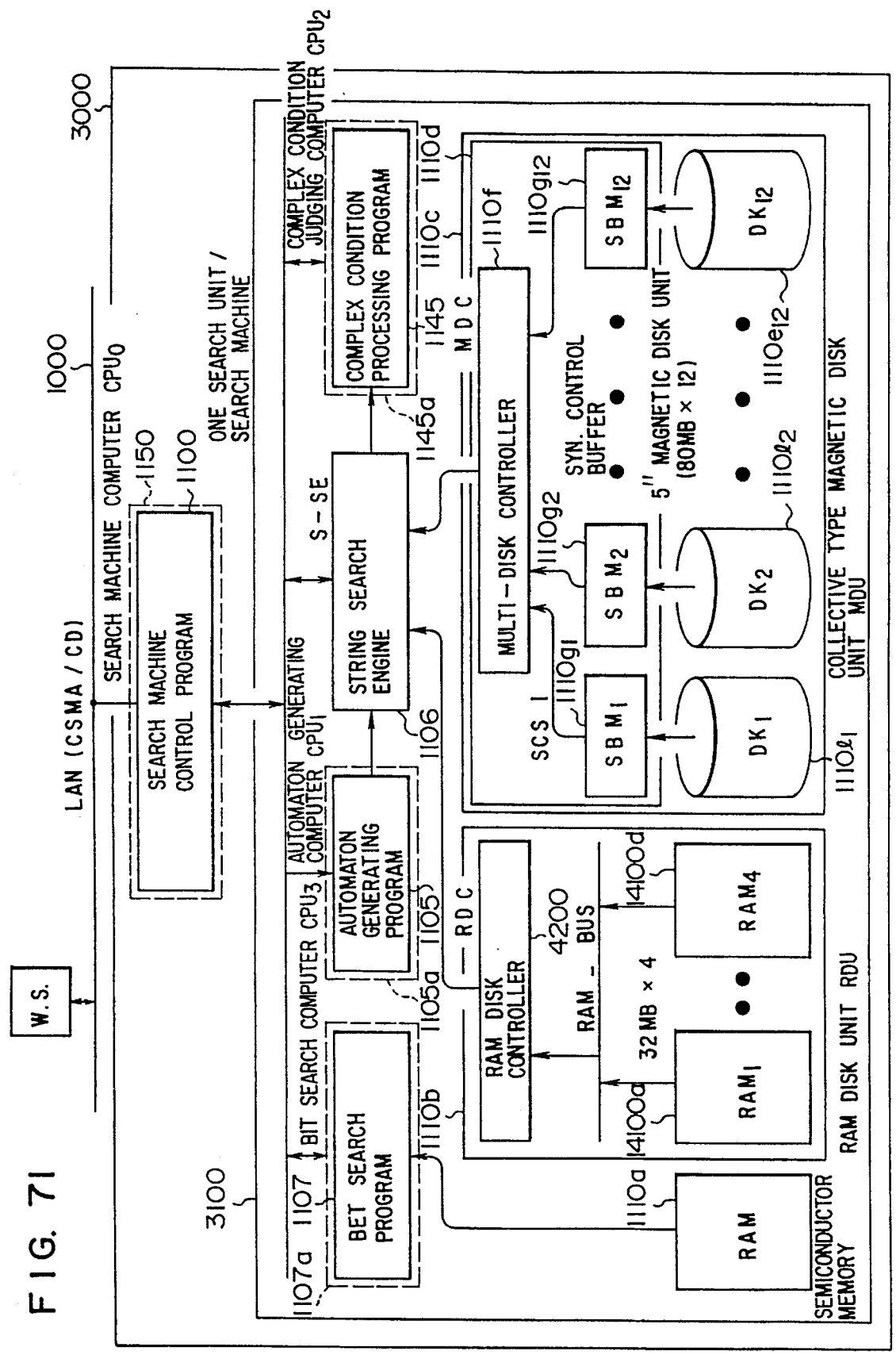
FIG. 71 is a block diagram showing an embodiment in which the present invention is applied to LAN.

A document information retrieval system (called "search machine") 3000 in FIG. 71 has a LAN connection controlling function to connect a search machine control computer to a communication circuit 1000 such as a LAN or the like. The search machine 3000 is constituted by a search machine control computer 1150 and a search unit 3100. In the search machine control computer 1150, executed is a search machine control program 1100. In this search machine control program 1100, executed are a search expression analysis program 1102 described in the first embodiment (FIG. 10) according to the present invention, a synonym and different notation development program 1103a, a query analysis program 1141a and a search execution control program 1108.

The search unit 3100 is constituted by an automaton generating computer ($CPU_1$) 1105a, a bit search computer ($CPU_3$) 1107a, a string searching engine 1106, a query resolving computer ($CPU_2$) 1145a, a semiconductor memory 1110a, an RAM disk unit 1110b and a collective type magnetic disk unit 1110c.

An automaton generating program 1105 is executed in the automaton generating computer ($CPU_1$) 1105a, a bit search program 1107 is executed in the bit search computer ($CPU_3$) 1107a, and a query resolving program 1145 is executed in the query resolving computer ($CPU_2$) 1145a.

The collective type magnetic disk unit 1110c is constituted by a collective type magnetic disk controller 1110d and magnetic disk devices 1110e1 to 1110e12. The collective type magnetic disk controller 1110d is constituted by a multi-disk controller 1110f and synchronization control buffers 1110g1 to 1110g12. The synchronization control buffers 1110g1 to 1110g12 are to match and synchronize the outputs of the magnetic disk devices 1110e1 to 1110e12 respectively independently operating, and supply the outputs to the string search engine 1106. That is, for example, when it is necessary to output text data in the magnetic disk device 1110e1 before text data in the magnetic disk device 1110e2, even if the text data in the magnetic disk device 1110e2 has been read, this data is held in the synchronization control buffer 1110g2 till the text data in the magnetic disk device 1110e1 is read into the synchronization control buffer 1110g1 and read therefrom into the string search engine 1106 through the multi-disk controller 1110f, and then the data in the synchronization control buffer 1110g2 is read into the string search engine 1106, so that it is possible to read data into the string search engine 1106 in the initial order. As has been described above, the synchronization control buffers 1110g1 to 1110g12 enable to supply data to the outside in the predetermined right order, no matter how the order of reading the data by the magnetic disk devices 1110e1 to 1110e12 is changed by the scatter in the seek time and rotational delay of each magnetic disk device. The multi-disk controller 1110f has a function as a multiplexer for selecting the outputs of the synchronization control buffers 1110e1 to 1110e12 under the control of the search execution control program 1108 in the search machine control program 1100.

The RAM disk unit 1110b is constituted by an RAM disk controller 4200 and semiconductor memory boards 4100a to 4100d. The semiconductor memory boards 4100a to 4100d are connected to one and the same bus, and a contracted text stored therein is put in access at random. The read data is delivered to the string search engine 1106.

In accordance with a search command supplied through the LAN 1000, the search machine control program 1150 performs, at first, search conditional expression analysis, synonym development, different notation development, complex condition (query) analysis, neighbor condition analysis, contextual condition analysis and logical condition analysis, and control information thus generated is delivered to the bit search program 1107, the automaton generating program 1105 and the query resolving program 1145, respectively. The state transition (goto function) table data for checking key words, which are generated in the automaton generating program 1105, are written into the string search engine 1106.

Secondly, if the establishment of the search control information is finished, execution of search is started. At first, a character component table on the semiconductor memory 1110a is read out, and a character component table search is performed. The result of this character component table search is stored on a main memory of the search machine control computer 1150. Next, a contracted text search is performed upon a group of documents narrowed down by the character component table search. That is, read is a corresponding document identifier stored on the main memory of the search machine control computer 1150 as the result information of the character component table search, and a contracted text corresponding to this identifier is read from the RAM disk unit 1110b, and then the comparison process for designated key words is carried out in the string search engine 1106. Information as a result of the comparison in the string search engine 1106 is delivered to the query resolving program 1145, in which a judgment is made as to whether or not the information satisfies the designated complex condition. The result of this contracted text search is stored on the main memory of the search machine control computer 1150 in the same manner. After this, if certain neighbor or contextual conditions are established in the complex condition, a text search is started. In the text search, read is a corresponding document identifier stored on the main memory of the search machine control computer 1150 as the result information of the contracted text search, and a text corresponding to this identifier is read from the collective type magnetic disk unit 1110c, and then the comparison process for checking the designated key words is carried out in the string search engine 1106. Information as the result of the comparison in the string search engine 1106 is delivered to the query resolving program 1145, in which a judgment is made as to whether or not the information satisfies the designated complex condition, that is, the neighbor and contextual conditions. The result of this text search is stored in the main memory of the search machine control computer 1150 in the same manner.

These searching procedures are all controlled by the search execution control program 1108 in the search machine control program 1100.

Thirdly, if a series of search process as described above is finished, the search result written in the main memory of the search machine control computer 1150 is sent back to a conversational (interactive) search terminal such as a work station, etc., which is a demanding source, through the LAN 1000 under the control of the search machine control program 1100.

According to the above-mentioned modification of the present invention, the document information retrieval system can be used as a server in a LAN to make it possible to perform search from a plurality of conversational search terminals connected to one LAN, and it is therefore possible to efficiently use the LAN as a shared resource.

Figure 72:
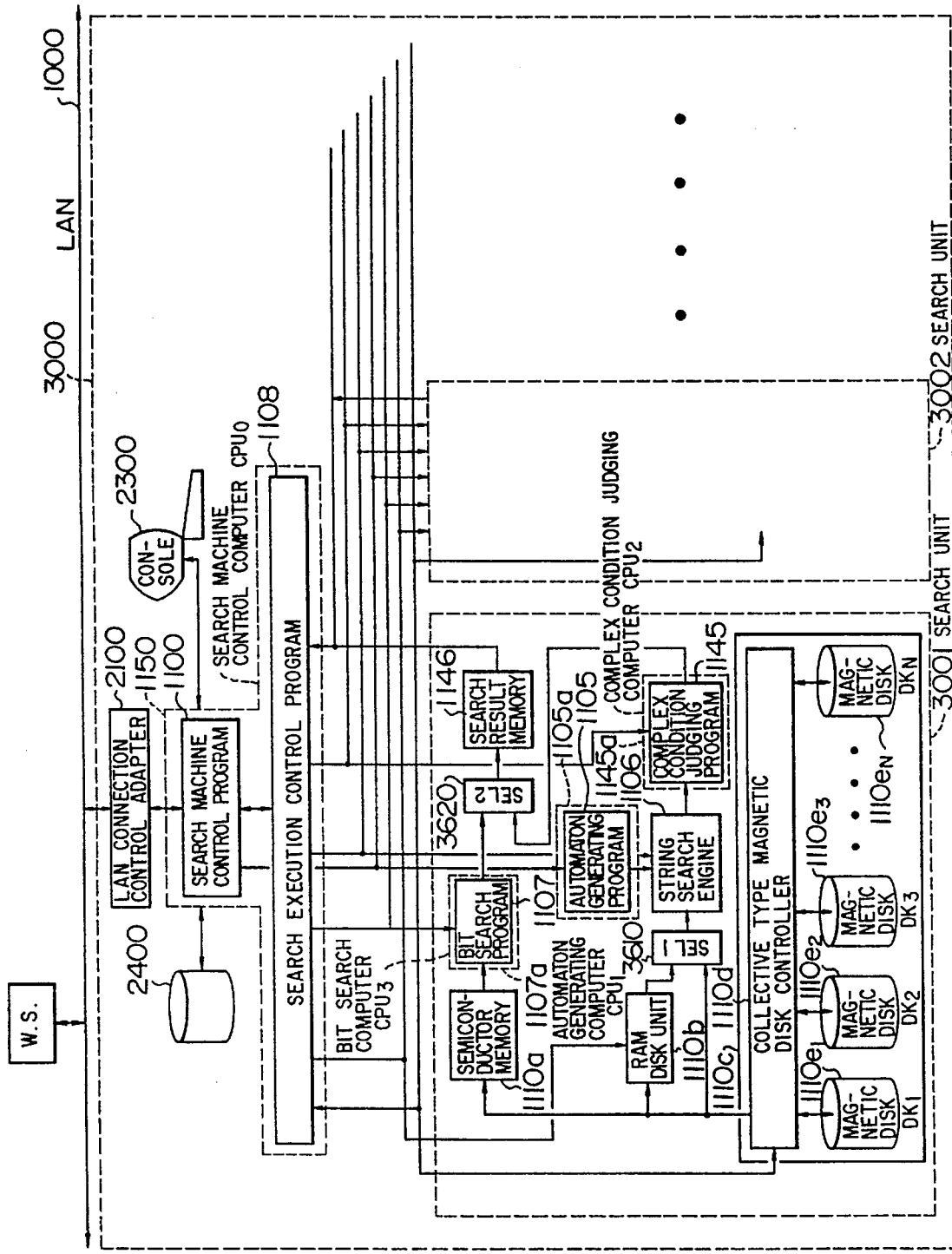
FIG. 72 is a block diagram showing a modification of the embodiment shown in FIG. 71.

Next, another embodiment will be described with reference to FIG. 72.

A document information retrieval system (also called "search machine") 3000 in this embodiment includes an LAN connection control adapter 2100 to connect with a communication circuit 1000 such as a LAN, etc. The search machine 3000 is constituted by a search machine control computer 2200 and a plurality of search units 3001, 3002, . . . as well as the above-mentioned LAN connection control adapter 2100.

In the search machine control computer 1150, a search machine control program 1100 is executed. This search machine control program 1100 is constituted by a search expression analysis program 1102, a synonym and different notation development program 1103a, a query (complex condition) analysis program 1141a and a search execution control program 1108 which have been described in the first embodiment (FIG. 10) of the present invention.

The search unit 3001 is constituted by an automaton generating computer (CPU$_1$) 1105a, a bit search computer (CPU$_3$) 1107a, a string search engine 1106, a query resolving computer (CPU$_2$) 1145a, a semiconductor memory 1110a, an RAM disk unit 1110b, a collective type magnetic disk unit 1110c, a search result storage memory 1146 and selectors 3610 and 3620.

An automaton generating program 1105 is executed in the automaton generating computer (CPU$_1$) 1105a, a bit search program 1107 is executed in the bit search computer 1107a, and a query resolving program 1145 is executed in the query resolving computer (CPU$_2$) 1145a.

The collective type magnetic disk unit 1110c is constituted by a collective type magnetic disk controller 1110d and magnetic disk devices 1110e1 to 1110e1N. In these magnetic disk devices 1110e1 to 1110e1N, distributed and stored are text data, contracted text data, a character component table, bibliographic items, etc. In a text search, the text data is read therefrom to the string search engine 1106.

The character component table is loaded from the magnetic disk devices 1110e1 to 1110e1N into the semiconductor memory 1110a at the time of starting up a system, and is put in access by the string search engine 1106 as subject data in a character component table search at the time of searching.

In the same manner, contracted texts are loaded from the magnetic disk devices 1110e1 to 1110e1N into the RAM disk unit 1110b at the time of starting up a system, and is put in access by the string search engine 1106 as subject data in a contracted text search at the time of searching.

The string search engine 1106 reads contracted texts and texts from the RAM disk unit 1110b and the collective type magnetic disk unit 1110c at the time of contracted text and text searches respectively, to carry out the search and comparison process for designated key words. The selector 3610 has a function to switch the input to the string search engine 1106 between the RAM disk unit 1110b and the collective type magnetic disk unit 1110c. On the other hand, the selector 3620 has a function to switch the input at the time of writing the result of a character component search into the search result storage memory 1146 and at the time of writing the result of a contracted text search and the result of a text search into the search result storage memory 146.

Corresponding to a search command supplied through the LAN 1000, the search machine control program 1150 performs, at first, search conditional expression analysis, synonym development, different notation development, query (complex condition) analysis, neighbor condition analysis, contextual condition analysis and logical condition analysis, and control information thus generated is broadcast to the bit search program 1107, the automaton generating program 1105 and the query resolving program 1145 in each of the searching units 3001, 3002, . . . . In each of the search units 3001, 3002, . . . , the state transition (goto function) table data for checking key words, which are generated in the automaton generating program 1105, are written into the string search engine 1106.

Secondly, if the establishment of the search control information is finished, execution of search is started. In this embodiment, the search execution control program 1108 on the search machine control computer 1150 broadcasts search starting information to the respective search units 3001, 3002, . . . .

In each of the search units 3001, 3002, . . . , at first, a character component table on the semiconductor memory 1110a is read out, and a character component table search is performed. The result of this character component table search is written in the search result storage memory 1146. The selector 3620 is switched based on the search execution control program 1108 to select writing from the bit search program 1107.

Next, a contracted text search is performed upon a group of documents narrowed down by the character component table search. That is, with reference to the contracted text storage information belonging to the search execution control program 1108 including a corresponding document identifier stored on the search result storage memory 1146 as the result information of the character component table search, the storage area information of corresponding contracted texts on the RAM disk unit 1110*b* is set in an RAM disk controller 7200 (FIG. 22). Thereafter, the contracted texts are read from the RAM disk unit 1110*b*, and the comparison process for checking designated key words is carried out in the string search engine 1106. Information as the result of the comparison in the string search engine 1106 is delivered to the query resolving program 1145, in which a judgment is made as to whether or not the information satisfies the designated complex condition. The result of this contracted text search is written into the search result storage memory 1146 in the same manner. Of course, then, the selector 3620 is switched based on the search execution control program 1108 to select writing from the query resolving program 1145.

Thereafter, if neighbor or contextual conditions are established in the complex condition, a text search is started. In the text search, with reference to the text storage information belonging to the search execution control program 1108 including a corresponding document identifier stored in the search result storage memory 1146 as the result information of the contracted text search, the storage area information of corresponding texts on the collective type magnetic disk unit 1110*c* is set in a collective type magnetic disk controller 1110*d* (in FIG. 20). Then, texts corresponding to the information are read from the collective type magnetic disk unit 1110*c*, and the comparison process for checking designated key words is carried out in the string search engine 1106. Information as the result of the comparison in the string search engine 1106 is delivered to the query resolving program 1145, in which a judgment is made as to whether or not the information satisfies the designated complex condition, that is, neighbor and contextual conditions. The result of this text search is written into the search result storage memory 1146. Then, the selector 3610 is switched to select reading from the collective type magnetic disk unit 1110*c*, and the selector 3620 is switched based on the search execution control program 1108 to select writing from the query resolving program 1145.

The above-mentioned searching procedures are all controlled by the search execution control program 1108 through broadcasting to the respective search units 3001, 3002, . . . .

Thirdly, if a series of search process as described above is finished in all the search units 3001, 3002, . . . , the search results written in the respective search result storage memories 1146 are collected from all the units 3001, 3002, . . . and integrated and sent back to a demanding source through the LAN 1000 under the control of the search machine control program 1100.

To the search machine control computer 1150, added is a magnetic disk unit 2400, in which stored is information pertaining to configuration of the search machine 3000, that is, the number of search units, etc. The magnetic disk unit 2400 is also used for temporarily storing requests from a plurality of users through a LAN correspondingly to the operation conditions of the search units, or temporarily storing the search result information to be sent back.

Further in a console 2300 added to the search machine control computer 1150, the operation conditions of the search machines can be displayed desirably, or a command of maintenance operation can be given therefrom.

As has been shown in the arrangement of this embodiment, according to the present invention, it is possible to extremely easily arrange an information retrieval system by deciding the number of magnetic disk devices in a collective type magnetic disk unit and the number of search units on the basis of a specification desired by a user, that is, desired capacity for accumulating text data, search time and so on.

Figure 73:
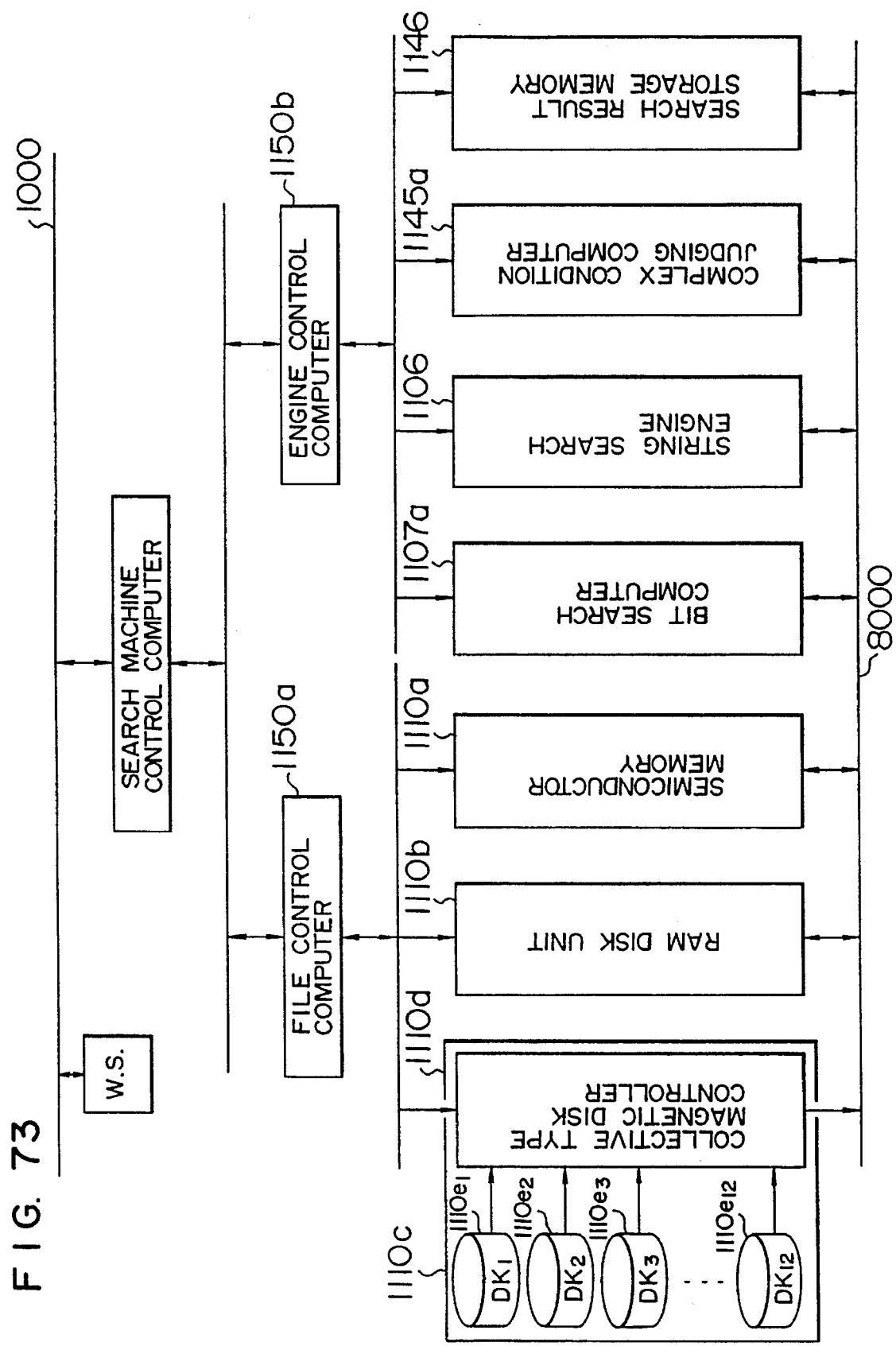
FIG. 73 is a block diagram showing another modification of the embodiment shown in FIG. 71.

FIG. 73 shows another embodiment of the present invention. In the embodiments which have been described, by the cascade connection of the collective type magnetic disk unit 1110*c*, the bit search computer ($CPU_3$) 1107*a* or the string search engine 1106, the query resolving computer ($CPU_2$) 1145*a*, and the search result storage memory 1146, and the pipeline operation thereof, the improvement of processing speed is intended. On the other hand, in this embodiment, by connecting the above-mentioned respective parts through a bus 8000, hardware arrangement is simplified, so as to restrain system scale. Moreover, by providing computers 1150*a* for controlling a collective type magnetic disk unit 1110*c*, an RAM disk unit 1110*b* and a semiconductor memory 1110*a*, and computers 1150*b* for controlling a bit search computer 1107*a*, a string search engine 1106 and a query resolving computer 1145*a* by one computer to one part, so as to reduce the load on a search machine control computer 1150 and intend the dispersion of load as a whole, overhead relating to the search process can reduced.

Finally, an embodiment in which a document information search system according to the present invention is used in a network system will be described with reference to FIG. 74.

Figure 74:
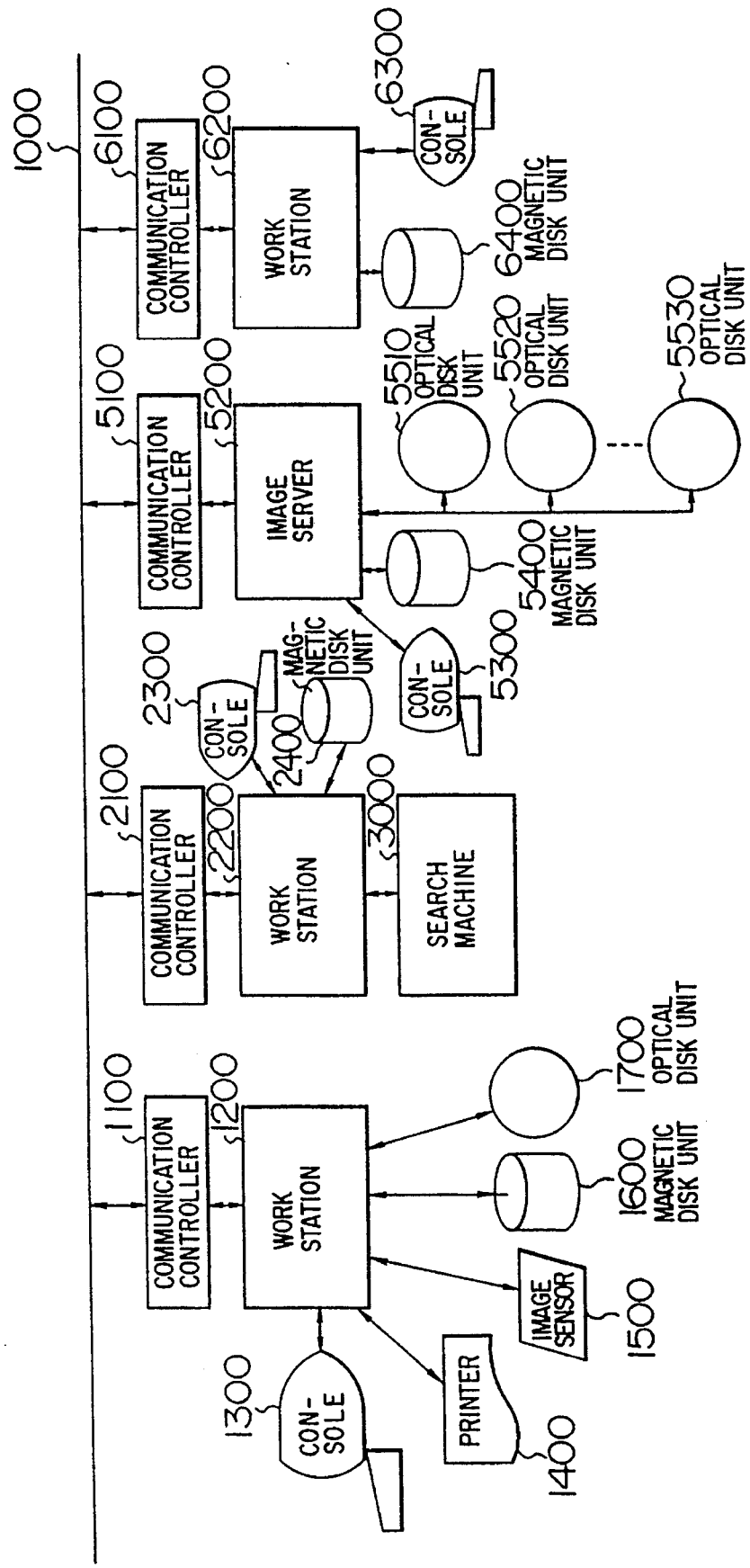
FIG. 74 is a block diagram showing a further modification of the embodiment shown in FIG. 71.

In FIG. 74, the reference numeral 1000 represents a network such as a LAN or the like, to which a search machine 3000 is connected through a search machine control work station 2200 by a communication control means 2100.

The reference numeral 5200 represents an image server for generally controlling optical disk units 5510, 5520, . . . , 5530. The image server 5200 is connected to the network 1000 by a communication control means 5100 in the same manner. The reference numeral 5400 represents a magnetic disk unit for storing the management information for managing the positions of image data corresponding to documents in the optical disk units 5510, 5520, . . . , 5530.

The reference numeral 1200 represents a conversational (interactive) search work station which can display image data and is also connected to the network 1000 by a communication control means 1100. Additionally, an image printer 1400, an image scanner 1500, a magnetic disk unit 1600 and an optical disk unit 1700 are connected with this work station.

The reference numeral 6200 represents a work station, which is also connected to the same network by a communication control means 6100. This is a special work station for searching and perusing. Through the work station 1200, a request for image data corresponding to a corresponding document is given to the image server 5200 correspondingly to the searched result from the search machine 3000, so that this image data can be received through the network, displayed on the console 1300 and perused with pictorial images. The image data can be hard copied by the image printer 1400. Moreover the image data can be edited on this work station and stored as a personal private file in the optical disk unit 1700. In this edition, an image given from the image scanner 1500 can be used.

It is therefore possible to store only an edited portion in the magnetic and optical disk units 1600 and 1700 without changing public data stored in a data base in the search machine or image server, so as to hold its corresponding information in the magnetic disk unit 1600.

According to the above-mentioned respective embodiments, first, a search data base for storing text data is constituted by a plurality of magnetic disk devices arranged in parallel, and by driving these at the same time and integrating their output data, a high readout speed can be obtained, so that a text search of text data as a subject can be performed at a high speed, so that the search time can be shorten in a large scale.

Secondly, by mounting a term comparator with special hardware for term comparison on the basis of a finite automaton method, it is possible to collectively search about 1,000 key words without decreasing the comparison speed. Accordingly, search for key words including synonyms and different notations can be made by only once scanning the text data base, so that a high-speed search process under the condition that different expressions and different notations are allowed can be provided.

Thirdly, by performing two-stage presearch as a scanning type text full search accelerating method, it is possible to reduce the number of times for reference to a text stored in a magnetic disk, so that it is possible to reduce the quantity of text search processing which occupies a high rate in the search processing time to thereby shorten the whole search processing time.

Specifically, a method used in the first stage of the presearch comprises the steps of: generating bit lists for expressing the existence of characters in each document by one-bit information with respect to all character codes, as a hash table in advance; detecting bit lists for indicating candidate documents by searching the table correspondingly to the constituent characters of a designated key word (or key words); and ANDing the bit lists to thereby extract documents containing all the constituent characters of the key word (or key words). According to this method, the number of documents as the subject of search hereafter can be narrowed down to its necessary minimum, so that the search processing time can be shortened as a while.

Further, a method used in the second stage of the presearch comprises the steps of: preparing contracted texts by eliminating adjuncts such as postpositional words, conjunctions, and the like, from texts and by omitting duplications of a word which appears repeatedly, from texts, respectively; and scanning contracted texts of documents narrowed down by the first-stage presearch to thereby extract documents containing the designated key word (or key words) as a word. According to this method, the number of documents as the subject of a text search hereafter can be narrowed down to its necessary minimum, so that the search processing time can be further shortened as a whole.

Accordingly, the finial text search based on the complex condition can be made by reading only texts of the documents narrowed down by this two-stage presearch from the magnetic disk unit and scanning the texts, so that an equivalently high-speed full text search can be attained.

Fourthly, a fine search peculiar to full text search can be attained by providing a query resolver at the time of the text search to extract only texts fitting to logical conditions, neighbor conditions and contextual conditions described in the search expression based on the output result of the search engine. In short, a logical condition judging means can realize a search logical operation function, such as ORing operation (logical sum), ANDing operation (logical product), NOT operation (logical negation), and the like. A neighbor condition judging means can realize a function such as in the case of Japanese, an inter-character distance condition search in which the higher or lower limit of the number of characters between key words is designated, or in the case of English, an inter-word distance condition search in which the higher or lower limit of the number of words between key words is designated. And a contextual condition judging means can realize a search function such as a function of searching for documents containing key words in one range such as one sentence, one paragraph, or the like.

Moreover, a high-speed query resolving process can be provided by combining the neighbor condition judging means, the contextual condition judging means and the logical condition judging means as constituent members of the query resolver in this order and executing these means in a pipeline.

Fifthly, by collecting into one unit a search data base constituted by a plurality of magnetic disk devices, a term comparator, a pre-search means and a query resolver, arranging a plurality of thus prepared units in parallel, placing a controller above to control these units and collecting these units and the controller into one search machine, it is possible to react to a large-capacity text data base by parallel arrangement of a plurality of search machines and also possible to cope with the increase in the quantity of information accumulated in the data base by increase of the number of units in one machine or increase of the number of search machines in one system with no necessity of changing the text data base.

Sixthly, the text search machine can be connected to an LAN in use by providing a means of connection to the LAN in the text search machine. Accordingly, not only a service can be given to a plurality of users but a large-scale text data base can be built through the LAN. That is, it is possible to cope with a large-scale text data base by means of connecting a plurality of search machines through an LAN and also possible to cope with the increase of the capacity of the data base by increase of the number of the machines in the LAN.

Seventhly, full text search with regarding all development words, such as synonyms, different notations, and the like, as key words can be made automatically without user's consciousness of these problems, by providing synonym development and different notation development means in the inside of the text machine to perform synonym and different notation development. Accordingly, desired documents can be retrieved thoroughly with no occurrence of omission caused by difference in expression or notation.

INDUSTRIAL APPLICABILITY

As has been described, a hierarchical presearch type document retrieval system and a magnetic disk unit used in the system as related to the present invention are useful as means for registering documents and full text search means based on free words of the registered documents, and is particularly suitable for document retrieval which needs efficiency, such as search of a large-scale data base.

We claim:

1. A document information search system for searching document information, the system comprising:

a plurality of document information search apparatuses connected to a communication network, each of the document information search apparatuses operating in parallel to each other in accordance with search conditions broadcast from a plurality of search terminals connected to said communication network, said plurality of search terminals receiving and displaying search results transmitted from said plurality of document information search apparatuses, each of the plurality of document information search apparatuses including:

a text data storage means for storing a document text data group;

a search expression input means for inputting a search conditional expression in which a complex condition is designated including key words for searching said document text data group, and positional and logical relationships among said key words;

a search expression analysis means for analyzing the inputted search conditional expression to extract a search subject key word and a complex condition descriptive portion;

a synonym development means for generating synonyms of said search subject key word based on said search subject key word outputted from said search expression analysis means;

a different notation development means for generating different notation words of said search subject key word, and said synonyms;

a complex condition analysis means for analyzing said complex condition descriptive portion outputted from said search expression analysis means and developing said complex condition descriptive portion into said positional and logical relationships;

at least one term comparator means for reading text data from said text data storage means and collectively comparing said text data with respect to said different notation words generated by said different notation development means;

at least one complex condition judgment means for detecting documents corresponding to conditions designated by said complex condition analysis means based on results of a comparison outputted from said at least one term comparator means and outputting identifiers of the detected documents;

a search result output means for outputting identifier information of the documents corresponding to said search conditional expression based on the identifiers outputted from said at least one complex condition judgment means; and, a communication means connected to said communication network for receiving said search conditional expression and supplying the search conditional expression to said search expression input means and for forwarding the identifier information from said search result output means to an operatively associated search conversation terminal from which a search request corresponding to the identifier information is transmitted.

2. A document information search system according to claim 1, further including at least one image data storage device for storing image information related to document information stored in said document information search apparatuses, the at least one image data storage device including means for receiving, from the search terminals as instructions, identifiers of documents relating to the search conditions and means for transmitting image information related to the documents from said image data storage device to the search terminals to thereby display said image information.

3. A document information search apparatus according to claim 2, wherein said image data storage device comprises an optical disk unit.

4. A document information search system for searching document information, the system comprising:

a plurality of document information search apparatuses connected to a communication network, each of the document information search apparatuses operating in parallel to each other in accordance with search conditions broadcast from a plurality of search terminals connected to said communication network, said plurality of search terminals receiving and displaying search results transmitted from said plurality of document information search apparatuses, each of the plurality of document information search apparatuses including:

a text data storage means for storing a document text data group;

a search expression input means for inputting a search conditional expression in which a complex condition is designated including key words for searching said document text data group, and positional and logical relationships among said key words;

a search expression analysis means for analyzing the inputted search conditional expression to extract a search subject key word and a complex condition descriptive portion;

a synonym development means for generating synonyms of said search subject key word based on said search subject key word outputted from said search expression analysis means;

a different notation development means for generating different notation words of said search subject key word, and said synonyms;

a complex condition analysis means for analyzing said complex condition descriptive portion outputted from said search expression analysis means and developing said complex condition descriptive portion into said positional and logical relationships;

at least one term comparator means for reading text data from said text data storage means and collectively comparing said text data with respect to said different notation words generated by said different notation development means;

at least one complex condition judgment means for detecting documents corresponding to conditions designated by said complex condition analysis means based on results of a comparison outputted from said at least one term comparator means and outputting identifiers of the detected documents;

a search result output means for outputting identifier information of the documents corresponding to said search conditional expression based on the identifiers outputted from said at least one complex condition judgment means;

an image data storage means storing image information relating to stored document information, for reading and outputting image information together with bibliographic information and text data based on said identifier information outputted from said search result output means; and, a communication means connected to said communication network for receiving said search conditional expression through said communication means and supplying the search conditional expression to said search expression input means and for forwarding the identifier information from said search result output means to an operatively associated search conversation terminal from which a search request corresponding to the identifier information is transmitted.

5. A document information search apparatus comprising:

a text data storage means for storing a document text data group;

a search expression input means for inputting a search conditional expression in which a complex condition is designated including key words for searching said document text data group, and positional and logical relationships among said key words;

a search expression analysis means for analyzing the inputted search conditional expression to extract a search subject key word and a complex condition descriptive portion;

a synonym development means for generating synonyms of said search subject key word based on said search subject key word outputted from said search expression analysis means;

a different notation development means for generating different notation words of said search subject key word, and said synonyms, said different notation development means including a conversion rule table in which head terms constituted by terms of at least one character and at least one other term corresponding to every head term are stored, the different notation development means converting all portions of inputted terms coincident with said head terms in said conversion rule table into term lists each including one head term and the at least one other term corresponding to the head term, and developing terms inputted in combination with the term lists into a group of other terms;

a complex condition analysis means for analyzing said complex condition descriptive portion outputted from said search expression analysis means and developing said complex condition descriptive portion into said positional and logical relationships;

at least one term comparator means for reading text data from said text data storage means and collectively comparing said text data with respect to said different notation words generated by said different notation development means;

at least one complex condition judgment means for detecting documents corresponding to conditions designated by said complex condition analysis means based on results of a comparison outputted from said at least one term comparator means and outputting identifiers of the detected documents;

a search output means for outputting identifier information of the documents corresponding to said search conditional expression based on the identifiers outputted from said at least one complex condition judgment means; and, a presearch means for preparing in advance contracted text data for every document in which adjuncts and duplication of repeatedly stated words are eliminated in the text data and for extracting documents in which key words in the designated search conditional expression are contained by words, so that the text data with respect to the document collection reduced by said presearch means are read out from said text data storage means and search is executed on said text data by said term comparator means and said complex condition judgment means, wherein said at least one term comparator means is used also as said presearch means.

6. A document information search apparatus according to claim 5, wherein a conversion rule table is used as the conversion rule for term development based on at least one notation system selected from the new and old styles or declensional kana of kanji, the katakana notation of adopted words, and the Hepburnian system or directive system notation romaji is used to perform the development.

7. A document information search apparatus according to claim 5, further including means, when alphabet terms are inputted and other than the development using the conversion rule table, for developing each alphabet term into at least one of three kinds of terms including a term in which all the characters are majuscules, a term in which only the head character is a majuscule and the remainder characters are minuscules, and a term in which all the characters are minuscules.

8. A document information search apparatus according to claim 5, further including means for re-defining, by a user, a conversion rule table in which instructions of replacement of partial terms of inputted terms into other terms are stated.

* * * * *